(12) United States Patent
Buxton et al.

(10) Patent No.: US 12,440,378 B1
(45) Date of Patent: Oct. 14, 2025

(54) DEVICES AND SYSTEMS FOR CUTTING, LOADING, AND DELIVERING BIOLOGIC INTRAOCULAR IMPLANTS FOR INCREASED AQUEOUS OUTFLOW AND LOWERING OF INTRAOCULAR PRESSURE

(71) Applicant: Iantrek, Inc., Harrison, NY (US)

(72) Inventors: Sean Buxton, Harrison, NY (US); Roderick H. Beaulieu, Harrison, NY (US); Tsontcho Ianchulev, Harrison, NY (US); Daniel Nelsen, Harrison, NY (US); David Robson, Harrison, NY (US); Joshua Williams, Harrison, NY (US)

(73) Assignee: Iantrek, Inc., Harrison, NY (US)

( * ) Notice: Subject to any disclaimer, the term of this patent is extended or adjusted under 35 U.S.C. 154(b) by 0 days.

(21) Appl. No.: 19/053,243

(22) Filed: Feb. 13, 2025

Related U.S. Application Data

(63) Continuation of application No. 19/100,424, filed as application No. PCT/US2023/080677 on Nov. 21, 2023.

(60) Provisional application No. 63/584,804, filed on Sep. 22, 2023, provisional application No. 63/488,920, filed on Mar. 7, 2023, provisional application No. 63/427,552, filed on Nov. 23, 2022.

(51) Int. Cl.
*A61F 9/007* (2006.01)
*A61F 9/00* (2006.01)

(52) U.S. Cl.
CPC ........ *A61F 9/00781* (2013.01); *A61F 9/0017* (2013.01)

(58) Field of Classification Search
None
See application file for complete search history.

(56) References Cited

U.S. PATENT DOCUMENTS

| | | |
|---|---|---|
| 1,345,882 A | 7/1920 | Repass |
| 4,154,239 A | 5/1979 | Turley |
| 4,288,066 A | 9/1981 | Treace |
| 5,300,079 A | 4/1994 | Niezink et al. |
| 5,342,370 A | 8/1994 | Simon et al. |
| 5,662,661 A | 9/1997 | Boudjema |
| 5,702,441 A | 12/1997 | Zhou |
| 5,868,697 A | 2/1999 | Richter et al. |
| 5,868,728 A | 2/1999 | Giungo et al. |

(Continued)

FOREIGN PATENT DOCUMENTS

| | | |
|---|---|---|
| CN | 86102079 A | 11/1986 |
| CN | 2044479 U | 9/1989 |

(Continued)

OTHER PUBLICATIONS

"Preloaded Dsaek Tissue" Product sheet, Eversight Services, revised Sep. 23, 2019, 1 page. https://www.eversightvision.org/wp-content/uploads/2019/10/Preloaded_DSAEK_23Sept19.pdf (last accessed Nov. 11, 2019).

(Continued)

*Primary Examiner* — Javier G Blanco
(74) *Attorney, Agent, or Firm* — Mintz Levin Cohn Ferris Glovsky and Popeo, P.C.

(57) ABSTRACT

A system for treating an eye comprising a tissue stored within a lumen of an elongated cannula, the tissue comprises scleral, amniotic membrane, or acellular biomatrix tissue and having an elongated form factor. Related devices, systems, and methods are provided.

19 Claims, 30 Drawing Sheets

(56) References Cited

U.S. PATENT DOCUMENTS

| | | |
|---|---|---|
| 5,941,250 A | 8/1999 | Aramant et al. |
| 6,036,678 A | 3/2000 | Giungo |
| 6,205,177 B1 | 3/2001 | Girod et al. |
| 7,207,965 B2 | 4/2007 | Simon |
| 7,291,125 B2 | 11/2007 | Coroneo |
| 7,815,592 B2 | 10/2010 | Coroneo |
| 7,850,638 B2 | 12/2010 | Theodore Coroneo |
| 7,909,789 B2 | 3/2011 | Badawi et al. |
| 8,128,588 B2 | 3/2012 | Coroneo |
| 8,167,939 B2 | 5/2012 | Silverstrini et al. |
| 8,337,393 B2 | 12/2012 | Silverstrini et al. |
| 8,353,856 B2 | 1/2013 | Baerveldt |
| 8,372,437 B2 | 2/2013 | Daniel |
| 8,444,588 B2 | 5/2013 | Yablonski |
| 8,444,589 B2 | 5/2013 | Silvestrini |
| 8,529,492 B2 | 9/2013 | Clauson et al. |
| 8,535,333 B2 | 9/2013 | de Juan, Jr. et al. |
| 8,617,139 B2 | 12/2013 | Silvestrini et al. |
| 8,672,870 B2 | 3/2014 | Silvestrini et al. |
| 8,721,656 B2 | 5/2014 | De Juan, Jr. et al. |
| 8,728,021 B2 | 5/2014 | Theodore Coroneo |
| 8,758,289 B2 | 6/2014 | Theodore Coroneo |
| 8,758,290 B2 | 6/2014 | Horvath et al. |
| 8,771,218 B2 | 7/2014 | Coroneo |
| 8,808,219 B2 | 8/2014 | Bergheim et al. |
| 8,852,137 B2 | 10/2014 | Horvath et al. |
| 8,932,205 B2 | 1/2015 | Silvestrini et al. |
| 8,945,038 B2 | 2/2015 | Yablonski |
| 8,961,617 B2 | 2/2015 | Young |
| 8,974,511 B2 | 3/2015 | Horvath et al. |
| 9,155,656 B2 | 10/2015 | Schaller et al. |
| 9,173,774 B2 | 11/2015 | Yaron et al. |
| 9,192,516 B2 | 11/2015 | Horvath et al. |
| 9,216,107 B2 | 12/2015 | Silvestrini et al. |
| 9,351,873 B2 | 5/2016 | Coroneo |
| 9,549,845 B2 | 1/2017 | de Juan, Jr. et al. |
| 9,554,940 B2 | 1/2017 | Haffner et al. |
| 9,554,941 B2 | 1/2017 | Silvestrini et al. |
| 9,585,789 B2 | 3/2017 | Silvestrini et al. |
| 9,592,151 B2 | 3/2017 | Rangel-Friedman et al. |
| 9,636,254 B2 | 5/2017 | Yu et al. |
| 9,788,999 B2 | 10/2017 | Schaller |
| 9,877,866 B2 | 1/2018 | Horvath et al. |
| 9,962,290 B2 | 5/2018 | Burns et al. |
| 9,987,472 B2 | 6/2018 | Tu et al. |
| 10,085,633 B2 | 10/2018 | Schaller et al. |
| 10,154,924 B2 | 12/2018 | Clauson et al. |
| 10,159,600 B2 | 12/2018 | Horvath et al. |
| 10,188,551 B2 | 1/2019 | Rangel-Friedman et al. |
| 10,285,853 B2 | 5/2019 | Rangel-Friedman et al. |
| 10,406,030 B2 | 9/2019 | Badawi et al. |
| 10,617,558 B2 | 4/2020 | Schieber et al. |
| 10,888,460 B2 | 1/2021 | Sorensen et al. |
| 10,905,591 B1 | 2/2021 | Ianchulev |
| 10,940,087 B2 | 3/2021 | Thorne et al. |
| 11,376,040 B2 | 7/2022 | Kalina, Jr. et al. |
| 11,426,307 B2 | 8/2022 | Jacob |
| 11,517,476 B2 | 12/2022 | Pinchuk |
| 2002/0133168 A1 | 9/2002 | Smedley et al. |
| 2002/0193886 A1 | 12/2002 | Claeson et al. |
| 2003/0139809 A1 | 7/2003 | Worst et al. |
| 2004/0167623 A1 | 8/2004 | Peyman |
| 2004/0254520 A1 | 12/2004 | Porteous et al. |
| 2007/0179455 A1 | 8/2007 | Geliebter et al. |
| 2007/0219564 A1 | 9/2007 | Rue et al. |
| 2008/0208176 A1 | 8/2008 | Loh |
| 2008/0221501 A1 | 9/2008 | Cote et al. |
| 2009/0143712 A1 | 6/2009 | Tu et al. |
| 2010/0125237 A1 | 5/2010 | Schocket |
| 2012/0035743 A1 | 2/2012 | Young et al. |
| 2014/0236066 A1 | 8/2014 | Horvath et al. |
| 2014/0379015 A1 | 12/2014 | Sorensen et al. |
| 2015/0065940 A1 | 3/2015 | Rangel-Friedman et al. |
| 2015/0238687 A1 | 8/2015 | Novakovic et al. |
| 2017/0095369 A1 | 4/2017 | Andino et al. |
| 2017/0258727 A1 | 9/2017 | Tseng et al. |
| 2018/0036173 A1 | 2/2018 | Olson et al. |
| 2019/0038399 A1 | 2/2019 | Muller |
| 2019/0336335 A1 | 11/2019 | de Juan, Jr. et al. |
| 2020/0390601 A1 | 12/2020 | Ianchulev |
| 2021/0022919 A1 | 1/2021 | Ianchulev |
| 2021/0361484 A1 | 11/2021 | Ianchulev |
| 2022/0001085 A1 | 1/2022 | Shi et al. |
| 2022/0378612 A1 | 12/2022 | Badawi et al. |
| 2022/0395397 A1 | 12/2022 | Chu |
| 2023/0000680 A1 | 1/2023 | Ianchulev et al. |
| 2023/0082713 A1 | 3/2023 | Ianchulev et al. |
| 2023/0101775 A1 | 3/2023 | Detry et al. |
| 2023/0248569 A1 | 8/2023 | Vandiest et al. |
| 2023/0255807 A1 | 8/2023 | Detry et al. |
| 2025/0169989 A1 | 5/2025 | Robson et al. |

FOREIGN PATENT DOCUMENTS

| | | |
|---|---|---|
| CN | 101099695 A | 1/2008 |
| CN | 102431830 A | 5/2012 |
| CN | 102481404 A | 5/2012 |
| CN | 104540472 A | 4/2015 |
| CN | 105236005 A | 1/2016 |
| CN | 105434103 A | 3/2016 |
| CN | 107847243 A | 3/2018 |
| CN | 109561987 A | 4/2019 |
| EP | 1268139 B1 | 10/2004 |
| GB | 2551102 A | 12/2017 |
| JP | 2013-059677 A | 4/2013 |
| JP | 2019-500130 A | 1/2019 |
| KR | 10-2114787 B1 | 5/2020 |
| WO | WO-2014/089548 A1 | 6/2014 |
| WO | WO-2017/108498 A1 | 6/2017 |

OTHER PUBLICATIONS

Einmahl et al. (2002). "Evaluation of a novel biomaterial in the suprachoroidal space of the rabbit eye" Invest Ophthalmol Vis Sci. 43:1533-1539.

Karlen et al. (Jan. 1999). "Deep sclerectomy with collagen implant: medium term results" Br. J. Ophthalmol, 83(1):6-11.

Krejcí L. (1974). "Microdrainage of anterior chamber of eye glaucoma operation using hydron capillary drain." Acta Univ Carol Med Monogr.; (61):1-90.

Larrañeta, E. et al. (2018). "Synthesis and characterization of hyaluronic acid hydrogels crosslinked using a solvent-free process for potential biomedical applications." Carbohydrate Polymers, 181, 1194-1205. https://doi.org/10.1016/j.carbpol.2017.12.015.

Murri, M. S. et al. (2018). "Amniotic membrane extract and eye drops: a review of literature and clinical application." Clinical Ophthalmology (Auckland, N.Z.), 12, 1105-1112.

Nesterov, AP et al. (1978). "Implantation of a scleral strip into the supraciliary space and cyclodialysis in glaucoma." Acta Ophthalmol (Copenh) 56(5):697-704.

Nesterov, AP et al. (1979). "Surgical stimulation of the uveoscleral outflow. Experimental studies on enucleated human eyes" Acta Opthalmol (Copenh) June; 57(3):409-17.

Regulatory Considerations for Human Cells, Tissues, and Cellular and Tissue-Based Products: Minimal Manipulation and Homologous Use. Guidance for Industry and Food and Drug Administration Staff. (Jul. 2020). 28 pages. Available at: www.fda.gov/regulatory-information/search-fda-guidance-documents/regulatory-considerations-human-cells-tissues-and-cellular-and-tissue-based-products-minimal. Web. Dec. 6, 2022.

Schepens, C.L. et al. (1991). "Scleral Implants: An Historical Perspective." Ophthalmol 35:447-453.

Sun S.Y. et al. (2008). "Therapeutic experience of avoiding faulty formation of anterior chamber after glaucoma operation." International Journal of Ophthalmology, 8(4); 838-840. [English abstract].

Yeu, E. et al. (2019). "Safety and efficacy of amniotic cytokine extract in the treatment of dry eye disease." Clinical Ophthalmology, 13, 887-894.

(56) References Cited

OTHER PUBLICATIONS

Zhao, C. et al. (2004). "Clinical observation of different implants in non-penetrating trabecular surgery," Journal of Clinical Ophthalmology, 04 2004-08-05; 356-358. [English abstract].

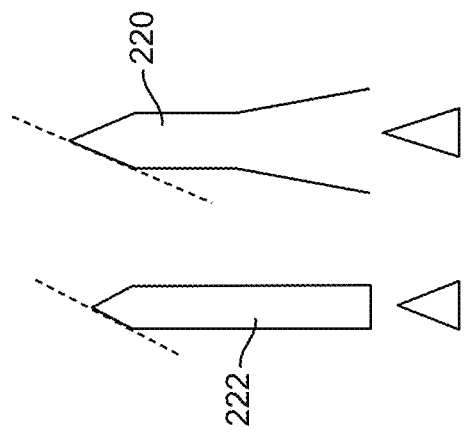
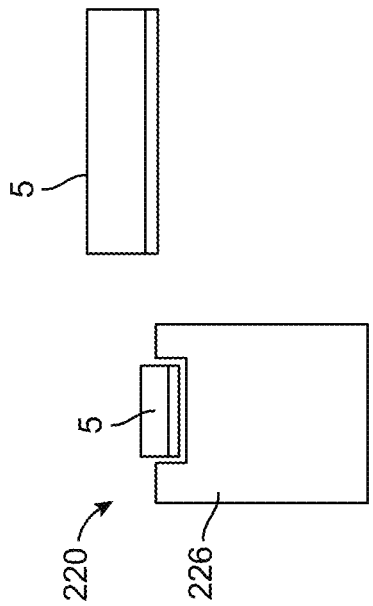
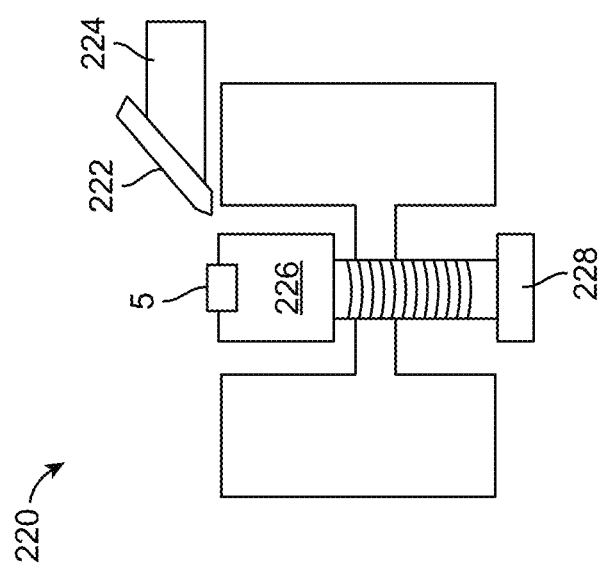
FIG. 5B
FIG. 5C
FIG. 5A

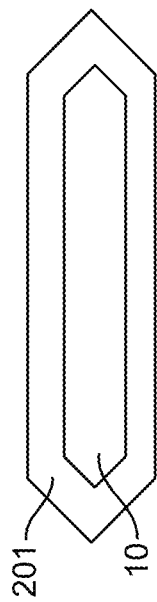
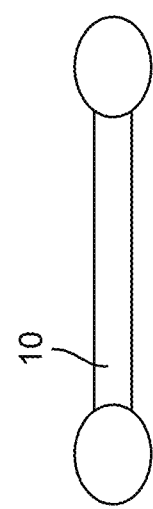
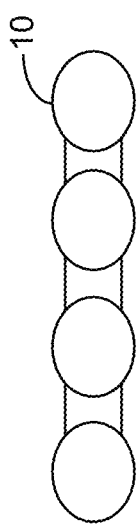
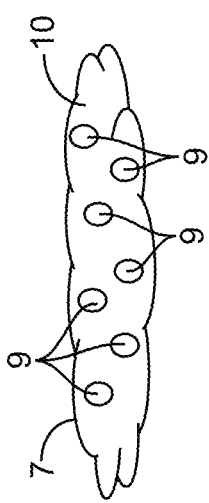
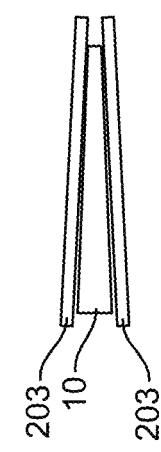
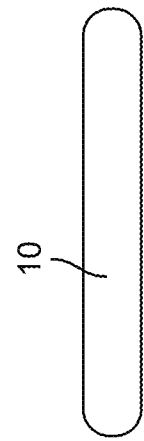
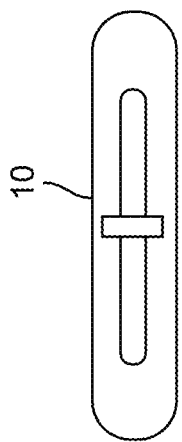
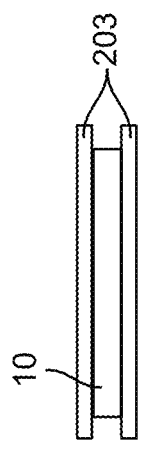
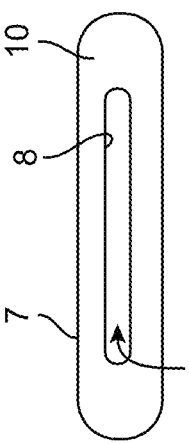

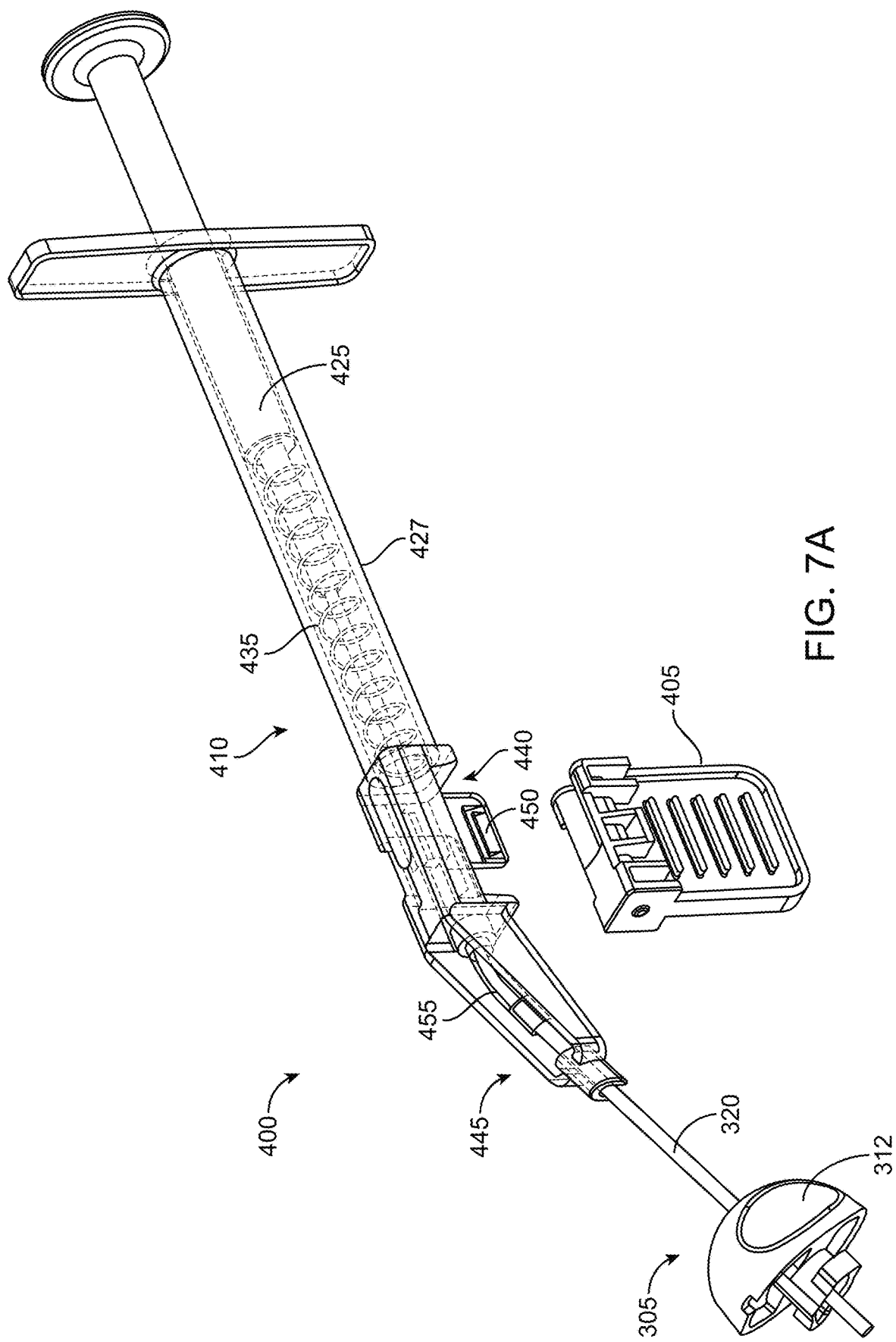

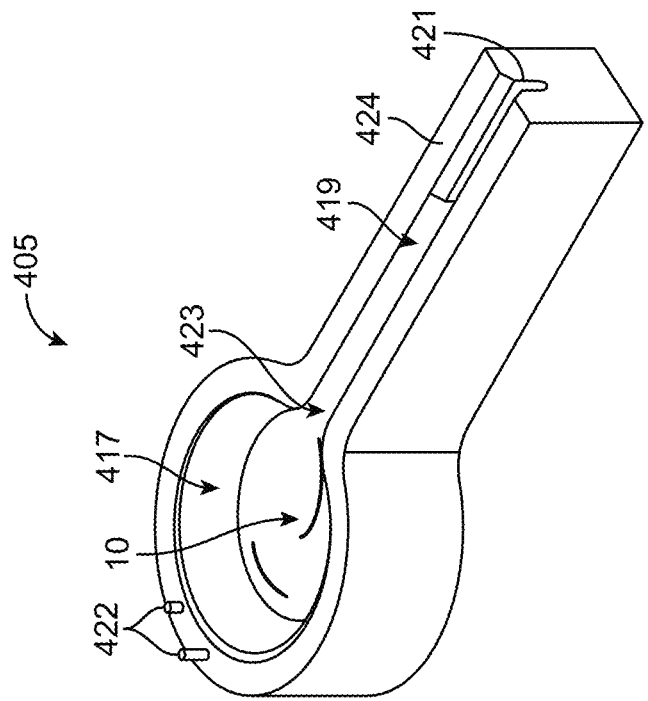
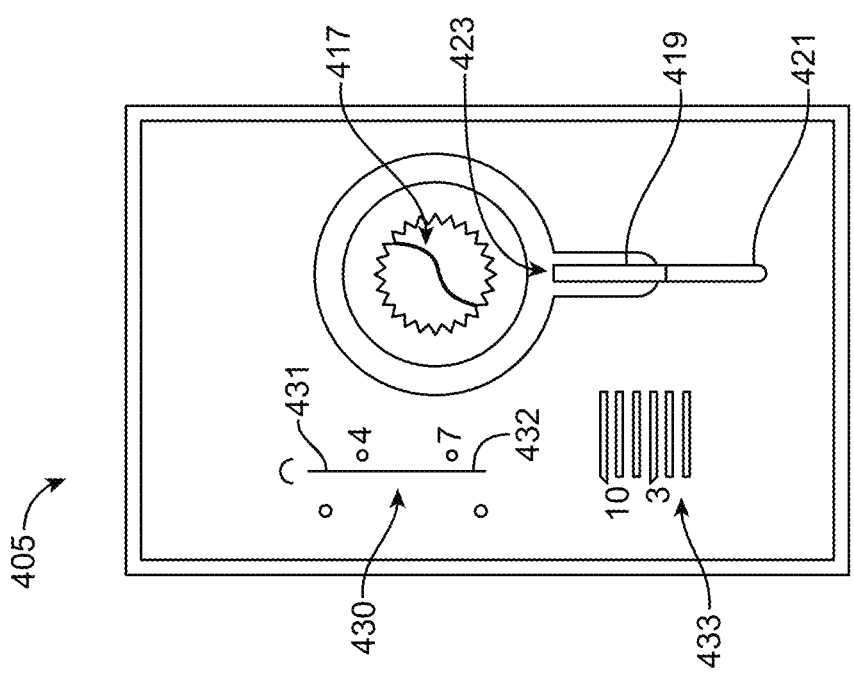
FIG. 8B
FIG. 8A

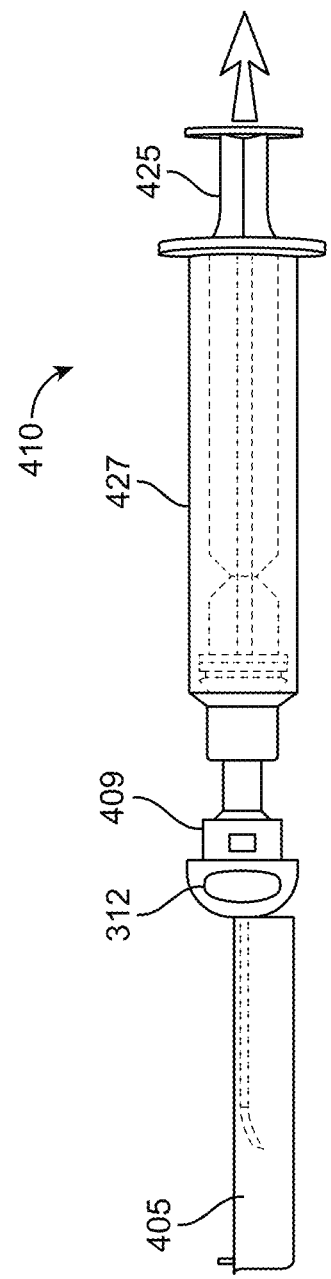
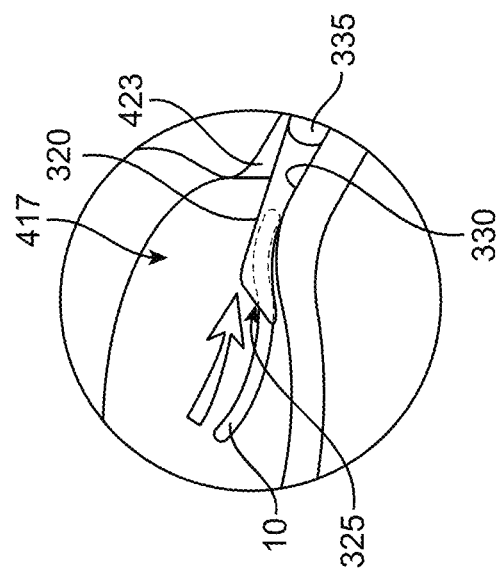
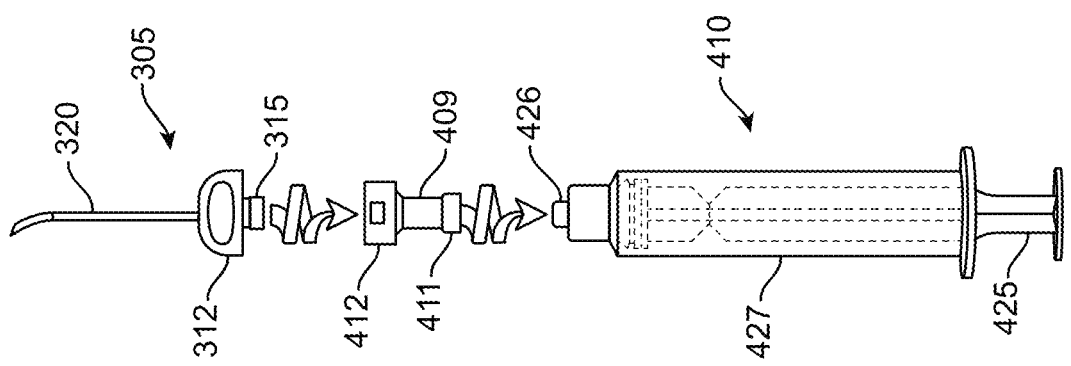
FIG. 9B
FIG. 9C
FIG. 9A

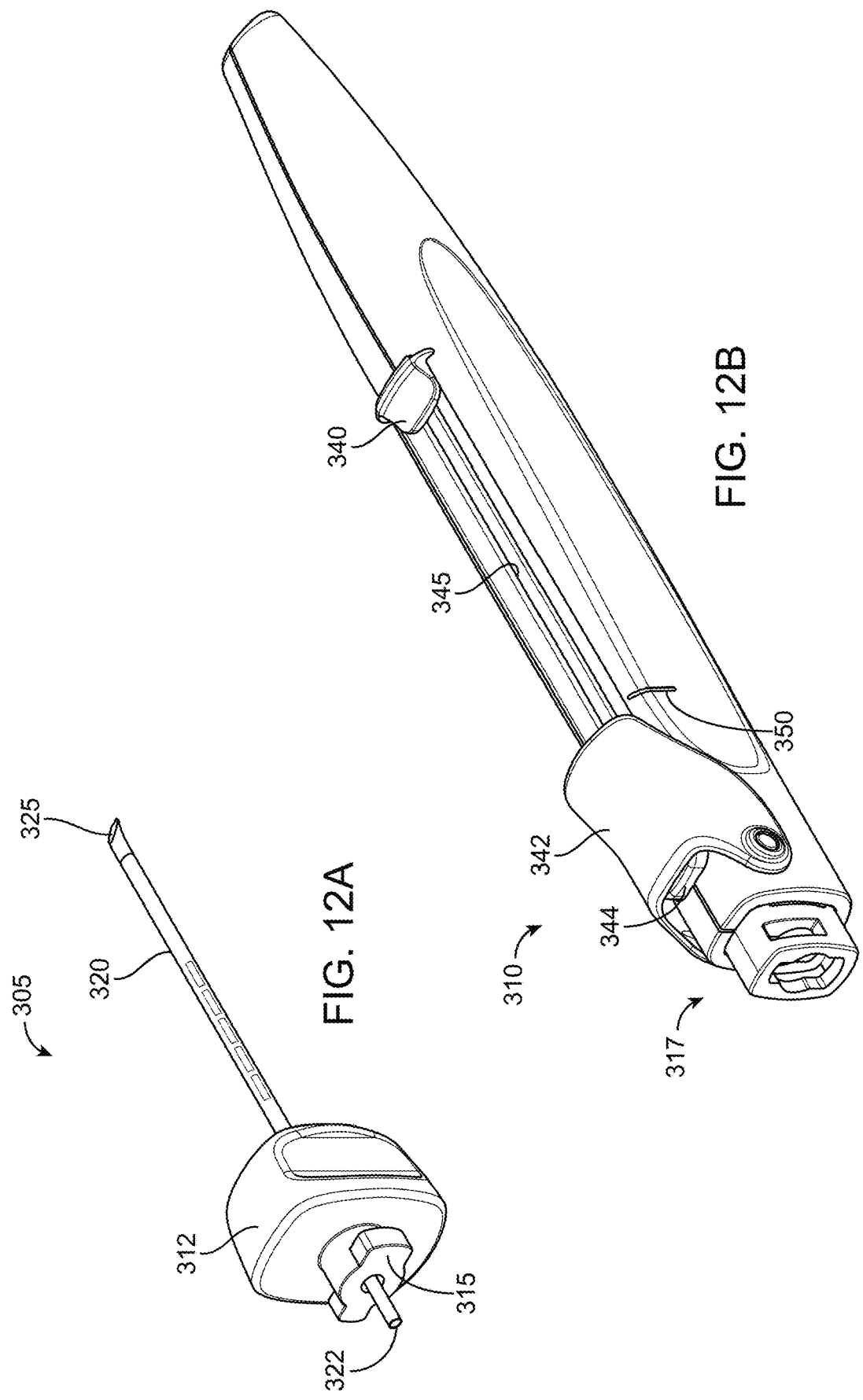

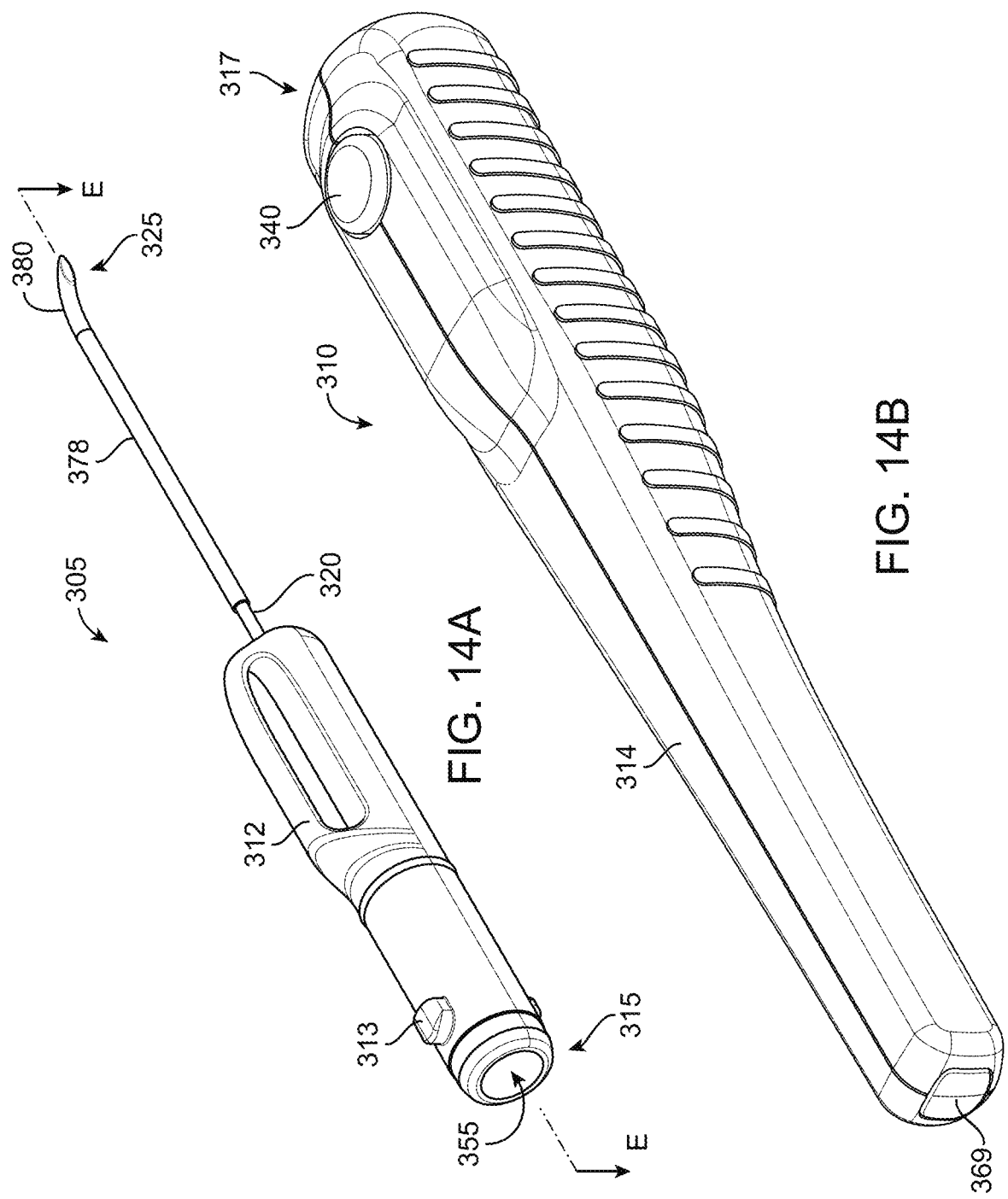

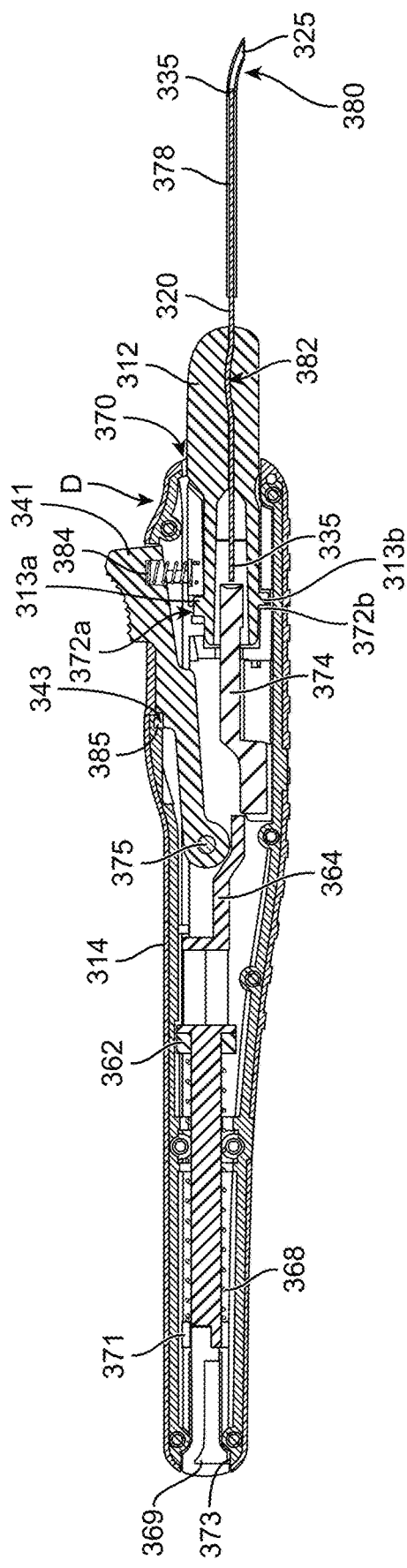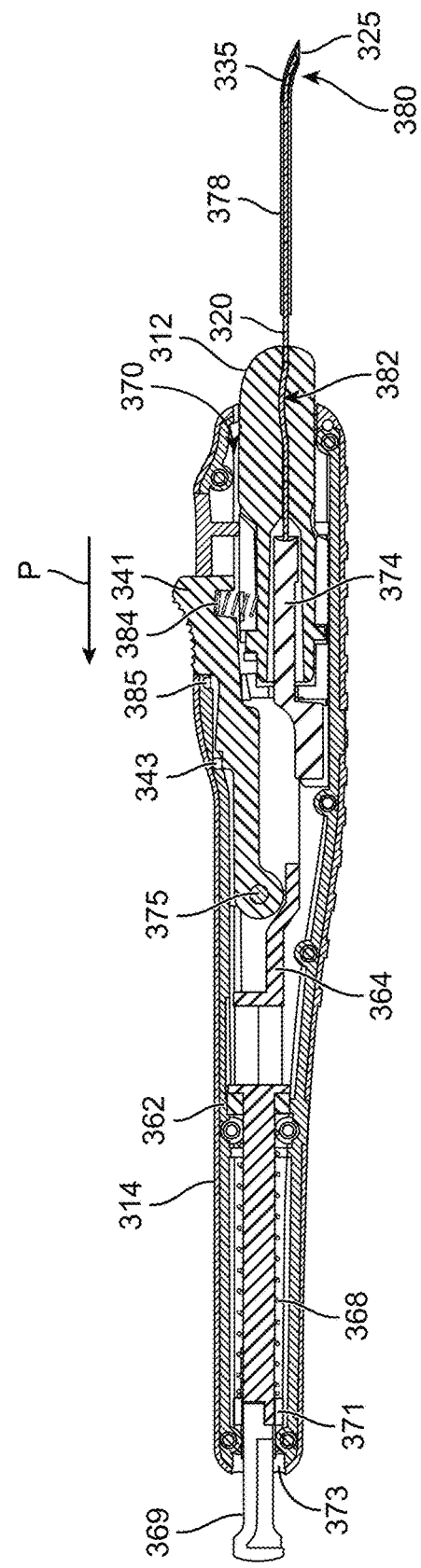
FIG. 15A
FIG. 15B

DEVICES AND SYSTEMS FOR CUTTING, LOADING, AND DELIVERING BIOLOGIC INTRAOCULAR IMPLANTS FOR INCREASED AQUEOUS OUTFLOW AND LOWERING OF INTRAOCULAR PRESSURE

CROSS-REFERENCE TO RELATED APPLICATIONS

This application is a continuation of U.S. patent application Ser. No. 19/100,424 filed Jan. 31, 2025, which is a 371 of International Application No. PCT/US2023/080677, filed on Nov. 21, 2023, and claims the benefit of priority to U.S. Provisional Application Ser. No. 63/427,552, filed Nov. 23, 2022; 63/488,920, filed Mar. 7, 2023; and 63/584,804, filed Sep. 22, 2023. The entire contents of these applications are incorporated by reference in their entireties.

BACKGROUND

The mainstay of ophthalmic surgery for glaucoma is the enhancement of aqueous outflow from the eye. There are various approaches to such surgery, including: 1) ab externo trabeculectomy or shunting, which involves cutting the conjunctiva and the sclera to penetrate the eye and provide a trans-scleral outflow path; 2) ab interno trabecular or trans-scleral outflow stenting or shunting of aqueous with hardware-based implantable devices or with ablating, non-implantable cutters such as dual-blade and trabectome; and 3) ab interno supraciliary stenting using implantable non-biological hardware implants.

Current ab interno stenting devices and methods are based on non-biological hardware materials such as polyimide, polyethersulphone, titanium, poly styrene-blocks-isobutylene-block-styrene and others. There are significant drawbacks with such non-biological hardware-based implantable devices as such devices can lead to major erosion, fibrosis and ocular tissue damage such as endothelial cell loss.

In view of the foregoing, there is a need for improved devices and methods related to ophthalmic surgery for the treatment of glaucoma.

SUMMARY

In an aspect, disclosed is a system for treating glaucoma of an eye including a trephining system having a cutter configured to cut a bio-tissue material into an implant. The bio-tissue material includes amniotic membrane tissue configured to elute one or more healing factors derived from the amniotic membrane tissue. The system includes a container having a reservoir sized to receive a volume of a liquid and a delivery system. The delivery system includes a cartridge having a nose cone having a coupler extending from a proximal end region of the nose cone. The delivery system includes a delivery cannula extending from a distal end region of the nose cone, the delivery cannula having a lumen and a distal opening into the lumen. The delivery system includes a proximal housing configured to engage the coupler of the cartridge.

The reservoir can be sized to suspend the implant in the volume of the liquid for the implant to be aspirated into the distal opening of the delivery cannula when the distal opening of the delivery cannula is positioned near the implant within the reservoir and vacuum is applied through the delivery cannula. The cartridge can be configured to couple to a vacuum source. The vacuum source can be configured to aspirate the implant into the distal opening of the delivery cannula when the vacuum source is coupled to the cartridge and activated. The vacuum source can include a syringe having a syringe barrel having a luer at a distal end and a plunger positioned within the syringe barrel. The trephining system can further include an adaptor having a first end sized and shaped to couple to the luer of the syringe and a second end sized and shaped receive the coupler of the cartridge.

The container can further include a loading channel extending outward from the reservoir, wherein the loading channel has a first end region configured to receive the distal end region of the delivery cannula and a second end that is in fluid communication with the reservoir. The container can further include a packing post having an outer diameter sized to be received within the distal opening of the delivery cannula. The proximal housing can further include a pusher extendable through the lumen of the delivery cannula towards the distal opening. The implant, once loaded within the delivery cannula and the cartridge coupled to the proximal housing, can be configured to be compressed between the packing post and the pusher of the proximal housing to expel the liquid that enters the delivery cannula during loading.

The system can further include a second bio-tissue material. The second bio-tissue material can include scleral tissue or corneal tissue. The liquid can be viscoelastic or saline. The implant can be sized to be received within the distal opening. The implant can be oversized relative to the lumen of the delivery cannula. The oversized implant can be compressed when positioned within the lumen of the delivery cannula and expands upon deployment in the eye and upon release from the lumen of the delivery cannula.

In an interrelated aspect, provided is a system for treating glaucoma including a first implant, a second implant, and a delivery cannula. The first implant is dehydrated bio-tissue cut into a first width sized to be received within a lumen of the delivery cannula. The first implant is configured to rehydrate upon deployment in an eye at an implant location to expand into a second width that is greater than the first width scaffolding the implant location. The second implant is amniotic membrane tissue configured to elute one or more healing factors derived from the amniotic membrane tissue near the implant location of the first implant.

In an interrelated aspect, provided is a method of treating glaucoma of an eye including implanting into a target location of the eye dehydrated bio-tissue cut into a first implant. The method includes implanting a second implant that is amniotic membrane tissue configured to elute one or more healing factors derived from the amniotic membrane tissue near the target location of the first implant. The method includes opening the target location of the first implant as the first implant expands from a first size to a larger size upon deployment in the eye; and facilitating outflow of aqueous from an anterior chamber of the eye.

In an interrelated aspect, provided is a system for treating an eye including a tissue stored within a lumen of an elongated cannula. The tissue is amniotic membrane tissue. The tissue can have a length greater than 3 mm. The tissue can have an outer dimension less than 3 mm. The tissue can have a length of about 2 mm-11 mm. The system can further include an impermeable membrane covering an opening from the lumen of the elongated cannula configured to prevent fluid loss. The elongated cannula having the tissue within the lumen can be packed in a radiation stable container. The elongated cannula can be straight or curved. The elongated cannula can further include a nose cone having a coupling mechanism on a proximal end of the nose cone.

The elongated cannula can project from a distal end of the nose cone. The system can further include a hand piece having a distal coupler configured to engage with the coupling mechanism on the nose cone forming a delivery system. The hand piece can be configured to deploy the tissue from the lumen into the eye. The elongated cannula can have a beveled distal tip at a distal opening from the lumen. The elongated cannula can include a material that is hydrophobic or hydrophilic.

In an interrelated aspect, provided is system for treating an eye including amniotic membrane tissue modified to have an elongate shape with a width of about 100-2000 microns and configured to elute one or more healing factors derived from the amniotic membrane tissue. The system can further include a trephine configured to modify the amniotic membrane tissue by cutting the amniotic membrane tissue into the elongate shape. The trephine can include a plurality of blades configured to make parallel cuts forming a plurality of strips, each strip having the elongate shape. The plurality of blades can be round and configured to rotate relative to a handle of the trephine. The plurality of blades can passively rotate as a user urges the trephine along the amniotic membrane tissue. The plurality of blades can be powered by a motor to rotate. The trephine can further include a base having a material having a durometer of between Shore 60A to Shore 60D. The system can further include an implant cartridge having an elongated cannula with a lumen extending between a proximal opening and a distal opening. The system can further include a loader for inserting at least one strip into the lumen of the elongated cannula. The loader can be arranged relative to the elongated cannula of the implant cartridge to position the at least one strip into the lumen through the distal opening. The loader can inject the at least one strip through the distal opening using positive pressure. The loader can aspirate the at least one strip through the distal opening using negative pressure.

In an interrelated aspect, provided is a system for treating glaucoma of an eye including a first bio-tissue material cut into a first implant sized and shaped for intraocular implantation at a target location in the eye; and a second bio-tissue material cut into a second implant sized and shaped for intraocular implantation at or near the target location in the eye. The first bio-tissue material can include scleral tissue or corneal tissue, and the second bio-tissue material can include amniotic membrane tissue configured to elute one or more healing factors derived from the amniotic membrane tissue near the target location in the eye.

The target location in the eye can be a suprachoroidal space, supraciliary space, Schlemm's canal, anterior chamber, posterior chamber, intravitreal, epiretinal, or subretinal location. The first implant can have an elongate shape with a length that is about 3 mm to about 11 mm, a width this is about 0.10 mm to about 3 mm, and a thickness that is about 0.05 mm to about 1 mm. The second implant can have an elongate shape with a length that is about 3 mm to about 11 mm, a width this is about 0.10 mm to about 3 mm, and a thickness that is about 0.05 mm to about 1 mm.

In an interrelated aspect, provided is a system for treating glaucoma of an eye including a trephining system having a cutter configured to cut a bio-tissue material into an implant; and a container having a reservoir sized to receive a volume of a liquid. The system further includes a delivery system including a cartridge and a proximal housing configured to engage the coupler of the cartridge. The cartridge can include a nose cone having a coupler extending from a proximal end region of the nose cone; and a delivery cannula extending from a distal end region of the nose cone, the delivery cannula having a lumen and a distal opening into the lumen.

The reservoir can be sized to suspend the implant in the volume of the liquid in order for the implant to be aspirated into the distal opening of the delivery cannula when the distal opening of the delivery cannula is positioned near the implant within the reservoir and vacuum is applied through the delivery cannula. The cartridge can be configured to couple to a vacuum source. The vacuum source can be configured to aspirate the implant into the distal opening of the delivery cannula when the vacuum source is coupled to the cartridge and activated. The vacuum source can include a syringe having a syringe barrel having a luer at a distal end and a plunger positioned within the syringe barrel. The trephining system can further include an adaptor having a first end sized and shaped to couple to the luer of the syringe and a second end sized and shaped receive the coupler of the cartridge. The container can further include a loading channel extending outward from the reservoir. The loading channel can have a first end region configured to receive the distal end region of the delivery cannula and a second end that is in fluid communication with the reservoir. The container can further include a packing post having an outer diameter sized to be received within the distal opening of the delivery cannula. The proximal housing can further include a pusher extendable through the lumen of the delivery cannula towards the distal opening. The implant, once loaded within the delivery cannula and the cartridge coupled to the proximal housing, can be compressed between the packing post and the pusher of the proximal housing to expel the liquid that enters the delivery cannula during loading. The system can further include the bio-tissue material. The bio-tissue material can be scleral tissue. The liquid can be viscoelastic or saline. The implant can be sized to be received within the distal opening. The implant can be oversized relative to the lumen of the delivery cannula. The oversized implant can be compressed when positioned within the lumen of the delivery cannula and expands upon deployment in the eye and upon release from the lumen of the delivery cannula.

In an interrelated aspect, provided is a system for treating glaucoma including an implant and a delivery cannula. The implant is dehydrated bio-tissue cut into a first width sized to be received within a lumen of the delivery cannula. The implant is configured to rehydrate upon deployment in an eye so as to expand into a second width that is greater than the first width.

In an interrelated aspect, provided is a method of treating glaucoma using dehydrated bio-tissue cut into an implant having a first size that expands to a larger size upon deployment in an eye. The larger size of the implant opens a space within the eye to improve outflow of aqueous from an anterior chamber.

In an interrelated aspect, provided is a method of preparing an implant for implantation into, and of inserting said implant into, an eye of a patient. The method includes cutting a patch of a material with a cutting member to form the implant from the patch. The method includes coupling a cartridge to an aspiration device. The cartridge includes a nose cone and a delivery cannula extending from a distal end of the nose cone. At least a distal end region of the delivery cannula is sized and shaped for insertion into an anterior chamber of the eye, wherein the delivery cannula comprises a lumen. The method includes submerging the distal end region of the delivery cannula into a volume of a viscous material containing the implant; and aspirating the implant into the lumen of the delivery cannula using the aspiration device.

The method can further include transferring the cartridge from the aspiration device to a delivery device; inserting the distal end region of the delivery cannula into the anterior chamber of the eye; positioning the distal end region of the delivery cannula adjacent eye tissue; and actuating the delivery device to deploy the implant from the of the delivery cannula through at least a portion of the lumen such that the implant engages the eye tissue. The method can further include delivering the viscous material through the delivery cannula.

In an interrelated aspect, provided is a system for treating an eye including a tissue stored within a lumen of an elongated cannula. The tissue can be scleral or acellular biomatrix tissue. The tissue can have a length greater than 3 mm. The tissue can have an outer dimension less than 3 mm. The tissue can have a length of about 2 mm-11 mm. The system can further include an impermeable membrane covering an opening from the lumen of the elongated cannula configured to prevent fluid loss. The elongated cannula having the tissue within the lumen can be packed in a radiation stable container. The elongated cannula can be straight or curved. The elongated cannula can further include a nose cone having a coupling mechanism on a proximal end of the nose cone. The elongated cannula can project from a distal end of the nose cone.

The system can further include a hand piece having a distal coupler configured to engage with the coupling mechanism on the nose cone forming a delivery system. The hand piece can be configured to deploy the tissue from the lumen into the eye. The elongated cannula can include a beveled distal tip at a distal opening from the lumen. The elongated cannula can include a material that is hydrophobic or hydrophilic.

In an interrelated aspect, provided is a system for treating an eye including scleral tissue modified to have an elongate shape with a width of about 100-2000 microns. The system can further include a trephine configured to modify the scleral tissue by cutting the scleral tissue into the elongate shape. The trephine can include a plurality of blades configured to make parallel cuts forming a plurality of scleral strips, each scleral strip having the elongate shape. The plurality of blades can be round and configured to rotate relative to a handle of the trephine. The plurality of blades can passively rotate as a user urges the trephine along the scleral tissue. The plurality of blades can be powered by a motor to rotate. The trephine can further include a base having a material with a durometer of between Shore 60A to Shore 60D. The blades can be canted to a bevel grind of the blades. The system can further include a plane configured to reduce a height of the scleral tissue. The system can further include an implant cartridge having an elongated cannula with a lumen extending between a proximal opening and a distal opening. The system can further include a loader for inserting at least one scleral strip into the lumen of the elongated cannula. The loader can be arranged relative to the elongated cannula of the implant cartridge to position the at least one scleral strip into the lumen through the distal opening. The loader can inject the at least one scleral strip through the distal opening using positive pressure. The loader can aspirate the at least one scleral strip through the distal opening using negative pressure.

In an interrelated aspect, provided is an ocular stent delivery system having an ocular stent and a cartridge containing the ocular stent. The cartridge includes a nose cone having a proximal end region and a distal end region; and an elongate shaft extending from the distal end region of the nose cone. The elongate shaft includes a cannula having a lumen extending between a proximal opening and a distal opening. The cannula has a curve located between the proximal opening and the distal opening. The cartridge includes a pusher positioned at least in part within the lumen of the cannula to span the curve. A proximal end of the pusher is located outside the proximal opening of the cannula and within the proximal end region of the nose cone. The system includes a proximal hand piece configured to couple with the cartridge. The proximal hand piece includes a housing defining a distal opening sized to receive the proximal end region of the nose cone; a carriage located within the housing and configured to releasably coupled to the proximal end region of the nose cone; and an actuation mechanism configured to retract the cartridge relative to the housing causing the pusher to deploy the ocular stent through the distal opening.

The actuation mechanism can include an actuator and a spring. The actuator can further include a first portion, a second portion, and a hinge, the hinge being fixed to the carriage. When the actuation mechanism is in an armed configuration, the carriage can be in a distal-most position relative to the housing, the spring compressed, and the first portion urged upward. The second portion of the actuator can be urged downward into engagement with the carriage. The second portion of the actuator can be urged upward into engagement with the housing. The system can further include a buttress fixed within a region of the housing near the distal opening, the buttress having a distal-facing bearing surface. Upon coupling the cartridge with the proximal hand piece, the proximal end of the pusher can be located adjacent the distal-facing bearing surface of the buttress. Actuation of the actuation mechanism can cause the carriage to move proximally through the housing. Movement of the carriage proximally through the housing can retract the cartridge relative to the buttress so that the distal-facing bearing surface of the buttress abuts the proximal end of the pusher preventing the pusher from retracting with the cartridge. The pusher can be held within the lumen of the cannula only by friction between the pusher and an inner surface of the cannula at the curve. A force of the spring can be greater than a force of the friction between the pusher and the inner surface of the cannula at the curve. A speed of carriage movement can be controlled by the spring. A speed of carriage movement can be controllable by a user with aid from the spring. The actuation mechanism can be configured to be re-armed for multiple actuations. The cartridge can further include an outer tube member extending over at least the distal opening of the cannula and forming a distal end of the elongate shaft. The outer tube member can be translucent or transparent. A distal end region of the outer tube member can be curved and define a distal opening of the elongate shaft. The ocular stent can be minimally-modified bio-tissue. The minimally-modified bio-tissue can be amniotic membrane tissue or scleral tissue or acellular biomatrix tissue having a dimension sized to be received within the lumen. The minimally-modified bio-tissue can be cut to about 2 mm to about 11 mm in length.

In some variations, one or more of the following can optionally be included in any feasible combination in the above methods, apparatus, devices, and systems. More details are set forth in the accompanying drawings and the description below. Other features and advantages will be apparent from the description and drawings.

BRIEF DESCRIPTION OF THE DRAWINGS

These and other aspects will now be described in detail with reference to the following drawings. Generally, the figures are not to scale in absolute terms or comparatively but are intended to be illustrative. Also, relative placement of features and elements may be modified for the purpose of illustrative clarity.

FIG. 5A is a schematic of an implementation of a plane of a trephination system;

FIG. 5B is a schematic showing example blade geometries of the plane of FIG. 5A;

FIG. 5C is a schematic showing a patch of a material to be planed;

FIG. 6D is an example of parallel blades of a cutter;

FIG. 6E is an example of non-parallel blades of a cutter;

FIG. 6F is an example of a die-cut punch of a cutter;

FIGS. 6G-6M are schematics showing example shapes of implants formed using a die-cut punch;

FIG. 7A is a perspective view of an implementation of a loading system incorporating a loader engaged with a cannula of an implant cartridge and a loading cartridge;

FIGS. 8A-8B are implementations of a container for suspending the implant for loading into a delivery cannula;

FIG. 9A is an exploded side view showing an adaptor for coupling a delivery cannula to a vacuum source;

FIG. 9B is an assembled side view of the delivery cannula inserted within a reservoir of the container of FIG. 8B for loading the implant;

FIG. 9C is a detailed view of the distal end region of the delivery cannula inside the reservoir to aspirate the implant;

FIG. 12A is a perspective proximal end view of an implant cartridge;

FIG. 12B is a perspective distal end view of a hand piece configured to mate with the implant cartridge of FIG. 12A;

FIG. 14A is a perspective proximal end view of an implant cartridge;

FIG. 14B is a perspective proximal end view of a hand piece configured to mate with the implant cartridge of FIG. 14A;

FIG. 15A is a cross-sectional view of a delivery system with the carriage in an armed configuration;

FIG. 15B is a cross-sectional view of the delivery system of FIG. 15A after retraction of the carriage;

Figure 1A:
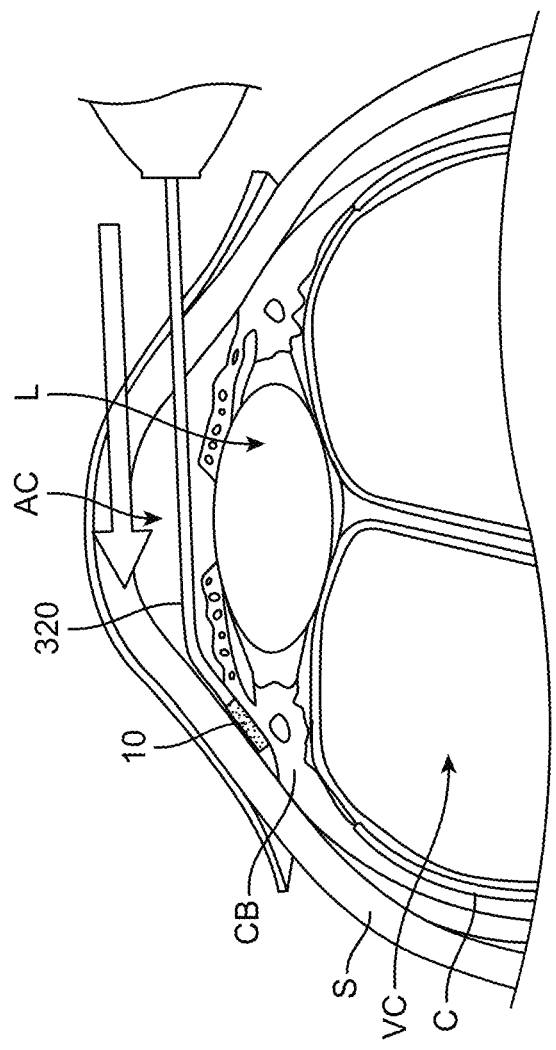
FIG. 1A is a cross-sectional view of a human eye showing the anterior and vitreous chambers of the eye with a biotissue stent being positioned in the eye in an example location.

It should be appreciated that the drawings are for example only and are not meant to be to scale. It is to be understood that devices described herein may include features not necessarily depicted in each figure.

DETAILED DESCRIPTION

Disclosed are implants, systems, and methods for increasing aqueous outflow from the anterior chamber of an eye and devices and systems for forming the implants. As will be described in detail below, ab interno outflow stenting using biological, cell-based or tissue-based materials provides biocompatible aqueous outflow enhancement with improved tolerability and safety over shunts in the art. In an example implementation, a biologic tissue or biologically-derived material is harvested or generated in vitro and formed into an implant, also referred to herein as a biotissue stent, using a cutting device, also referred to herein as a trephining device or cutting tool. In an implementation, the implant is an elongated body or material that has an internal lumen to provide a pathway for drainage. In a preferred implementation, the implant is an elongated body or strip of tissue that does not have an internal lumen and is configured to maintain the cleft and provide supraciliary stenting (or stenting within another anatomical location such as within Schlemm's Canal or trans-scleral). Lumen-based devices can be limited by the lumen acting as a tract for fibrotic occlusion. The stent formed from the tissue is then implanted into the eye via an ab interno delivery pathway to provide aqueous outflow from the anterior chamber. The stents described herein can be used as a phacoemulsification adjunct or stand-alone treatment to glaucoma as a micro-invasive glaucoma surgery (MIGS) treatment.

Use of the terms like stent, implant, shunt, bio-tissue, or tissue is not intended to be limiting to any one structure or material. The structure implanted can but need not be a material that is absorbed substantially into the eye tissue after placement in the eye such that, once absorbed, a space may remain where the structure was previously located. The structure once implanted may also remain in place for an extended period and not substantially erode or absorb.

As will be described in more detail below, the stents described herein can be made from biologically-derived material that does not cause toxic or injurious effects once implanted in a patient.

The term "biologically-derived material" includes naturally-occurring biological materials and synthesized biological materials and combinations thereof that are suitable for implantation into the eye. Biologically-derived material includes a material that is a natural biostructure having a biological arrangement naturally found within a mammalian subject including organs or parts of organs formed of tissues, and tissues formed of materials grouped together according to structure and function. Biologically-derived material includes tissues such as corneal, scleral, or cartilaginous tissues as well as acellular biomatrix tissue. Biologically-derived material includes amniotic membrane. Tissues considered herein can include any of a variety of tissues including muscle, epithelial, connective, and nervous tissues. Biologically-derived material includes tissue harvested from a donor or the patient, organs, parts of organs, and tissues from a subject including a piece of tissue suitable for transplant including an autograft, allograft, and xenograft material. Biologically-derived material includes naturally-occurring biological material including any material naturally found in the body of a mammal. Biologically-derived material as used herein also includes material that is engineered to have a biological arrangement similar to a natural biostructure. For example, the material can be synthesized using in vitro techniques such as by seeding a three-dimensional scaffold or matrix with appropriate cells, engineered or 3D printing material to form a bio-construct suitable for implantation. Biologically-derived material as used herein also includes material that is cell-derived including stem cell(s)-derived material. In some implementations, the biologically-derived material includes an injectable hyaluronate hydrogels or viscomaterials such as GEL-ONE Cross-linked Hyaluronate (Zimmer).

Biologically-derived materials can include naturally-occurring biological tissue including any material naturally found in the body of a mammal that is minimally manipulated or more than minimally manipulated according to FDA guidance under 21 CFR § 1271.3 (f) such that the processing of the biological tissue does not alter the relevant biological characteristics of the tissue (see Regulatory Considerations for Human Cells, Tissues, and Cellular and Tissue-Based Products: Minimal Manipulation and Homologous Use, www.fda.gov/regulatory-information/search-fda-guidance-documents/regulatory-considerations-human-cells-tissues-and-cellular-and-tissue-based-products-minimal).

The biologically-derived material, sometimes referred to herein as bio-tissue or bio-material, which is used to form the implant can vary and can be, for example, corneal tissue, scleral tissue, amniotic membrane tissue, cartilaginous tissue, collagenous tissue, or other firm biologic tissue. The bio-tissue can be of hydrophilic or hydrophobic nature. The bio-tissue can include or be impregnated with one or more therapeutic agents for additional treatment of an eye disease process.

The biologically-derived material can include or be capable of releasing one or more factors of the biologically-derived material for providing additional treatment of a disease or condition. For example, the material can be a tissue that releases healing factors derived from the tissue that have anti-fibrotic, anti-inflammatory, anti-neovascular effects, or the like for repair and regeneration at the site of implantation or near the site of implantation. The material can be whole amniotic membrane that releases one or more regenerative and anti-fibrotic factors that aid in the control of inflammation and scarring including, but not limited to VEGF (Vascular Endothelial Growth Factor), VEGF-R (VEGF Receptor), ANG1 (Angiopoietin 1), TIMP-1 (Collagenase inhibitor), TIMP-2 (Collagenase Inhibitor), IL-1B (Interleukin 1B), PDGF-AA (Platelet Derived Growth Factor), TGFb3 (Transforming Growth Factor Beta 3), bFGF (Basic Fibroblast Growth Factor), and HGF (Heptocyte Growth Factor). The amniotic membrane contains both growth promoting and growth inhibiting proteins (see, e.g., *Clinical Ophthalmology* 2019:13, 887-894).

The amniotic membrane tissue can be derived from amniotic sac of the placenta. The tissue can be freeze-dried, lyophilized membrane or otherwise minimally manipulated prior to implantation (see, e.g., SURGRAFT dehydrated amniotic sheets, or SURSIGHT ocular amniotic membrane allograft, Surgenex Scottsdale, AZ).

The amniotic membrane can be used as an adjunct treatment with a biostent as an implantable bio-eluting scaffold. The amniotic membrane can also be used alone as a primary treatment. The biostent alone or with amniotic membrane provided as an adjunct treatment can be implanted in any of a variety of locations including the suprachoroidal space, supraciliary space, Schlemm's canal, cornea, anterior chamber, posterior chamber, intravitreal, epiretinal, subretinal, or other part of the eye.

The bio-stent material can be used in combination with one or more therapeutic agents such that it can be used to additionally deliver the agent to the eye. In an implementation, the bio-tissue can be embedded with slow-release pellets or soaked in a therapeutic agent for slow-release delivery to the target tissue.

Non-biologic material includes synthetic materials prepared through artificial synthesis, processing, or manufacture that may be biologically compatible, but that are not cell-based or tissue-based. For example, non-biologic material includes polymers, copolymers, polymer blends, and plastics. Non-biologic material includes inorganic polymers such as silicone rubber, polysiloxanes, polysilanes, and organic polymers such as polyethylene, polypropylene, polyvinyls, polyimide, etc.

Regardless the source or type of biologically-derived material, the material can be cut or trephined into an elongated shape suitable for stenting and implantation in the eye. This cutting process of the tissue can be performed before the surgical implantation process or during the surgical implantation process. For example, the forming of the implant from the biotissue can be performed at a tissue bank or manufacturing facility remote from the surgical suite where the implant would be implanted into a patient. The implant can be pre-loaded within an implant cartridge and packaged for storage and transport at the manufacturing facility. The implant cartridge preloaded with the implant can be additionally designed to form part of the delivery system so that no transfer from the implant cartridge to another delivery tool is necessary.

The stent(s) implanted in the eye may have a structure and/or permeability that allows for aqueous outflow from the anterior chamber when positioned within a cyclodialysis cleft. The biologically-derived material can be minimally modified or minimally manipulated tissue for use in the eye. The minimally modified biologically-derived material does not involve the combination of the material with another article although water, sterilizing, preserving, cryopreservatives, storage agent, and/or pharmaceutical or therapeutic agent(s), and the like can be included. The minimally modified biologically-derived material does not have a systemic effect once implanted and is not dependent upon the metabolic activity of any living cells for its primary function. The biologically-derived material can be minimally manipulated during each step of the method of preparation and use so that the original relevant characteristics of the biologic tissue are maintained. The cut implant can be a structural tissue that physically supports or serves as a barrier or conduit, for example, by maintaining at least in part a ciliary cleft formed in the eye.

The implant cut from the biologically-derived material can be minimally manipulated such as by compressing, compacting, folding, rolling, or other sort of temporary manipulation of the cut implant that once freed from the forces applying the compression or compaction allows for the material to return towards its original structure. Thus, the minimal manipulation can mechanically change the size or shape of the cut tissue temporarily while still maintaining the original relevant characteristics of the tissue relating to its utility for reconstruction, repair, or replacement once freed from that mechanical change. As an example, the biologically-derived material can be sclera that is cut into a shape that is oversized in relation to an inner diameter of a delivery tube through which the implant is implanted. The minimal manipulation of the cut implant can include temporarily compacting the scleral material into a lumen of the delivery shaft such that after implantation in the eye, the cut implant tends to return towards its original cut size. Although the biologically-derived material is described herein in the context of being cut into a stent-like implant that can maintain a cleft for outflow of aqueous, other methods are considered herein. For example, the biologically-derived material can be compressed into a plug that is then implanted in a region of the eye for another purpose such as stenting, occlusion of traumatic ruptures, over-filtering bleb, posterior wall rupture, and other indications.

The minimal structural modification of the biological tissue (e.g., scleral tissue or corneal tissue or amniotic membrane) or other bio-tissue (cross-linked or not cross-linked) for implantable intraocular use can include a longitudinal trephination into an elongate strip of tissue having a width that is less than its length, for example, that can be more than 2 mm and less than 30 mm in length, as well as between about 0.1 mm and 2.0 mm in thickness, and between about 0.1 mm and 2.0 mm in width prior to loading within a delivery shaft. As will be described in more detail herein, the cutting of the bio-tissue allows for adjustment of the width being cut and can simultaneously compress the bio-tissue to a consistent thickness.

The minimal structural modification of the tissue can adjust a width of the tissue so as to form implants having a form factor that are elongate pellets, rods or strips suitable for insertion within an elongate delivery cannula. The elongate strips can have a length that is about 2-11 mm (e.g., a length greater than 3 mm) and a width that is less than 3 mm or less than 2 mm, for example, between 100-2000 microns. In addition to the length and the width, the height (i.e., thickness) of the tissue can also be modified by cutting. A plane can be used to cut the tissue down to an appropriate thickness so as to better fit within an inner diameter of the delivery cannula. The tissue can be planed from 1,500 microns thick down to about 50 microns thick.

The cut bio-tissue can be loaded in a manner that compresses the bio-tissue into a delivery channel for loading into a shuttle such as a nose cone assembly or cartridge as described herein. The cutting, loading, and transfer for delivery can be combined within a single assembly or can be performed by separate assemblies configured to work in conjunction with one another. One or more components of the assemblies described herein can be provided as a ready-to-use item. For example, the bio-tissue can be pre-cut and provided within a preloaded shuttle assembly or implant cartridge that is sold as a ready-to-use component or a partially ready-to-use component that is coupled with a delivery hand piece, for example. The bio-tissue can be cut and loaded at a site remote from the treatment facility, such as a tissue bank or manufacturing facility. The cut bio-tissue can be stored as a ready to use implant within a cartridge that is configured to couple to a delivery tool at the treatment facility.

FIG. 1A is a cross-sectional view of a human eye showing the anterior chamber AC, ciliary body CB, sclera S, vitreous chamber VC, lens L, and choroid C of the eye. At least one implant 10 can be positioned inside the eye in an implanted location such that at least a first portion of the implant 10 is positioned in or flush with the anterior chamber AC and a second portion of the implant 10 is positioned within tissues such as within the supraciliary space and/or suprachoroidal space of the eye. The implant 10 is sized and shaped such that the implant 10 can be positioned in such a configuration.

Figure 1B:
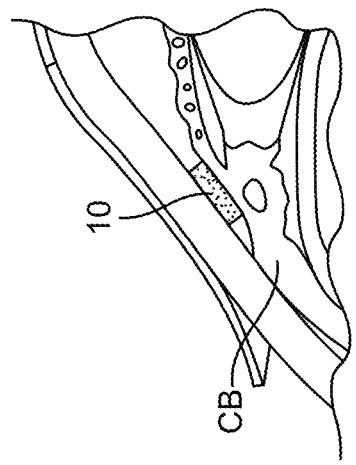
FIG. 1B is a detailed view of the eye in FIG. 1A following shape change of the stent deployed in the eye.

The implant 10 provides or otherwise serves as a passageway for the flow of aqueous humor away from the anterior chamber AC (e.g., to the supraciliary space and/or suprachoroidal space). In FIG. 1A, the implant 10 is represented schematically as an elongated body relative to a delivery cannula 320. The size and shape of the implant 10 can vary. Additionally, the size and shape of the implant 10 prior to insertion within the delivery cannula 320 can change upon insertion into the delivery cannula 320 and can change after deployment from the delivery cannula 320 (see FIG. 1B).

More than one implant 10 can be positioned within the eye during a procedure to improve outflow of aqueous from the anterior chamber. As will be described in more detail below, one or more pairs of implants 10 can be introduced and positioned adjacent to one another to form a longitudinal gap between them. The pairs of implants 10 form a scaffold that props open tissue of the eye creating a lake or reservoir of aqueous within the longitudinal gap. The reinforced suprachoroidal drainage reservoir can provide additional advantage over a single biostent that stents the ciliary body without forming a significant reservoir adjacent the stent. The creation of reservoirs or lakes within the suprachoroidal and/or supraciliary space is described below in more detail regarding FIGS. 17A-17B.

The implant 10 can be implanted ab interno, for example, through a clear corneal incision or a scleral incision. The implant can be deployed to create an opening or cleft for augmented outflow communication between the anterior chamber AC and the supraciliary space, the anterior chamber AC and the suprachoroidal space, the anterior chamber AC and Schlemm's Canal, or the anterior chamber AC and the sub-conjunctival space, or any other ocular compartment, tissue or interface where trans-scleral, sub-scleral, or suprascleral occlusion, stenting, and/or tissue reinforcing are clinically indicated. In a preferred implementation, the implant 10 is implanted such that a distal end is positioned within a supraciliary position and the proximal end is positioned flush with or at least partially within the anterior chamber AC to provide a supraciliary cleft. The distal end of the implant 10 can be positioned between other anatomical parts of the eye.

Glaucoma stenting devices are typically formed of non-biological materials such as polyimide or other synthetic materials that can cause endothelial tissue damage leading to progressive, long-term, and irreversible corneal endothelial loss. The materials described herein can reduce and/or eliminate these risks of tissue damage while still providing enhanced aqueous humor outflow.

The implant 10 described herein can be formed of any of a variety of biologically-derived materials having a permeability and/or structure that allows for aqueous filtration therethrough. The implant 10 can be formed of a biologically-derived material that is harvested, engineered, grown, or otherwise manufactured. The biologically-derived material can be obtained or harvested from a patient or from donors. The biologically-derived material can be harvested during surgery or, preferably, before surgery such as at a tissue bank or other manufacturing facility. The biologically-derived material can be synthetic bio-tissue created using in vitro techniques. The biologically-derived material can be stem cell generated or bioengineered. The tissue can be generated via in situ cellular or non-cellular growth. The biologically-derived material can be minimally manipulated material and/or retain its original structural characteristic as a tissue.

In an example implementation, the implant 10 is made of a bio-tissue. The biologically-derived material can be corneal tissue or non-corneal tissue such as sclera, collagen, or cartilage tissue. In an implementation, the biologically-derived material can be denuded corneal stromal tissue without epithelium and endothelium that is porous and has hydrophilic permeability to allow aqueous filtration. The biologically-derived material can be minimally manipulated sclera that retains its original structural characteristic as a tissue. The biologically-derived material of the implant 10 can but need not be incorporated into the eye's inherent anatomy after placement in the eye. The implant can cause the surrounding tissue to form a pathway that remains open for an extended period, even after absorption of the stent. The biologically-derived material may not significantly absorb or be incorporated into the eye's anatomy such that the implant 10 remains implanted for an extended period of time or indefinitely, as needed.

The biologically-derived material need not originate from the eye (e.g., sclera or corneal tissue). For example, the biologically-derived material can be amniotic membrane. The amniotic sac surrounding a fetus includes the amnion and chorion, both derived from the inner layer of the placenta. The amniotic membrane is part of the amnion and includes a layer of epithelial cells, a basement membrane, and an avascular stromal matrix. Amniotic membrane contains pluripotent cells, highly organized collagen, anti-fibrotic and anti-inflammatory cytokines, immune-modulators, growth factors, and matrix proteins and can promote healing in eyes (Murri et. al. *Clin. Ophthalmol.* (2018) 12:1105-1112). While implanted, the amniotic membrane can act as a spacer or tissue reinforcer or adjunct to another structural element (e.g., scleral biostent) while releasing factors useful for tissue repair and regeneration. The amniotic membrane bio-absorbs from at least about 3 to 4 weeks up to about 3 to 6 months. After being absorbed, a structural footprint or reservoir or channel remains in the implantation location. That structural footprint can be in the suprachoroidal space, supraciliary space, or Schlemm's canal, which can aid in improving aqueous outflow from the eye. The structural footprint can be created in other locations for other ocular treatments, such as in the anterior chamber, anterior angle, posterior chamber, intravitreal, epiretinal, subretinal, corneal, scleral, or other sites to treat a variety of other eye conditions, such as uveitis, endothelial loss, intraocular inflammation, etc. Thus, implants formed of amniotic membrane can be used to create a semi-permanent spacer and also be used for delivery of beneficial diffusible factors from the tissue that can be helpful against a variety of conditions. The implants formed of amniotic membrane can be implanted alone as a primary treatment or in combination with another biotissue implant(s) formed of other materials (e.g., sclera) as an adjunct anti-fibrotic or anti-inflammatory treatment with temporary scaffolding, which will be described in more detail below. Where the biotissue stent is described herein as being derived from scleral or another ocular biotissue, amniotic membrane tissue is also considered.

As mentioned, the biologically-derived material can have a permeability or porosity that allows for aqueous filtration for sufficient control or regulation of intraocular pressure. Permeable bio-tissues described herein (e.g., sclera, cornea, collagen, amniotic membrane, etc.) are preferred materials. Any bio-tissue, even if impermeable, is considered herein as a potential material to serve as a structural spacer that keeps the cyclodialysis open. Preferably, the material of the implant can create a gap that allows fluid to flow. The gap created can run longitudinally along each side of the stent. Where one or more pairs of implants are introduced so that each implant of the pairs of implants are positioned adjacent to one another to form a longitudinal gap between them, the gap created that runs longitudinally along each side of the stent can be widened into a lake or reservoir of aqueous. The pairs of implants form a scaffold that props open tissue of the eye between the implants that is wider than can be achieved by a single implant. For example, a second implant can be positioned at least an implant width away from the first implant to create a corresponding sized longitudinal gap to act as an aqueous filtration reservoir. The implants can be positioned at least about 50 microns up to about 3,000 microns away from one another to maintain a scaffold of the tissue between the implants. If the material of the implant is permeable, more fluid can pass through the cyclodialysis than if the material is impermeable and the fluid passes along the outside of the stent. Thus, the material considered herein need not be porous to provide the desired function. The function can be enhanced by the porosity of the material.

Generally, the biologically-derived material has some firmness and intraocular durability such that it can maintain outflow from the anterior chamber and is less stiff than non-biologically-derived polyimide shunts used in the treatment of glaucoma (e.g., CYPASS, Alcon). The material may have a sufficient structure to serve as a spacer to prop open a sustained supraciliary outflow. The material can maintain its structural height or thickness once implanted within the cyclodialysis such that fluid flow through or around the implant is provided. In some implementations, the cut implant is minimally manipulated by compressing or compacting into a delivery shaft so that the size and/or shape of the cut implant is reduced from a first size into a second, smaller size within the shaft. In other implementations, the implant is cut from tissue that is dehydrated such as using 95% Ethyl alcohol or lyophilizing. The implant has a smaller size while dehydrated that increases by at least 50% up to about 150% following hydration, such as upon deployment in the eye.

The delivery cannula can be sized and shaped to be inserted through a cornea (such as a self-scaling incision in a cornea) into the anterior chamber and advanced towards the iridocorneal angle. The delivery cannula can deploy the implant between tissue layers near the angle. Once the implant 10 is deployed from the delivery cannula, if compacted while inside the delivery cannula, it can begin to return towards its original shape and/or size such as by relaxing from the compacted configuration. The implant 10, if dehydrated while in the delivery cannula, may swell in size once deployed in the eye due to rehydration of the tissue. The cut implant, once implanted, can take on a shape and/or size that is smaller from its original shape and/or size or that is the same as its original shape and/or size. The minimally-modified biological tissue can be used to treat glaucoma. Biologically-derived implant material provides advantages in terms of biocompatibility, anatomic conformity, and aqueous permeability compared to non-biological materials such as polyimide. Biologically-derived implant material can provide better conformability and compliance to the scleral wall and can be less likely to cause endothelial and scleral erosion/loss over time and with chronic eye rubbing and blinking.

The term "patch" or "patch of material" as used herein refers to a piece of biologically-derived material having a size along at least one dimension that is greater than a size of the implant cut from the patch of material and implanted in the subject. In some implementations, the patch of material can have a first shape and the implant cut or trephined from the patch of material can have a second, different shape. For example, the patch of material can be about 7 mm wide×7 mm long×0.55 mm thick and the implant cut from the patch of material can be 0.3-1.0 mm wide×7 mm long×0.55 mm thick. The dimensions of the patch of material and the cut implant can vary. The patch of material prior to cutting can be between about 5 mm to about 10 mm wide, between about 5 mm up to about 10 mm long, and between about 0.25 mm to about 2 mm thick, preferably about 0.4 mm-0.7 mm thick. The implant cut from the patch of material can be between about 0.3 mm up to about 2 mm wide, preferably between 0.7 mm to 1.0 mm wide. The implant cut from the patch of material can be between about 5 mm up to about 10 mm long. The implant cut from the patch of material can be between 0.25 mm to about 2 mm thick. The implant upon implantation and/or upon exposure to a liquid can change from a width of about 550 μm up to a width of about 1,000 μm. The implants upon deployment in the eye can increase in size by at least 1.2×. In other words, the implant upon deployment can be at least 20% larger (1.2× the original size) compared to the original size prior to deployment. Preferably, the implants increase in size by at least 1.3×, 1.4×, 1.5×, 1.6×, 1.7×, 1.8×, 1.9×, 2× up to about 3× the original size and anywhere in between. The patch of material and the cut implant can each have the same length and the same thickness but differ from one another in width. The patch of material and the implant cut from the patch of material can also have different lengths and thicknesses. For example, the patch of material can have a first thickness and the implant cut from the patch of material have the same thickness, but when implanted can swell or be folded or rolled into a different thickness from the patch of material.

The cut implant need not be rectangular in shape and can have a non-rectangular shape such as an angular wedge or any of a variety of shapes to provide a particular clinical result. For example, an implant cut to the shape of a "dog bone" having enlarged distal and proximal ends may provide additional fixation within the target tissues. The implant can be cut to have a narrow elongate shape on a leading end and an enlarged dimension on a trailing end to provide case of insertion as well as at least one end providing fixation.

The form factor of the cut implants can vary as described elsewhere herein. For example, the tissue can be amniotic membrane tissue formed into a disk, pellet, plug, or rod shape for implantation in the eye or another location of the body to provide release of healing factors from the tissue and structural support of the target implantation location. The size of the shape can vary depending on the target implantation location. As an example, the implant can be cut from a disk of biologic material having a diameter that is about 5 mm, 8 mm, 10 mm, 11 mm, 12 mm, 14 mm, up to about 15 mm into an implant having a different shape, such as an elongate rod shape that is about 1-7 mm in length and about 0.5-4 mm wide. The implant can have the same thickness as the starting materials (e.g., about 0.05-0.7 mm thick) or can be planed from a first thickness to a second, smaller thickness. The rod shape can be about 3 mm or less in thickness and about 8 mm or less in length as described elsewhere herein. The thickness and the lengths can vary depending on the location of implantation. The implant can be formed of a single tissue type but made into different shapes or dimensions. The different dimensioned implants can be positioned at a target location to achieve a particular combination of structural reinforcement of the target location and, in the case of amniotic membrane tissue, release of healing factors at the site. A combination of tissue types can be implanted together in any of a variety of combinations to provide a desired reinforcement and/or release of healing factors at the target site. For example, amniotic membrane stents and scleral tissue stents can be used in combination, which will be described in more detail below.

In some implementations, the patch of material can be a relatively larger width (e.g., 10 mm×10 mm) and the implant cut from the patch to a strip having a much smaller width (e.g., about 1.0 mm to about 1.5 mm) and the cut implant then compacted into a delivery conduit having an inner diameter of about 0.8 mm so that the width of the implant substantially fills the inner diameter. An implant can substantially fill the inner diameter of the delivery conduit even if the implant is not oversized relative to that conduit and thus, remains uncompacted. The implant can be oversized relative to the inner dimension of the conduit and be compacted into the conduit to substantially fill it. The implant in its rehydrated state can be oversized relative to the inner dimension of the conduit although in its dehydrated state can be less than the inner dimension of the conduit. This allows for easy sliding of the implant within the conduit prior to and during stages of deployment and maximum stenting following deployment once it rehydrates in the eye. Additionally, the dimension of the cut implant can vary depending on the dimension of the cannula the implant is to be deployed through. For example, the inner diameter of the delivery cannula can be about 300 microns up to about 2800 microns, or about 600 microns to about 800 microns. In some implementations, the delivery cannula is a hypotube having an inner diameter that is less than about 900 microns down to about 228 microns (about 0.009"). The dimensions of the delivery cannula can vary depending on the initial size of the implant and whether the delivery cannula is intended to be delivered ab interno through the cornea or another route of delivery. It may be desired to deliver the implants described herein in an ab externo manner via a scleral flap. In ab externo delivery, the outer diameter of the cannula can be larger compared to a delivery cannula configured to be inserted through a self-sealing corneal incision where minimizing the size is preferred. Where the delivery of the implants is performed through the anterior chamber via a corneal incision, other approaches are considered as well. Thus, the implant can be cut or trephined to any of a variety of sizes depending on whether the implant is to be compacted into the delivery conduit and depending upon the inner dimension of that delivery conduit.

The implant cut from the patch of material can have a width, a length, and a thickness (sometimes referred to herein as a "height" of the tissue). In an implementation, the width of the implant cut from the patch of material using the cutting devices described herein can be at least 100 microns up to about 1500 microns, or between 100 microns up to 1200 microns, or between 100 microns and 900 microns, or between 300 microns and 600 microns. The implant cut from a patch of material can have a width of at least about 100 microns and a width of no more than 1500 microns, 1400 microns, 1300 microns, 1200 microns, 1100 microns, 1000 microns, 900 microns, no more than 800 microns, no more than 700 microns, no more than 600 microns, no more than 500 microns, no more than 400 microns, no more than 300 microns, or no more than 200 microns. The length of the implant cut from a patch of material can vary depending on the location of implantation. In some implementations, the implant has a length that is between 1 mm and 10 mm, or more preferably between 3 mm and 8 mm long. The thickness of the implant cut from the patch of material can be from 100 microns up to about 1,200 microns, or from 150 microns up to about 600 microns. In an implementation, the biological material forming the implant can have a thickness that is no smaller than 100 microns and no larger than 5 mm. The thickness of the implant can depend upon the particular patch of material being used. The thickness of the implant can also be modified by planning the tissue at the time of modifying. The tissue can thus be cut to have, a particular length and a particular width by trephining as well as a particular thickness by planning. The thickness of the implant can also depend on whether the implant is folded or rolled upon implantation such that a patch of material having a thickness of just 250 microns can cut into an implant and the implant folded at implantation to double the thickness to about 500 microns. The thickness of the implant can also depend upon what biologically-derived material is used. For example, scleral tissue or corneal tissue can often have a thickness of around 600 microns, but following harvest can shrink to about 250-400 microns. As such, an implant cut from a shrunken patch of corneal tissue may have a thickness of just 250 microns. An implant cut from a dehydrated sclera or cornea, or other tissue may have a maximum thickness of about 600 μm and a hydrated maximum thickness of about 1000 μm.

In some implementations, which is described in more detail below, the implant cut from the patch of material is cut to substantially fill the conduit through which it is advanced for delivery. In other implementations, the implant can be oversized relative to a dimension of a conduit through which it is deployed. In this implementation, the implant can be cut to have a first size, which is oversized compared to the inner dimension of the delivery conduit. The oversized implant can be primed within the delivery conduit such as by compacting or compressing with a tool so that the implant when primed within the conduit takes on a second, smaller size. Upon deployment in the eye and release of the implant from the delivery conduit, the implant may achieve a third size approaching its original first size. The third size can be due to the implant that was compacted relaxing back towards it uncompacted size. The third size can be due to the implant that was dehydrated within the delivery cannula being rehydrated by the bodily fluids once deployed within the eye.

In a non-limiting example, bio-tissue implant has dimensions no smaller than 0.1 mm and no larger than 8 mm in any direction and a thickness of not smaller than 50 microns and not larger than 8 mm. In a non-limiting example, the implant is about 6 mm in length by 300-600 microns wide by 150-600 microns thick. The cutting can be no smaller than 1 mm and no larger than 8 mm in any direction. In a non-limiting example, the cut tissue has dimensions of 100-800 microns in width and 1 mm-10 mm in length. Multiple implants may be delivered to one or more target locations during an implantation procedure.

Figure 2A:
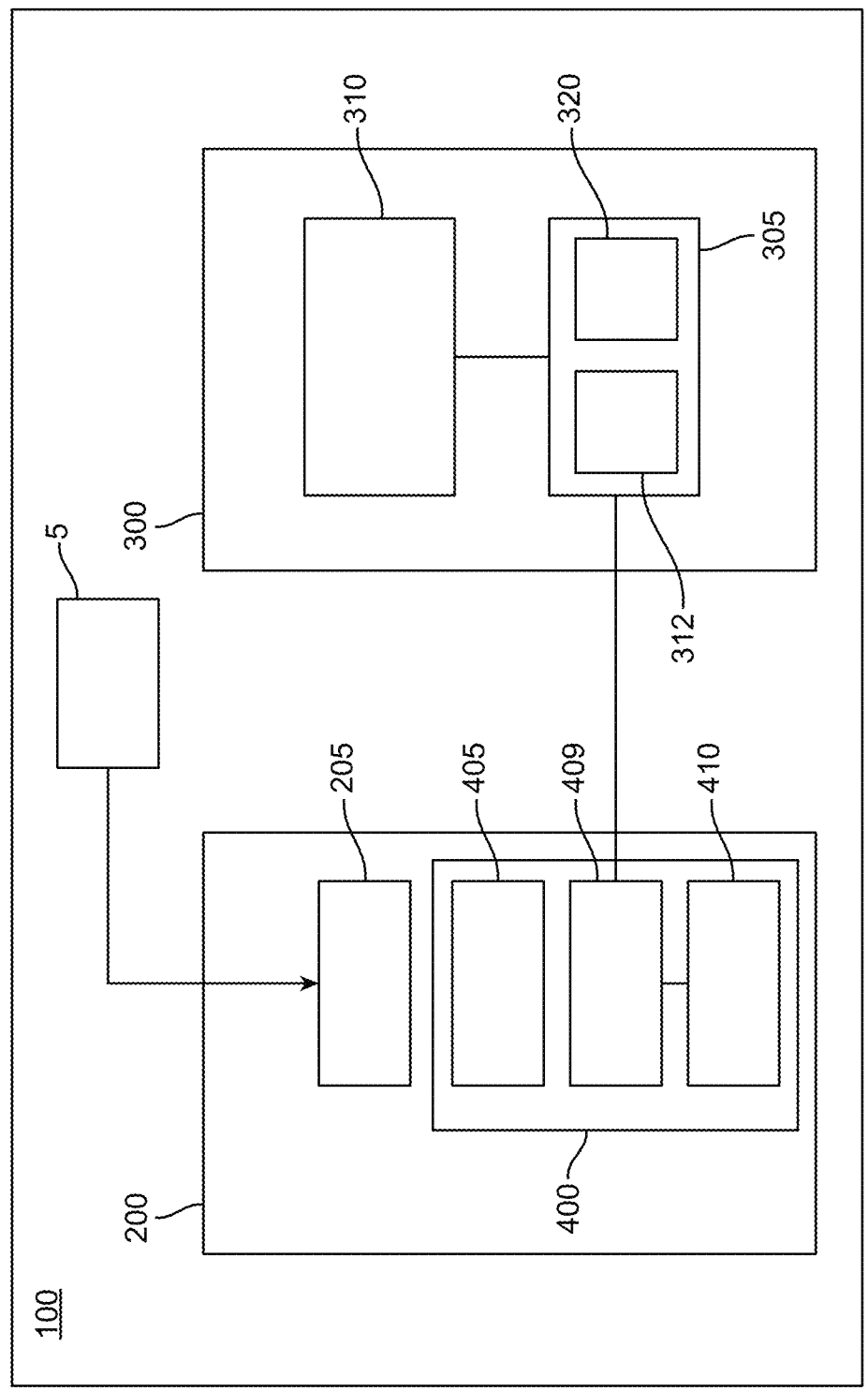
FIG. 2A is a box diagram illustrating a treatment system including a trephination system and a delivery system.
Figure 2B:
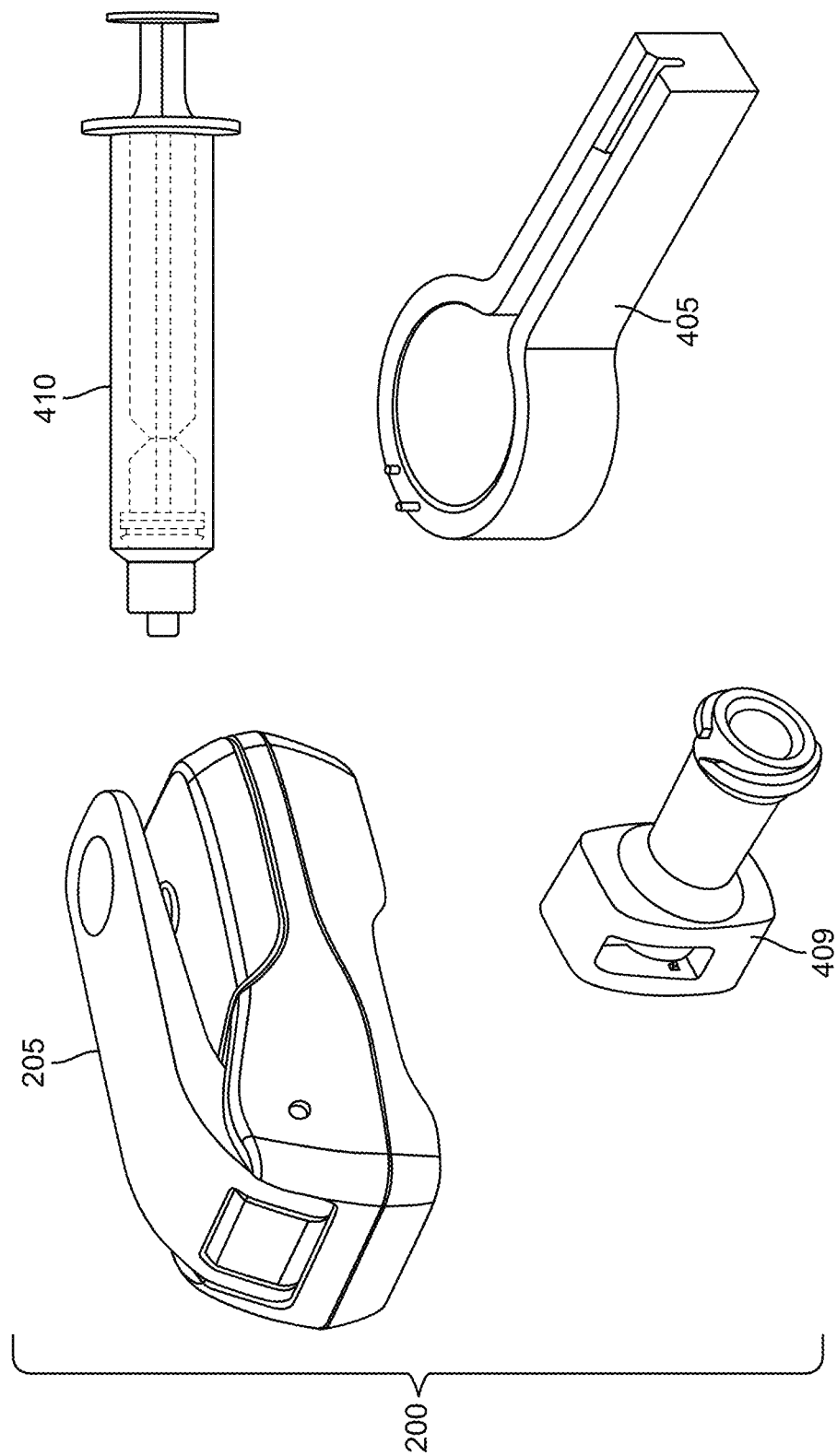
FIG. 2B is an implementation of the treatment system of FIG. 2A.

Turning now to the drawings, FIG. 2A is a box diagram showing an implementation of a treatment system 100. FIG. 2B shows and implementation of the treatment system 100 of FIG. 2A. The treatment system 100 can include one or more of a trephination system 200 and a delivery system 300. The treatment system 100 can additionally incorporate a bio-tissue material 5 such as the bio-tissues described elsewhere herein that are configured to be shaped such as by the trephination system 200 for formation into an implant 10. The trephination system 200 can include a cutter or trephine 205. The trephine 205 of the trephination system 200 is configured for excision modification and shaping of a bio-tissue material 5 into an implant 10 for ocular implantation. The trephination system 200 can further incorporate a loading system 400 configured to hydraulically load the implant 10 into the implant cartridge by applying negative pressure or positive pressure. An implementation of the loading system 400 can include a container or loading cartridge 405 for holding the implant 10 to be loaded in the cannula 320. The loading system can also include a loader 410 that can be a vacuum source for applying aspiration or negative pressure through the cannula 320 for loading the cut implant 10 into the delivery system 300. The loading system 400 can also incorporate an adaptor 409 to couple the cannula 320 to the loader 410. Once cut, the implant 10 is positioned within the loading cartridge 405 in order to be transferred to the delivery system 300 using aspiration applied by the loader 410, for example, a syringe.

Still with respect to FIGS. 2A-2B, the delivery system 300 can include an implant cartridge 305 reversibly coupled to a proximal housing or hand piece 310. The implant cartridge 305 reversibly couples to the proximal hand piece 310 via a coupler on a proximal end of the implant cartridge 305 that is configured to engage a corresponding coupler on a distal end of the proximal hand piece 310. The implant cartridge 305 includes a nose cone 312 and a shaft projecting distally from the nose cone 312. The shaft can be formed of at least one tubular element or delivery cannula 320having a distal opening 325 into a lumen 330 of the cannula 320. The loader 410 can couple to the implant cartridge 305 for loading the implant 10 into the delivery cannula 320 via the adaptor 409. The implant 10 suspending in liquid within the loading cartridge 405 is transferred from the loading cartridge 405 into the delivery cannula 320 using the loader 410 to aspirate the implant 10 into the delivery cannula 320.

Figure 3A:
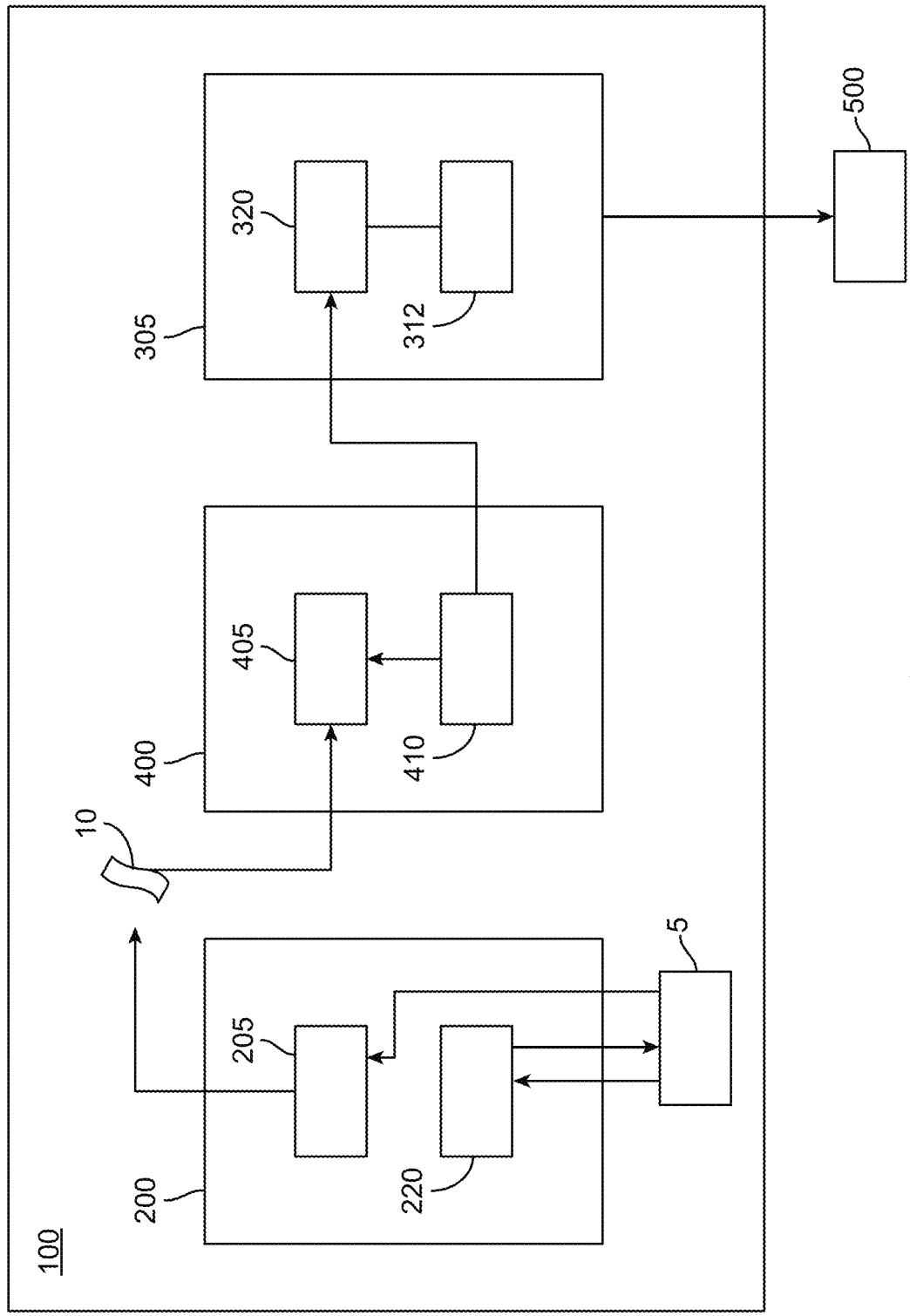
FIG. 3A is a box diagram illustrating a tissue system including a trephination system, a loading system, and an implant cartridge.
Figure 3B:
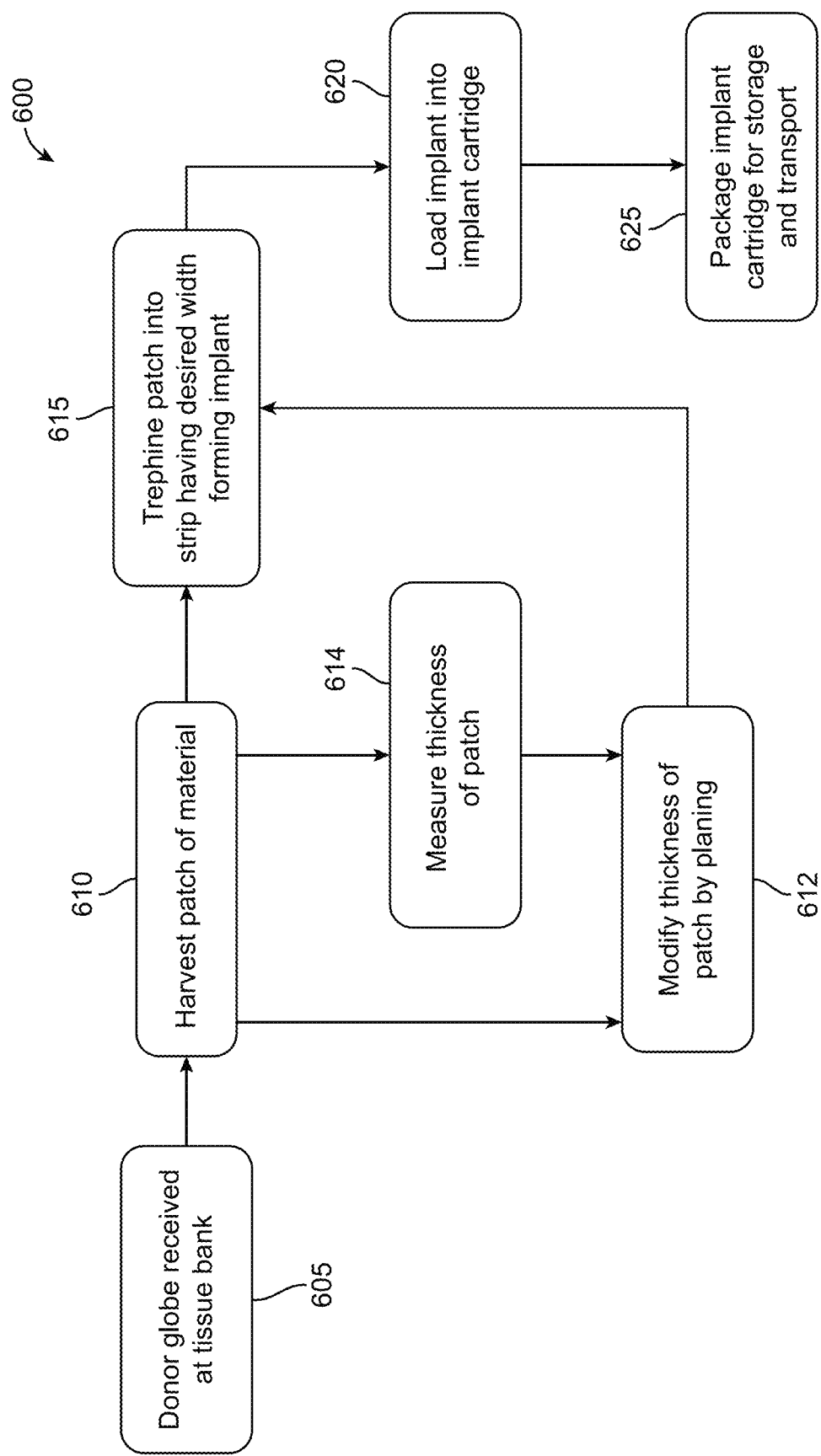
FIG. 3B is a box diagram illustrating a manufacturing process for forming a biotissue stent.

FIG. 3A is a box diagram showing an implementation of a system 100 including one or more of a trephination system 200, an implant cartridge 305, and a loading system 400. The system 100 can additionally incorporate a bio-tissue material 5 such as the bio-tissues described elsewhere herein that are harvested such as from a donor and configured to be shaped such as by the trephination system 200 for formation into an implant 10. FIG. 3B is a box diagram showing an implementation of a manufacturing process to form an implant 10 from the bio-tissue material 5 and load the implant 10 into a cartridge that can be packaged for storage and transport using the system 100 of FIG. 3A.

Again, with respect to FIG. 3A, the trephination system 200 can include a trephine 205. The trephine 205 of the trephination system 200 is configured for excision modification and shaping of a bio-tissue material 5 into an implant 10 for ocular implantation. The trephination system 200 can further incorporate a plane 220 configured to modify a thickness of the bio-tissue material 5.

The implant cartridge 305 can include a nose cone 312 having a delivery cannula 320 on a distal end and a proximal end region 315. The proximal end region 315 of the nose cone 312 is configured to couple to a hand piece 310 and a distal end region of the shaft projecting distally from the nose cone 312 is configured to insert within a treatment location of a patient. The delivery cannula 320 has a lumen 330 (see FIG. 7F) and a distal opening 325 into the lumen 330. The implant cartridge 305 is configured to hold the implant 10 within it for storage and transport such as from a manufacturing facility to a treatment facility such as an operating room.

Still with respect to FIG. 3A, the loading system 400 can include a loading cartridge 405 configured to engage with a loader 410 for hydraulically loading the cut implant 10 into the implant cartridge 305. The implant 10 can be suspended in liquid within the loading cartridge 405 of the loading system 400 and is transferred from the loading cartridge 405 into the delivery cannula 320 using the loader 410 to inject (or aspirate) the implant 10 into the delivery cannula 320. The loader 410 can inject the implant 10 apply positive pressure to or aspirate the implant 10 using negative pressure through the distal opening 325 of the cannula lumen 330.

The implant cartridge 305 loaded with the implant 10 within the delivery cannula 320 can be detached from the loading system 400 and packaged for storage and transport, for example, to a treatment facility such as an operating room where it is used in a surgical procedure upon coupling with a delivery hand piece. The implant cartridge 305 can be contained within packaging 500 including one or more specific features intended to prevent the implant 10 contained within the implant cartridge 305 from being damaged or from separating from the implant cartridge 305, including one or more physical barriers configured to maintain a wet implant 10 wet or a dry implant 10 dry during shelf life and/or to prevent the implant 10 from becoming dislodged from the cartridge 10 within the packaging 500. The packaging 500 can be a radiation stable container.

At the time of surgery, the implant cartridge 305 having the implant 10 already loaded within the delivery cannula 320 is reversibly attached to the proximal hand piece 310 via a coupling feature on a proximal end region 315 of the implant cartridge 305 that is configured to engage a corresponding coupler 317 on a distal end of the proximal hand piece 310 thereby forming the delivery system 300. The delivery system 300 is used to deploy the pre-loaded implant 10 in the eye for anatomic reinforcement, stenting, occlusion, interdigitation, and repair in aqueous drainage procedures.

Each of the components will be described in more detail below.

FIG. 3B shows an example of a manufacturing process 600 to form the implant and package the implant for use at a treatment facility. A donor globe received at a tissue bank (box 605) can be used to harvest a patch of material having a particular width, length, and thickness (box 610). The patch of material can be scleral tissue that is harvested about 5-10 mm from the limbus towards the posterior pole. The patch of material can be cut as a ring of material. The patch of material can be freeze-dried or remain wet. In some implementations, thickness (or tissue height) of the patch of material is modified by planing (box 612). Optionally, the starting thickness can be measured (box 614) before the patch of material is planed down to a desired thickness. The measurements can be performed using a pachymetry device or using a mechanical or electronic thickness gauge. The patch of material need not be planed nor does the thickness need to be measured. Preferably, the thickness is within about 50 microns of the inner diameter of the cannula the implant is to be loaded into. Implants that are too thick will fail a loading step. Thus, to improve yield the patch of material is planed down to about 800 microns, which is a size universally received by most cannulas to be used in a procedure. The patch of material can then be trephined into a strip having a desired width (box 615) forming the implant. The trephine can be a double blade forming a single strip or multiplex blade forming a plurality of strips as will be described in more detail below. The blades can be canted to blade bevel, for example, from about zero degrees to about 25 degrees. The implant, which can be an elongated strip of tissue about 5-10 mm in length, can then be loaded into an implant cartridge (box 620). The implant can be loaded into a cannula of the implant cartridge by aspiration, injection, or physically pushing the implant with a pusher or another tool.

The implant cartridge loaded with the implant can then be packaged for storage and transportation (box 625). For example, the implant cartridge can be packaged into a moisture barrier pouch or tray. If the implant is wet, fluids can be added to the packaging to maintain the wet environment. If the implant is dry, the moisture barrier pouch can maintain the dry environment. The systems and tools used to trephine, plane, load, and packaging the implants can be single-use disposable tools or can be autoclaved/cleaned and reused.

Trephination System

FIGS. 4A-4F illustrate components making up an implementation of a trephination system 200 including a trephine 205 and, optionally, a plane 220 as shown in and FIGS. 5A-5F. FIGS. 6A-6C illustrate another example of a trephine 205 of a trephination system 200. The configuration of the trephine 205 can vary as described herein and can include any one of the various cutters described in U.S. Pat. No. 10,695,218, U.S. Publication No. 2021/0361484, and U.S. Patent Publication No. 2023/0000680, which are each incorporated by reference herein. In some implementations, a single implant is formed with each cutting motion of the trephine 205, which can include a single blade forming a single elongate strip of tissue or a pair of blades forming a single elongate strip of tissue. In other implementations, multiple implants are formed with each cutting motion of the trephine 205. The trephine 205 can incorporate multiple blades or pairs of blades that each create an elongate strip of tissue that can then be loaded into an implant cartridge for storage and distribution. The formation of multiple implants with a single cutting motion of the trephine 205 can be useful, for example, for a manufacturing facility or tissue bank seeking to increase volume of production of the implants.

Figure 5F:
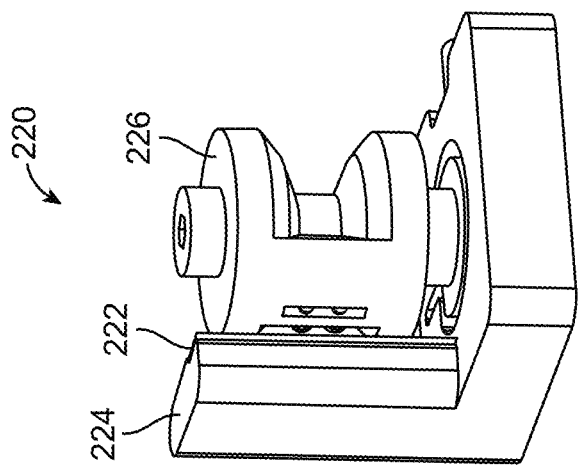
FIGS. 5D-5F are perspective views from different angles of a plane of a trephination system.
Figure 5E:
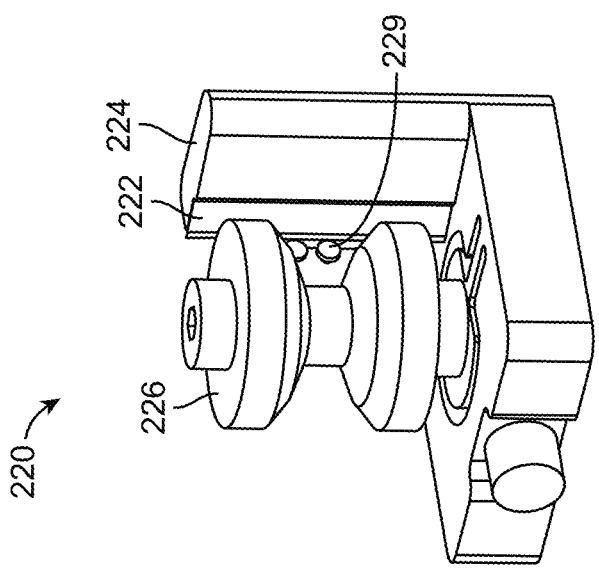
Figure 5D:
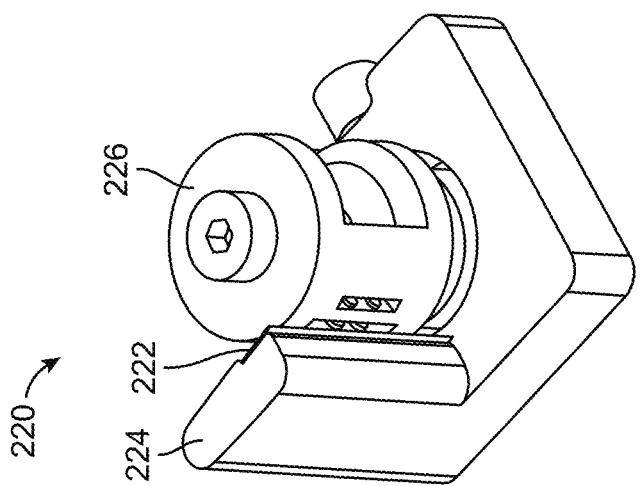
Figure 6A:
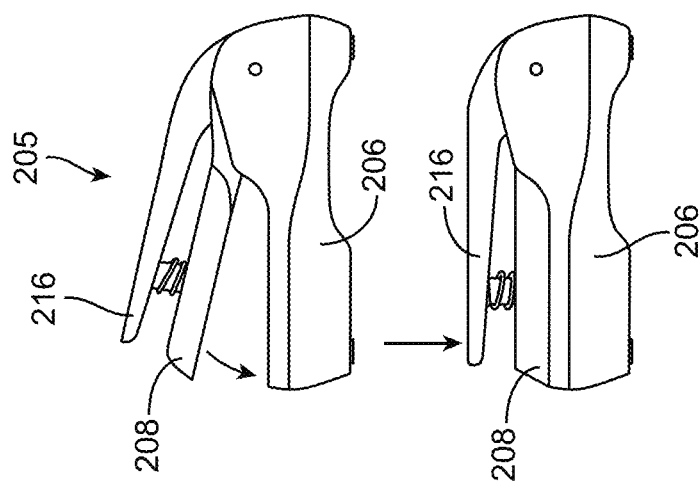
FIG. 6A is a perspective view of a cutter in an open configuration revealing a bearing surface.
Figure 6B:
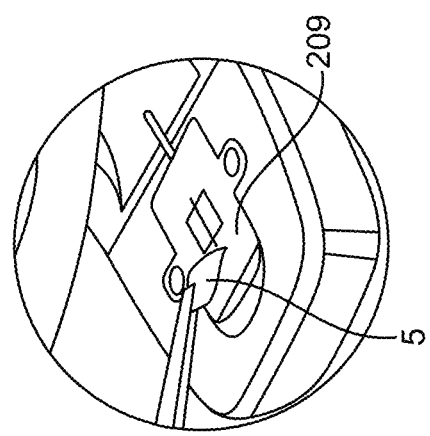
FIG. 6B is a detailed view of the bearing surface of the cutter of FIG. 6A.
Figure 6C:
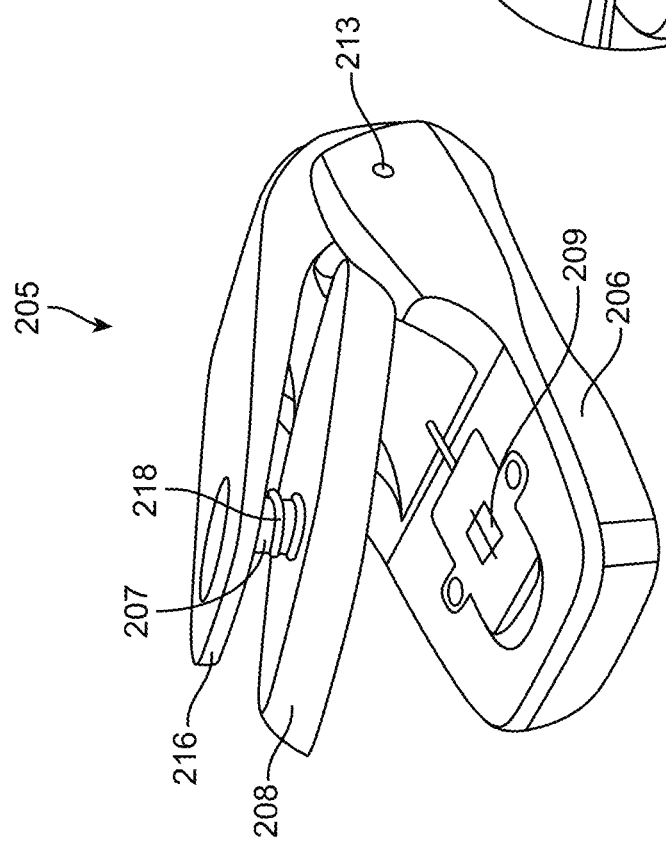
FIG. 6C is a side view of the cutter of FIG. 6A transitioning from an open configuration to a closed configuration.

FIGS. 5A-5C and also FIGS. 5D-5F illustrate implementations of a plane 220 that can be incorporated in the trephination system 200 to modify a thickness of the material 5 prior to trephining to modify the width of the material 5 into elongate strips. The material 5 can be cut down to an appropriate thickness so as to better fit within an inner diameter of the delivery cannula 320. FIG. 5A is a schematic of an implementation of a plane 220 of the trephination system 200 incorporating a blade 222 on a blade carriage 224. The blade 222 can be positioned to be flush to the grind angle of the blade 222, which can be between about zero degrees to about 25 degrees. FIG. 5B is a schematic showing example blade geometries of the blade 222 of the plane 220 of FIG. 5A showing a single grind having about a 25-degree angle on the left and a double grind having about a 13-degree angle on the right. The geometry can also include a triple grind of about 6 degrees. The material 5 to be planed can be frozen onto a barrel 226 or potted in a biocompatible material such as a wax or glue. An adjustor 228 such as a screw can be positioned below the barrel 226 so as to adjust the level of the material 5 and thus, the thickness achieved by the blade 222 as it is passed over the barrel 226 on the blade carriage 224. FIG. 5C is a schematic showing the material 5 to be planed. The material 5 can be a portion of sclera having a total thickness of about 1000-1200 microns with retina tissue on a lower surface making up about 25 microns of the total thickness. The upper surface of the material 5 (i.e., away from the retina) can be exposed above the surface of the barrel 226 and planed by the blade 222 forming a section of scleral tissue that is about 500-800 microns thick.

FIGS. 5D-5F are perspective views from different angles of an implementation of a plane 220 of the trephination system 205. The blade 222 is positioned on blade carriage 224. The barrel 226 is adjustably positioned relative to the blade 222 of the blade carriage 224. The curvature of the barrel 226 can be similar to a natural curvature of the material, which can be sclera, to aid in holding the material flush to the shape of the barrel 226. The material 5 can be held by the barrel 226 using one or more mounting screws 229. As the barrel 226 rotates relative to the blade 222, the material 5 comes into contact with the blade 222, which thereby shaves off an upper exposed segment of the material 5. The material 5 being plane can be held, such as by a clamp, to an outer perimeter of the barrel 226. When the material 5 is rotated to pass by the blade 222, a portion residing above the height of the blade is cut off and the material 5 having the desired thickness is retained within the clamp of the barrel 226.

The material 5 can be trephined into elongate strips. The material 5 may be trephined after the material 5 has been cut down to the desired thickness using the plane although this step is optional. Turning again to FIGS. 4A-4F, the trephine 205 can include a handle 202 coupled to a plurality of blades 203 at a distal end of the handle 202. The handle need not actually be hand-held by the user and could be replaced by a variety of mechanical or electromechanical configurations that can allow for control of force and cutting motion. The plurality of blades 203 can include at least a first pair of blades 203 spaced apart from one another to cut the biotissue 5 in a single cutting actuation along two dimensions. The blades 203 can be spaced and arranged at an angle that takes into account the bevels of the blades 203 so that the inside space between the blades where they penetrate the tissue remains relatively straight-faced and parallel to one another. For example, each blade 203 of an adjacent pair can be canted to the blade bevel, for example between zero degrees and 25 degrees, so that the portions of the blades 203 initially penetrating through the tissue are parallel to one another and avoid "squishing" the tissue within the space between them. The blades 203 of the trephine 205 can be parallel (see FIG. 4B) or non-parallel to one another to shape the tissue into parallel or non-parallel and non-linear shapes.

Figure 4B:
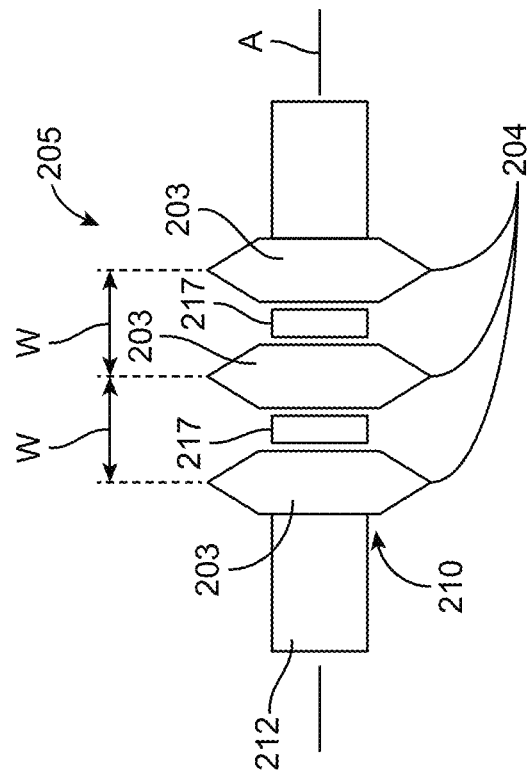
FIG. 4B is a schematic front end view of the blades of the trephine of FIG. 4A.
Figure 4A:
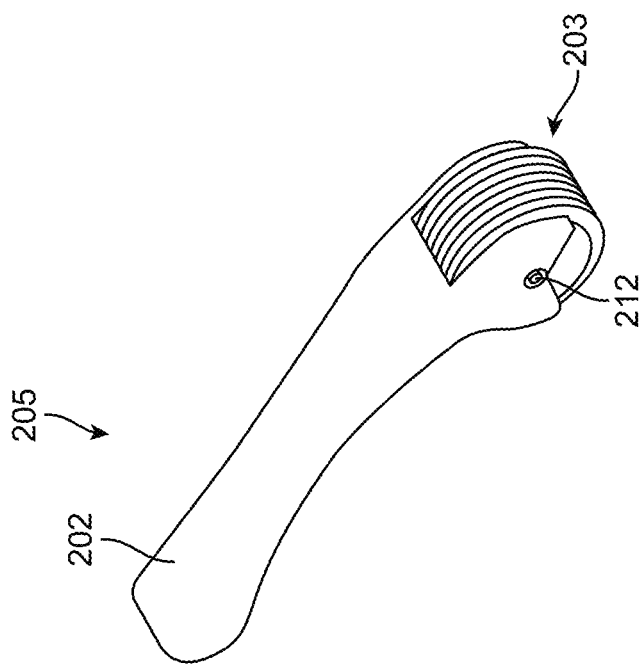
FIG. 4A is an implementation of a trephine of a trephination system for creating a plurality of biotissue stents in a single cutting motion.
Figure 4D:
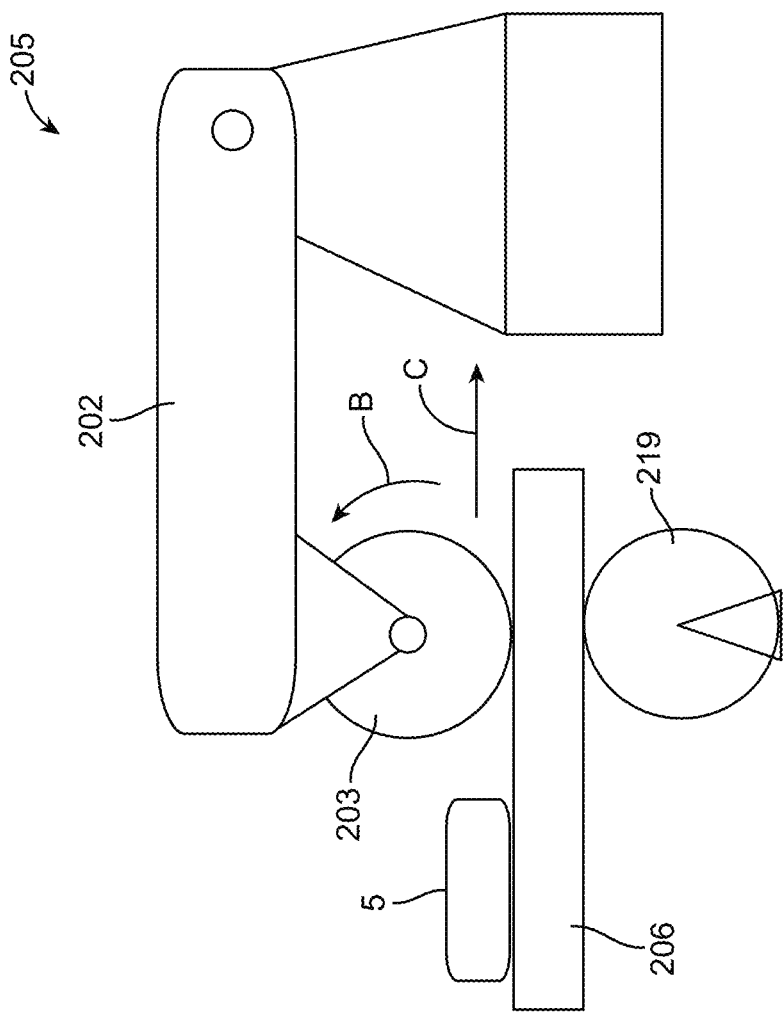
FIG. 4D is an implementation of a trephine having a fixed roller to pinch and drive the tissue through the trephine.

Each blade 203 can be circular with an outer perimeter formed into a cutting edge 204 and a center aperture 210 configured to receive a pin 212 (see FIG. 4A). The pin 212 extending through each of the blades 203 engages with the distal end of the handle 202 as an axle would. FIG. 4E shows the handle 202 having the blades 203 and pin 212 removed. This configuration allows the blades 203 to rotate around the axis A of the pin 212 as the handle 202 is urged axially across a surface of the material to be trephined. The blades 203 can be removed from the handle 202 and replaced for each cutting procedure whereas the handle 202 can be reused after sterilization. Alternatively, the entire trephine 205 can be disposed of after use or the entire trephine 205 can be sterilized for re-use.

The number of blades 203 can vary depending on the size of the starting tissue and the size of the implant desired. The trephine 205 can include 2, 3, 4, 5, 6, 7, 8, 9, 10 or more blades 203 coupled to the handle 202 such that 1, 2, 3, 4, 5, 6, 7, 8, 9 or more strips of tissue are formed with a single cutting motion. The blade 203 size can vary as well. In some implementation, each blade is about 10 mm-about 20 mm in diameter. The blade can be formed of carbon, stainless steel, tungsten, zirconia ceramic or another material.

FIG. 4B is an end view showing three blades 203 in schematic showing the cutting edge 204 at the perimeter of the blades 203 and the pin 212 extending through the center aperture 210. Ring shims 217 are positioned between the blades 203 to ensure the face of the blades 203 remain substantially parallel to one another and a space between them maintained. The distance between the cutting edges 204 of adjacent blades 203 corresponds to the width W of the resulting implant. The distance can be about 0.4-1.0 mm.

Figure 4C:
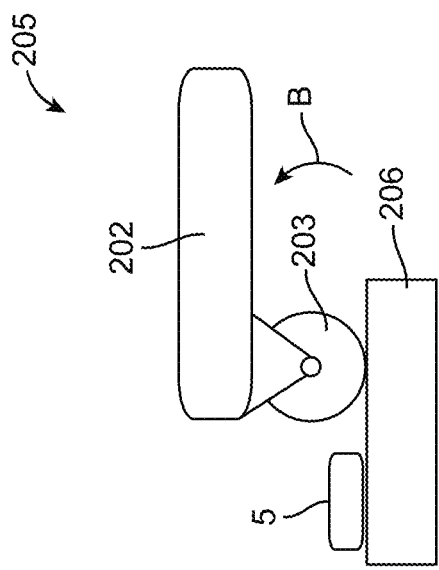
FIG. 4C is a schematic side view of the trephine of FIG. 4A.

FIG. 4C is a side view showing blades 203 relative to the handle 202 and to a base 206 with a patch of material 5 is positioned on it. The blades 203 can rotate around axis A along the direction of arrow B and be urged axially toward the patch of material 5 being cut. FIG. 4D is another side view showing blades in schematic. The trephine 205 can be hand-held or powered. If hand-held, the user applies force in a downward direction to achieve cutting as the trephine 205 is urged across the tissue. In another implementation, the blades 203 are coupled to a powered wheel. A torsion spring can be incorporated to apply an amount of force to urge the blades 206 again the tissue being cut. A fixed roller 219 can be incorporated under the base 206 to pinch and urge the base 206 in a rearward direction along arrow C as the blades 203 rotate around axis A in the direction of arrow B.

Figure 4F:
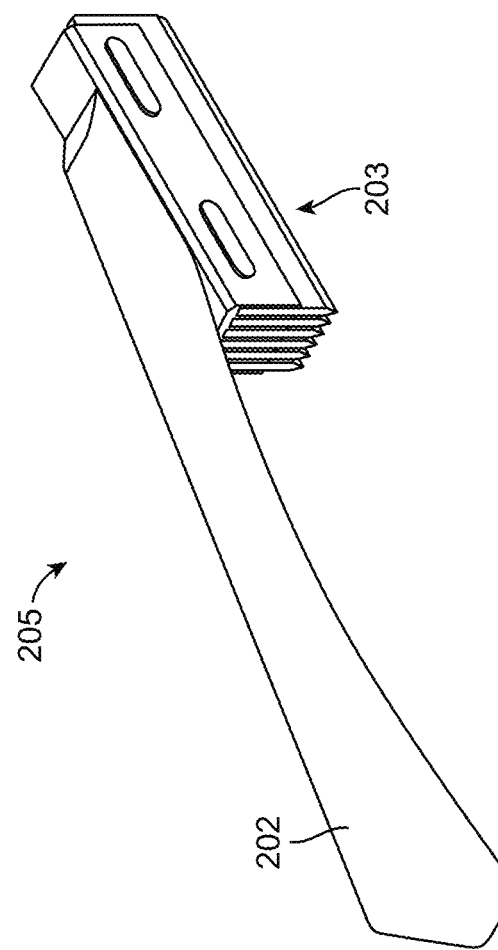
FIG. 4F is another implementation of a trephine for creating a plurality of biotissue stents in a single cutting motion.
Figure 4E:
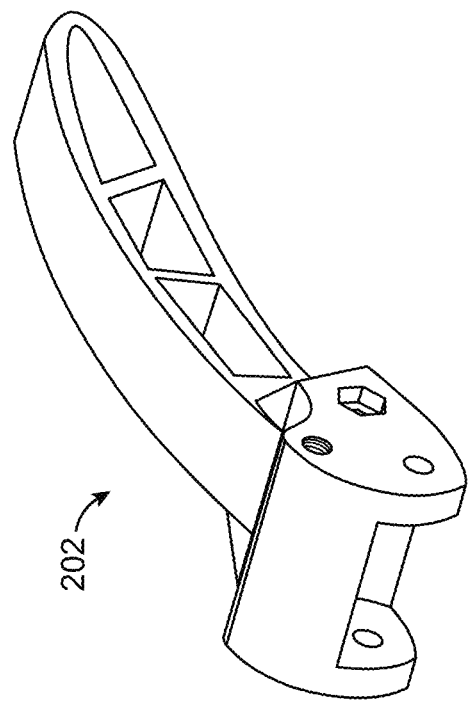
FIG. 4E shows a handle for a trephine.

The blades 203 need not be round and need not rotate relative to the handle 202. FIG. 4F illustrates an interrelated implementation of the trephine 205 in which the blades 203 are rectangular and do not roll or rotate during cutting of a material. Like the version shown in FIG. 4A, the blades 203 in this configuration can still be arranged parallel to one another in order to create a plurality of elongate strips from the material with a single cutting motion. The blades 203 in the implementation of FIG. 4F can be urged against the material in an up and down motion or in a pivoting motion to press through the tissue rather than rolling along the tissue. Whether the blades 203 are urged axially to rotate while being pressed downward through the material or are urged straight down without any forward or rotary motion, the blades 203 create a square cross-section to the cut.

The trephine 205 can be used with or include a base 206 providing a bearing surface for the blades 203. The base 206 can be a polymer providing a soft surface against which the blades 203 can be urged. The polymer can be between Shore 50A and Shore 50D, preferably about 80-90 shore A material (about 50D). The polymer can be between Shore 60A and Shore 60D. The softness in the bearing surface compensates for any mismatch in the Z axis between adjacent blades 203. The mismatch is more crucial where round blades are used.

FIGS. 6A-6C illustrate another example of a trephine 205 that is configured to form at least one implant 10 upon a single cutting motion. The trephine 205 can include a base 206 coupled to a top plate 208. The top plate 208 can include a cutting die having at least one blade (not visible in figure) and the base 206 can include a bearing surface 209. The top plate 208 can incorporate a plurality of blades so that multiple implants having a desired width are formed upon actuation of the trephine 205. The top plate 208 can rotate around a pivot axis of a hinge 213. The cutting die moves with the top plate 208 towards the bearing surface 209 around the hinge 213. The bearing surface 209 of the base 206 is positioned below the location of the blades so that the blades can be urged against the bearing surface 209 upon actuation of the cutter 205. The bio-tissue 5 can be positioned on the base 206 against the bearing surface 209 so that a desired implant width is achieved when cutting the bio-tissue 5 with the blades. The bio-tissue 5 can be manually loaded onto the cutter 205 using, for example, forceps, to align an edge of the bio-tissue 5 against the cutter ledge 214. Once the bio-tissue 5 is positioned at the correct location, the top plate 208 can be lowered over the bio-tissue 5. The top plate 208 may fix and optionally compress the bio-tissue 5 against the bearing surface 209 as the blades penetrate the bio-tissue 5. The blades can be one or more pair of blades spaced apart from one another to cut the bio-tissue 5 in a single cutting actuation along at least two locations. The blades can be spaced and arranged at an angle that takes into account the bevels of the blades so that the inside space between the blades where they penetrate the tissue remain relatively straight-faced and parallel to one another. The blades geometry and mounting arrangement is described in more detail in U.S. patent application Ser. No. 17/940,380, filed Sep. 8, 2022, which is incorporated by reference herein.

The blades 203 of the cutter 205 can be parallel (see FIG. 6D) or non-parallel (see FIG. 6E) to one another to shape the cut tissue into parallel or non-parallel and non-linear shapes. Parallel blades generate a rectangular shaped tissue segment having a square cross-section. Non-parallel blades may create a wedge-shaped tissue segment. The non-parallel shapes may be advantageous for loading into a cannula or for providing a clinical effect. The tissue can be cut into a variety of linear or non-linear shapes using a die-cut punch 201 or blade similar to a cookie cutter (see FIG. 6F). FIGS. 6G-6M illustrate a variety of shaped implants 10 cut using a punch 201. The die-cut punch 201 allows for the tissue to be shaped for improving each of use for surgical staff or for improved clinical response including, for example, improved fluid flow, improved retention within the cleft, enabling drug conveyance/delivery. The implants 10 can be cut to form an outer perimeter 7 and an inner perimeter 8, each have any of a variety of shapes. FIG. 6G, for example, illustrates an implant 10 having an outer perimeter 7 and a corresponding inner perimeter 8 resulting in an implant 10 having a hollow bar shape with a single, central opening 9. FIG. 6M illustrates another implant 10 having an outer perimeter 7 and a plurality of openings 9. In this implementation, the outer perimeter 7 can be any shape as discussed herein. The implant 10 can be cut with a punch or other cutter as shown herein or can be cut such as by laser cutting to create a plurality of openings 9. Each of the openings 9 can be defined by separate or substantially connected inner perimeters 8. The opening(s) 9 can be loaded with a material providing some function to the implant 10 upon deployment in the treatment site. For example, the material loaded within the openings 9 can be a drug or combination of drugs for delivery at the site of implantation. The material loaded within the openings 9 can include one or more particles, including solid particles, liquid particles, crystalline particles, droplets, or other form of therapeutic agent that is configured to be released from the openings 9 in the implant 10 to a patient for treatment of a condition.

The bearing surface 209 can be located within a region of the base 206 and coupled in a manner that allows for removing and replacing the bearing surface 209, if desired, without needing to dispose of the entire trephine 205. Similarly, the blades can be removed and replaced, if desired. The bearing surface 209 can be coupled to the base 206 and the blades can be coupled to the top plate 208 by one or more fixators such as a screw or another sort of coupling such as interference fit. FIGS. 6A-6B show the top plate 208 in an open configuration relative to the base 206 revealing the bearing surface 209 of the base 206. FIG. 6C shows the top plate 208 rotating from the open configuration around the pivot axis of the hinge 213 to a closed configuration with the top plate 208 abutting against the base 206. The top plate 208 can additionally include a lever 216 that can be actuated by a user to ensure a full cut of the tissue 10 by the blades without excessive pressure being applied that unnecessarily dulls the blades. The lever 216 can be movable relative to the top plate 208 to rotate around the pivot axis (which can be the same or a different pivot axis of hinge 213). A return spring 218 can be positioned around a post 207 on an upper surface of the top plate 208 that urges the lever 216 upward. A user can rotate the top plate 208 around the pivot axis to close the top plate 208. Once the top plate 208 is lowered onto the base 206, the lever 216 can be pressed. This motion compresses the return spring 218 and applies an amount of cutting pressure against the top plate 208 urging it toward the tissue 10 on the bearing surface 209 so that the blades fully cut through the tissue. The return spring 218 in this configuration provides a tactile feel to a user that prevents a user from squeezing the top plate 208 relative to the base 206 too tightly, which can cause damage to the cutting edges of the blades against the bearing surface 209. Motion of the lever 216 relative to the top plate 208 provides the user with some feedback that they have reached the end of travel of the top plate 208 to prevent inadvertent damage to the blades during cutting.

In some implementations, the material is cut by a system incorporating no mechanical blades to section the material. A laser microtome can be used to plane the material to modify the thickness or height of the material and/or to cut the material into the elongated strips. The laser microtome can cut with the help of photons in a contact-free manner. The laser microtome can incorporate a femtosecond laser that emits light in the near-infrared range to create linear cuts. The laser beam can be tightly focused using lenses and other optical components toward the material to be cut. Depending on the source of the material being cut (e.g., sclera, amniotic membrane, or an acellular biomatrix material), the wavelength can be 1030 nm with a pulse duration of about 300 fs and a pulse repetition rate of about 10 MHz. The material being cut can be held fixed prior to cutting to ensure a square edge is created or can be cut without any mechanical forces being applied. The material being cut can be held as described elsewhere herein (e.g., a flat or cylindrical base) and a laser does the cutting rather than a sharpened blade.

Loading System

Once the material 5 has been cut using the trephine 205, the one or more implants 10 can be loaded into an implant cartridge 305 using a loading system 400. FIGS. 7A-7F illustrate a first implementation of a loading system 400. FIGS. 8A-8F, 9A-9C, and 10A-10B illustrate another implementation of a loading system 400. Generally, the loading system 400 incorporates a loading cartridge 405 configured to hold the trephined implant 10 and a loader 410 configured to transfer the implant from the loading cartridge 405 into the implant cartridge 305. The loader 410 can transfer the implant hydraulically via negative pressure, positive pressure, and/or mechanical pushing.

Figures 7B, 7C, 7D:
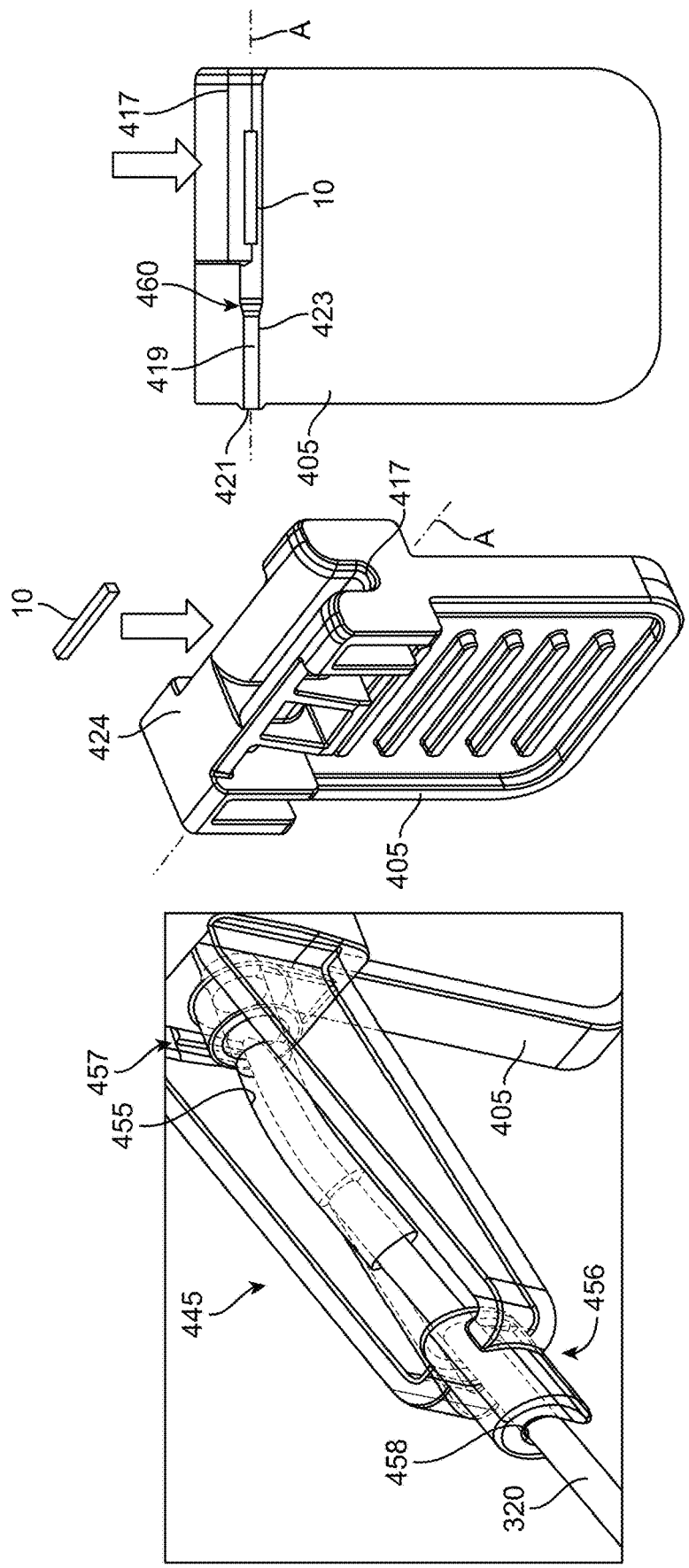
FIG. 7B is a perspective, partial view of the cannula received within the receptacle of the loader.
FIG. 7C is a perspective view of the loading cartridge of FIG. 7A.
FIG. 7D is a side view of the loading cartridge of FIG. 7C in cut-away showing the stent.

FIG. 7A shows the loading system 400 including the loader 410 engaged with a cannula 320 of an implant cartridge 305 and the loading cartridge 405 separated from the loader 410. The implant 10 can be manually transferred from the trephine 205 to the loading cartridge 405 and installed on the loader 410. The loader 410 can include a barrel 427 having a plunger 425 extending therethrough and urged in proximal position relative to the barrel 427 by a spring 435 within the barrel 427. The proximal end of the barrel 427 can have a syringe configuration so the plunger 425 can be urged in a distal direction by a user to generate positive pressure within the barrel 427. The loader 410 can have a receptacle 440 for the loading cartridge 405 just proximal to a receptacle 445 for the implant cartridge 320 so that the positive pressure generated within the barrel 427 can be used to urge the implant 10 from the loading cartridge 405 into the implant cartridge 320. The loading cartridge receptacle 440 can incorporate a coupling feature 450 configured to reversible affix the loading cartridge 405 to the barrel 427 of the loader 410. The coupling feature 450 can snap fit with corresponding features on the loading cartridge 405 so that it is aligned with the implant cartridge receptacle 445. For example, the loading cartridge 405 can be held in place by outer finger 450 or inner fingers on the cartridge 405 that engage with the features in the receptacle 445. The implant cartridge receptacle 445 can include a lumen 455 having a first end 456 with a first opening 458 sized to receive the delivery cannula 320 (see FIG. 7B). A second end 457 of the lumen 455 is configured to align with and be in fluid communication with the loading cartridge 405 upon installing the cartridge 405 with the loader 410 (see FIG. 7E). The receptacle 445 for the delivery cannula 320 can be configured to retain the cannula 320. At least a portion of the receptacle 445 can include a c-shaped fixation feature near the first end 456 of the lumen 455 that is sized to receive the outer diameter of the cannula 320 (see FIG. 7B). The receptacle 445 including the c-shaped fixation feature can be formed of a relatively soft material to avoid damage of the distal tip of the cannula.

Figure 7E:
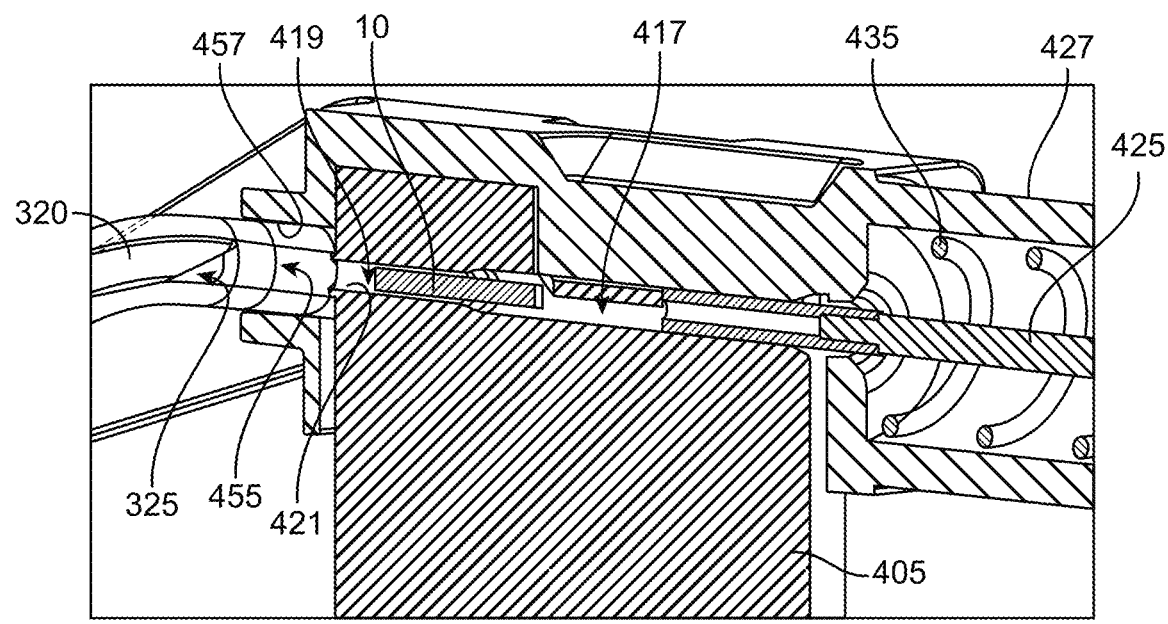
FIG. 7E is a cross-sectional view of FIG. 7B prior to injection of the stent into the cannula.
Figure 7F:
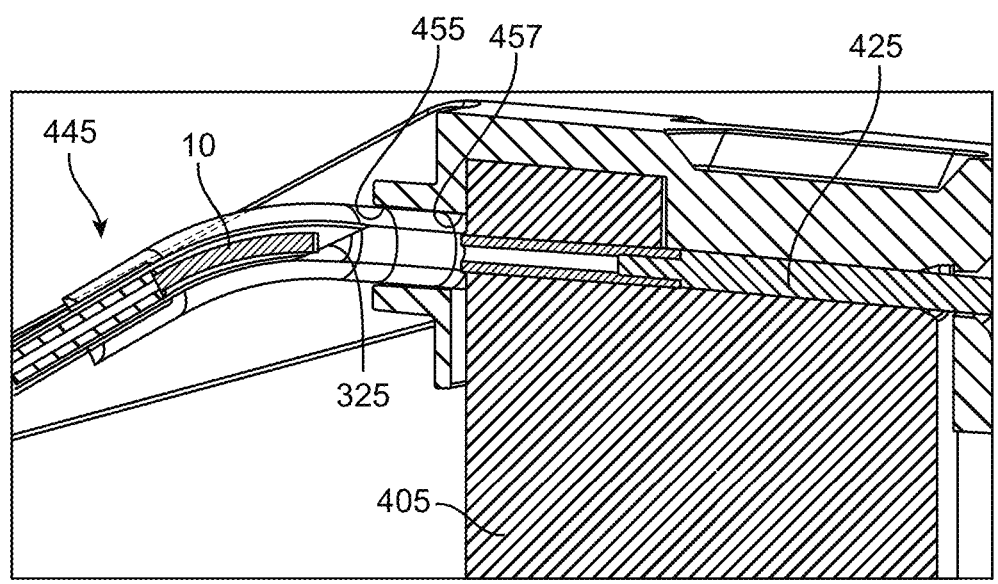
FIG. 7F is a cross-sectional view of FIG. 7B after injection of the stent into the cannula.

FIG. 7C is a perspective view of the loading cartridge 405 having a small reservoir 417 in fluid communication with a loading channel 419 within the loading cartridge 405. The reservoir 417 can be located more proximally relative to the loading channel 419 so as to receive the plunger 425 of the loader 410. The loading channel 419 can be located more distally relative to the reservoir 417 so as to align with the lumen 455 of the implant cartridge receptacle 445. The reservoir 417 is sized to hold a small volume of fluid when the loading cartridge 405 is coupled to the barrel 427, including a viscous material like viscoelastic or a non-viscous liquid such as saline. The volume of the reservoir 417 is sufficient to bathe the implant 10 in the liquid (in cases of wet implants 10). The walls of the reservoir 417 can be rounded and form a segment of a sphere avoiding square edges that could trap the implant 10 against a wall. In some implementations, the reservoir 417 can be angled so that the deepest section of the reservoir 417 is shaped and aligned with the channel 419 to encourage the implant 10 to align relative to the channel 419. The reservoir 417 is in fluid communication with the loading channel 419. The loading channel 419 can be a narrow, elongate channel that extends from the reservoir 417 a distance between a first end 421 and a second end 423 of the channel 419. The first end 421 can be positioned away from the reservoir 417 and the second end 423 can open up into the reservoir 417. The loading channel 419 is axially aligned and fluid communication with the lumen 455 of the cannula receptacle 445 that is sized to receive at least a distal end region of the delivery cannula 320. FIG. 7E shows the first end 421 of the loading channel 419 aligned with the second end 457 of the lumen 455 within the cannula receptacle 445. The lumen 455 guides the distal opening 325 of the delivery cannula 320 into alignment with the loading channel 419. The delivery cannula 320 can be inserted through the first end 456 of the lumen 455 until the distal opening 325 of the cannula 320 is adjacent and aligned with the long axis A of the reservoir 417 (see FIGS. 7E-7F).

The implant 10 can be positioned manually into the reservoir 417 of the loading cartridge 405 through an upper surface 424 of the loading cartridge 405 (FIG. 7C-7D). Once the implant 10 is within the reservoir 417, the loading cartridge 405 can be installed within the loading cartridge receptacle 440 of the loader 410. The delivery cannula 320 can be inserted into the lumen 455 of the cannula receptacle 445, prior to loading the cartridge 405 within the receptacle 440 of the loader 410 or after, and advanced a distance toward the second end 457 of the lumen 455 until the distal opening 325 of the delivery cannula 320 aligns with the reservoir 417 (see FIG. 7E). The plunger 425 of the loader 410 is urged distally towards the loading cartridge 405 until at least a distal end region enters the reservoir 417 of the loading cartridge 405 (FIG. 7E). This creates positive pressure within the reservoir 417 urging the implant 10 out of the reservoir 417 into the loading channel 419. The reservoir 417 of the loading cartridge 405 can have a funnel region 460 (see FIG. 7D) that is configured to screen out overly thick implants 10 from entering the distal opening 325 of the delivery cannula 320. If the implant 10 wedges within the funnel region 460 of the cartridge 405, the cartridge 405 with the wedged implant 10 having an improper size can be removed from the loader 410 entirely. A new cartridge 405 holding a new implant 10 can be inserted within the receptacle 440 of the loader 410 without impacting the integrity of the delivery cannula 320 or the loader 410. With continued distal advancement of the plunger 425, the implant 10 enters the distal opening 325 until it is positioned within the lumen 330 of the delivery cannula 320 (see FIG. 7F). The liquid in the reservoir 417 (e.g., viscous material) can aid in the implant 10 movement into the cannula 320.

Once the implant 10 is fully injected into the cannula tip, the implant cartridge 305 can be detached from the loader 410 for final packaging if loading is being performed at a site remote from the treatment facility, such as at a manufacturing facility. Or, if loading is being performed immediately prior to implantation at the treatment facility, the implant cartridge 305 may be installed immediately on the proximal hand piece 310 of the delivery system as described elsewhere herein.

Figure 8D:
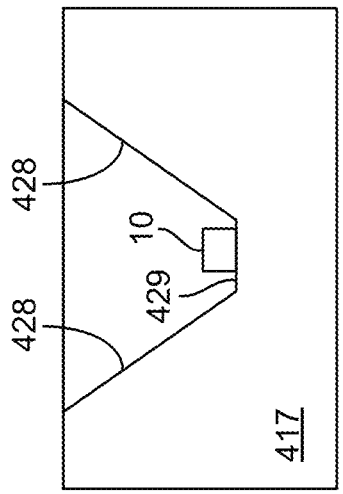
FIGS. 8C-8D are side and end views, respectively, of a reservoir containing the implant prior to loading.
Figure 8F:
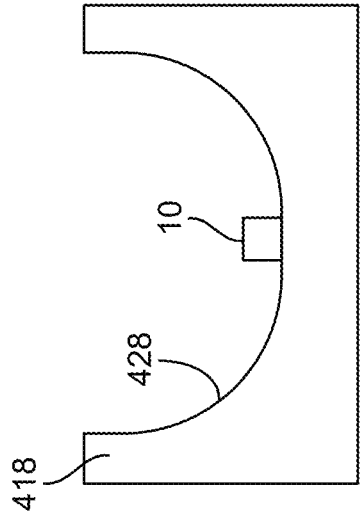
FIGS. 8E-8F are side and end views, respectively, of a reservoir containing the implant prior to loading.
Figure 8C:
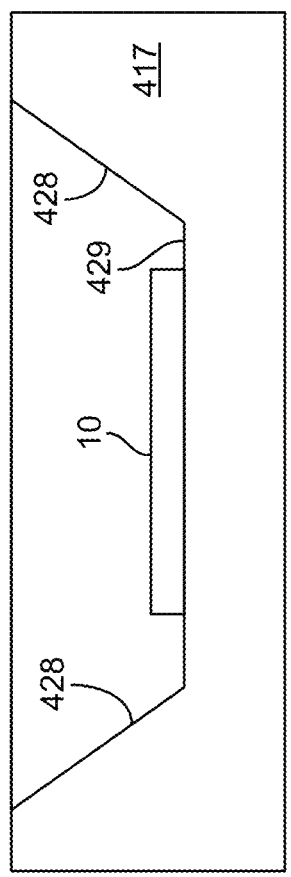
Figure 8E:
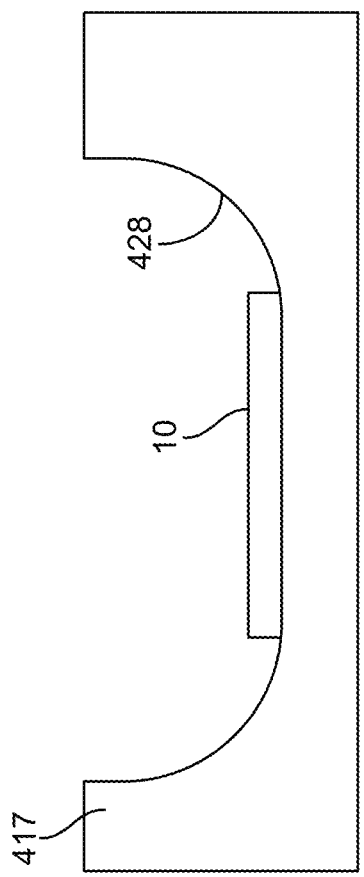

FIGS. 8A-8B illustrate another loading system 400 incorporating a loading cartridge 405 including a small reservoir 417 in fluid communication with a loading channel 419. The configuration and form factor of the loading cartridge 405 can vary. FIG. 8A shows an implementation of the loading cartridge 405 that is a plastic tray with the reservoir 417 and loading channel 419 molded into a region of the tray. FIG. 8B is another implementation of the loading cartridge 405. The reservoir 417 is sized to hold a volume of liquid such as a viscous material like viscoelastic or a non-viscous liquid such as saline. The reservoir 417 can be pre-filled with the liquid prior to transferring the implant 10 into the reservoir 417. The volume of the reservoir 417 is sufficient to bathe the cut implant 10 in the liquid so that the implant 10 is suspended in the volume, for example, between about 3 and 10 mL. The walls of the reservoir 417 can be rounded and form a segment of a sphere avoiding square edges that could trap the implant 10 against a wall. In some implementations, the reservoir 417 can be angled so that the deepest section of the reservoir 417 is shaped and aligned with the channel 419 to encourage the implant 10 alignment relative to the channel 419. FIGS. 8C-8F illustrate cross-sectional views of different reservoirs having shapes configured to encourage loading of the implant 10. FIGS. 8C-8D show a reservoir 417 from a side view and an end view, respectively, having angled sides 428 that meet at edges of a planar bottom surface 429. The length and width of the bottom surface 429 located between the angled sides 428 can vary although it is preferred that the bottom surface 429 be slightly longer and slightly wider than the size of the cut implant 10 to be contained within the reservoir 417. FIGS. 8E-8F show another implementation of a reservoir 417 from a side view and an end view, respectively, having curved sides 428. The curved sides 428 can extend entirely around the reservoir 417 so as to form the bottom surface as well as the sides 428. Alternatively, the curved sides 428 can meet edges of a planar bottom surface 429.

The reservoir 417 is in fluid communication with the loading channel 419. The loading channel 419 can be a narrow, elongate channel that extends outward from the reservoir 417 a distance between a first end 421 and a second end 423 of the channel 419. The first end 421 can be positioned away from the reservoir 417 and the second end 423 can open up into the reservoir 417. The loading channel 419 is sized to receive at least a distal end region of the delivery cannula 320 from the first end 421 and functions to guide the delivery cannula 320 towards the reservoir 417. The delivery cannula 320 can be inserted through the first end 421 of the loading channel 419 until the distal opening 325 of the cannula 320 enters the reservoir 417.

FIG. 8A shows a version of the reservoir 417 and loading channel 419. The tray of the device can incorporate one or more elongate slots 430 that provide a user with confirmation of implant size. For example, the slot 430 can have a first end region 431 having a first width and a second end region 432 having a larger second width. A user may insert the implant through the slot 430 to confirm the width of the implant is too small, too large, or within a desired size depending on which part of the slot 430 the implant 10 fits through. The portions of the slot 430 can be labeled to indicate their size. The device need not incorporate a slot to confirm implant size. Confirmation of size can also be provided by one or more markings or indentations 433 in the upper surface of the tray so that the width or length of an implant can be gauged and/or confirmed prior to loading.

FIG. 8B shows the channel 419 extending through an upper surface 424 of the loading cartridge 405. The distal end region of the delivery cannula 320 can be inserted into the channel 419 from above so that the region slides down into the channel 419. The walls of the upper surface of the loading cartridge 405 can be chamfered. This protects the distal tip of the delivery cannula 320 so that the distal tip need not find the opening into the first end 421 of the channel 419 and risk damage. Once the delivery cannula 320 is inserted into the channel 419, the delivery cannula 320 can be advanced a distance toward the second end 423 of the channel 419 until the distal opening 325 of the delivery cannula 320 enters the reservoir 417 through the second end 423 (see FIG. 9C).

FIG. 8B shows the implant 10 suspended within the liquid in the reservoir 417. The implant 10 is preferably positioned so that it aligns generally parallel with the longitudinal axis of the loading channel 419. This allows for an end of the implant 10 to be captured within the distal opening 325 of the cannula 320 upon drawing suction through the lumen of the cannula 320 thereby aspirating the implant 10 into the lumen 330.

Vacuum can be applied through the lumen of the cannula 320 to aspirate the implant 10 into the lumen 330 using the loader 409, such as a syringe. FIG. 9A shows the implant cartridge 305 having the delivery cannula 320 on a distal end of the nose cone 312 and the coupler on the proximal end region 315 of the nose cone 312. The coupler is configured to install the implant cartridge 305 with the proximal handle 310 of the delivery system. The coupler can also be used to engage the delivery cannula 320 to the loader 410. The adaptor 409 can be used to couple the implant cartridge 305 to the loader 410. For example, the vacuum source can be a syringe having a luer 426. The first end 411 of the adaptor 409 can attach to the luer 426 and the second opposite end 412 of the adaptor 409 can attach to the coupler of the implant cartridge 305. The first end 411 of the adaptor 409 can have any of a variety of configurations that couple to a corresponding coupler on the vacuum source, such as a thread or other connector suitable for coupling. The second end 412 of the adaptor 409 can incorporate a bayonet type coupling feature configured to accept the corresponding coupler on the implant cartridge 305, which will be described in more detail below.

Once the implant cartridge 305 and the loader 410 are coupled together by the adaptor 409, loader 410 can be activated to draw a vacuum through the lumen of the cannula 320. For example, a syringe plunger 425 can be withdrawn through a syringe barrel 427 so as to draw a vacuum through the lumen 330 of the delivery cannula 320 (see FIG. 9B). The distal opening 325 of the delivery cannula 320 is positioned within the reservoir 417 of the loading cartridge 405 near the location of the implant 10. The vacuum through the lumen 330 aspirates the implant 10 from within the reservoir 417 through the distal opening 325 into the lumen 330 of the delivery cannula 320. The liquid in the reservoir 417 (e.g., viscous material) aids in suspending the implant 10 in the reservoir 417 so that the delivery cannula 320 can be positioned near the implant 10 drawing it into the distal opening 325 upon withdrawing the plunger 425 of the syringe (FIG. 9C).

Figure 10A:
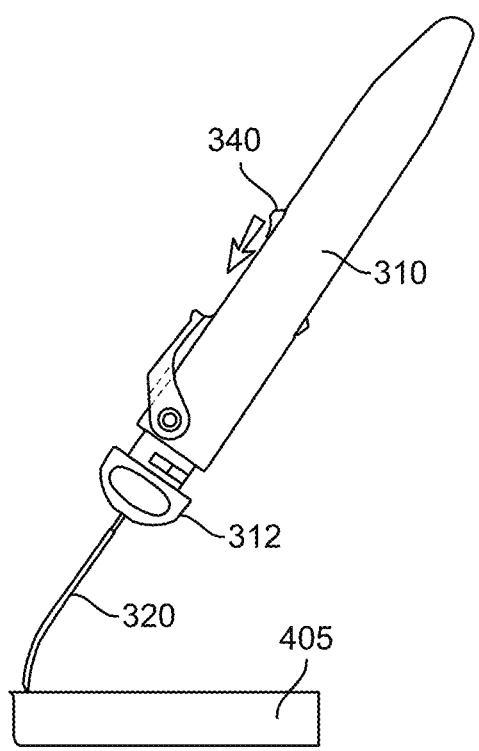
FIG. 10A is a side view of the delivery cannula positioned on a packing post of the reservoir of FIG. 8B.
Figure 10B:
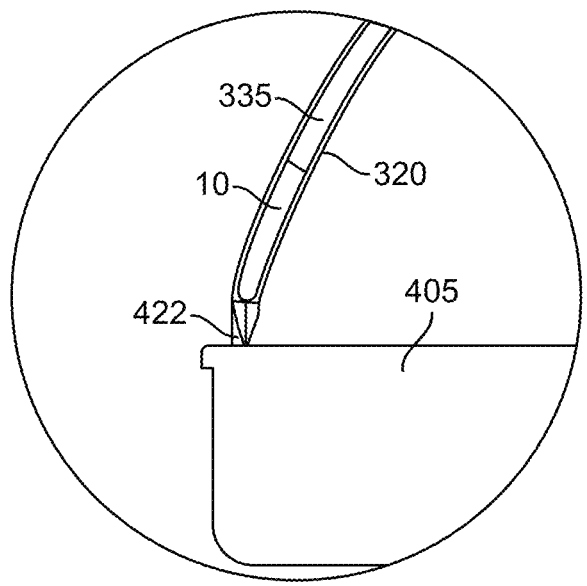
FIG. 10B is a detail view of the delivery cannula of FIG. 10A.

Once the implant 10 is fully aspirated into the cannula tip, the implant cartridge 305 can be detached from the adaptor 409 for final packaging and/or attachment to a proximal hand piece 310 of the delivery system 300. The loading cartridge 405 can include one or more packing posts 422 that are sized to insert a distance within the distal opening 325 of the delivery cannula 320. FIG. 8B illustrates two packing posts 422 positioned on an upper surface of the loading cartridge 405. Each packing post 422 can have an outer diameter that substantially matches an inner diameter of the delivery cannula 320 near the distal opening 325 so that the packing post 422 can be received within the lumen 330. The packing posts 422 can have different lengths so that upon insertion of the post within the distal opening, different degrees of compression are achieved. FIGS. 10A-10B illustrate the distal end region of the delivery cannula 320 positioned so that the packing post 422 is received within the distal opening 325 and the post 422 inserts a distance into the lumen. The longer the post 422, the further the post 422 inserts through the delivery cannula 320. The packing post 422 can be at least about 1 mm in length up to about 3 mm. The post 422 can serve to push the implant further into the lumen, for example, if aspirating the implant into the lumen was incomplete. The implant 10 can be compacted within the distal end region of the delivery cannula 320. In some implementations, the proximal hand piece 310 can include a pusher 335 movable relative to the distal opening 325. In other implementations, the pusher 335 is native to the implant cartridge 305, which will be described in more detail below. Actuating the pusher 335, whether located within the proximal hand piece 310 or the implant cartridge 305, while the distal opening 325 is positioned over the packing post 422 can compact the implant 10 within the distal end region of the delivery cannula 320 while keeping the implant 10 a distance away from the distal opening 325. Any unwanted viscous material can be purged from the system and the implant 10 compacted between the post 422 and the pusher 335. The implant 10 can be compacted within the distal end region of the delivery cannula 320 by actuating a pusher that is not on the hand piece 310 or the implant cartridge 305, but part of a separate loading device.

In some implementations, the implant cartridge 305 can incorporate a portion of a pusher within the lumen 330 of the cannula 320. The implant 10 can be positioned distal to the pusher within the lumen 330. When the implant cartridge 305 is loaded with a proximal hand piece for deployment to the patient, the pusher in the hand piece can engage the pusher in the cannula 320 to deploy the implant 10 as described elsewhere herein.

The liquid used for hydraulically loading the implant 10 into the delivery cannula 320, whether by aspirating or by injecting using positive pressure, can vary. The hydraulic loading avoids shrinking the tissue longitudinally and resists clogs compared to a mechanical one that pushes the implant into the lumen. The implant travels with the fluid stream. Pressure generated by the plunger of the syringe, whether using vacuum or positive pressure, in combination with the liquid interface can overcome the friction between the tissue and the cannula 320. The liquid can have a viscosity similar to water including balanced salt solution (BSS). The liquid can also have a viscosity greater than a viscosity of water at 20° C. or greater than at least about 1.0016 mPa. The liquid can be an Ophthalmic Viscosurgical Device (OVD).

The viscous material can be a biocompatible viscoelastic gel. The biocompatible viscoelastic gel is preferably made of natural polysaccharide(s) such as hyaluronic acid or its salt, chondroitin sulfate, keratan, keratan sulfate, heparin, heparin sulfate, alginate, cellulosic derivatives, chitosan, xanthan, or one of the salts thereof. Such biocompatibility avoids inflammation, foreign body reaction, or any biological signal which would increase scarring process. A minimum content of polysaccharide can be about 0.1% up to a maximum of about 20%.

Ophthalmic viscoelastics are categorized into two main classes: dispersive and cohesive. Cohesive viscoelastic materials include HEALON (1.4% sodium hyaluronate, $5\times10^6$ daltons), Healon®5 (sodium hyaluronate 2.3%, $4\times10^6$ daltons), HealonGV® ($2\times10^6$ mPa·s). Dispersive viscoelastic materials include VISCOAT (3% sodium hyaluronate, $5\times10^5$ daltons), OcuCoat® and Celoftal® (hydroxypropyl methylcellulose 2.0%), DisCoVisc® (sodium hyaluronate 1.6%, $1.7\times10^6$ daltons-chondroitin sulfate 4%), Provisc® (sodium hyaluronate 1%, $1.9\times10^6$ daltons), Amvisc Plus® (sodium hyaluronate 1.6%, $1.5\times10^6$ daltons), Opegan® (sodium hyaluronate 1%, $0.6\text{-}1.2\times10^6$ daltons).

Just as the implant 10 can be injected or aspirated into the distal opening 325 of the delivery cannula 320 for loading, the implant 10 can also be injected or aspirated into the proximal opening 322 (see FIG. 12A) of the delivery cannula 320 for loading. The opening 322 into the proximal end of the delivery cannula 320 can be positioned relative to the implant 10 so that upon application of negative pressure from the distal end of the cannula 320 the implant enters the lumen 330 and travels to the distal end region of the cannula 320. Alternatively, positive pressure from the proximal end of the cannula 320 can cause the implant to travel towards the distal end region of the cannula 320 near the distal opening 325. The implant 10 can be urged mechanically through at least a portion of the cannula 320 with a pusher in combination with the negative or positive pressure. Injecting or aspirating an implant into the cannula 320 from the proximal end to the distal end can ensure the implant is fully contained within the lumen and not at risk to fall out prior to delivery, for example, during storage and/or transport of the pre-loaded cannula 320. Loading the implant 10 from the proximal end also allows for a precise positioning between the cannula 320 and a loading mechanism.

Proximal end loading can be accomplished using injection or aspiration as discussed above. The advantage to applying positive pressure is there is no limit to how much force can be applied unlike with aspiration where force exerted to move the tissue is practically limited by the air in the system that can expand as vacuum is applied. Positive pressure and fluid flow using a syringe to push the implant 10 forward through the delivery cannula 320 allows the user to potentially exert a much higher force than would be possible for an aspiration loading system that includes at least some air within it.

Once positioned in the implant cartridge 305, the implant cartridge 305 containing the implant 10 can be packaged for storage and transport, which is described in more detail below. If loading is being performed at the treatment facility immediately prior to surgery, the implant cartridge 305 may be installed on the hand piece 310 of the delivery system without packaging.

Figure 11C:
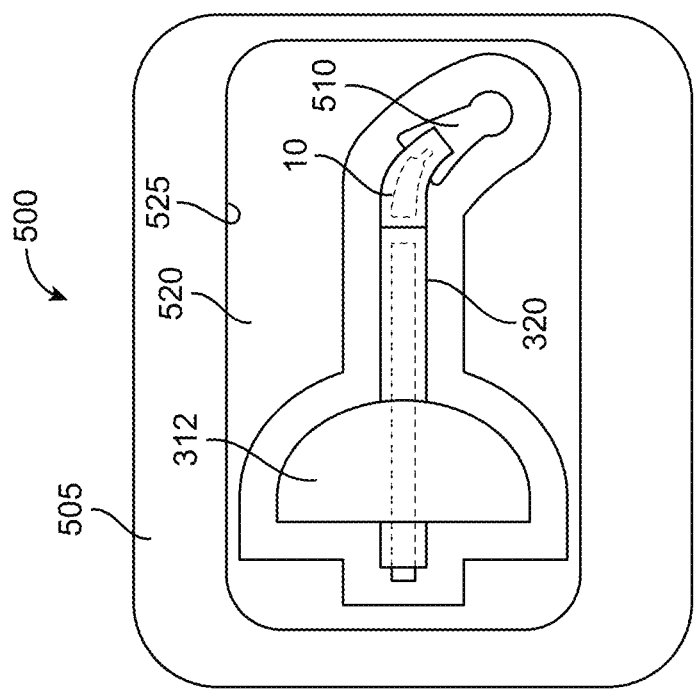
FIG. 11C is a schematic view of an implementation of packaging for the implant cartridge.
Figure 11B:
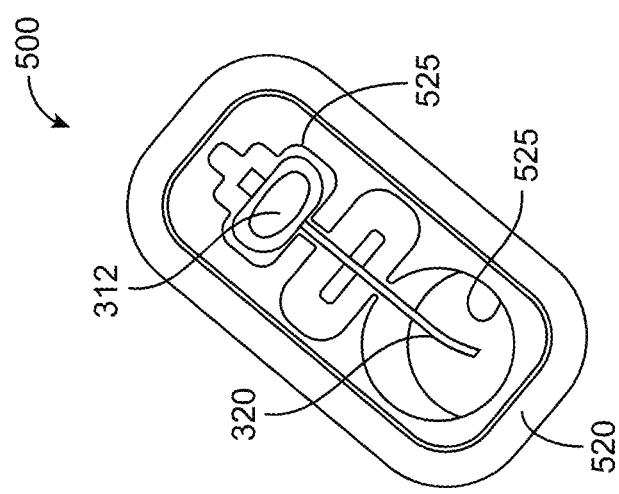
FIG. 11B is another implementation of packaging for the implant cartridge.
Figure 11A:
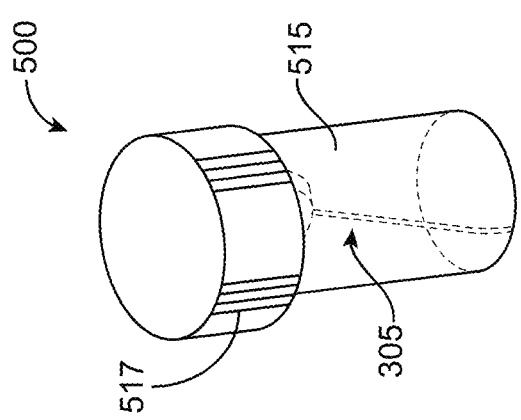
FIG. 11A is an implementation of packaging for the implant cartridge.

FIGS. 11A-11C illustrate implementations of packaging 500 for the implant cartridge 320. The implant cartridge 305 can be contained within packaging 500 including one or more specific features intended to prevent the implant 10 contained within the implant cartridge 305 from being damaged or from separating from the implant cartridge 305. The packaging 500 can include one or more physical barriers such as a moisture barrier 505 configured to maintain a wet implant 10 wet or a dry implant 10 dry during shelf life. FIG. 11A shows packaging 500 including a vial 515 sized to receive a pre-loaded implant cartridge 305 and having a lid 517 sized to close the vial 515. FIG. 11B shows packaging 500 for the pre-loaded implant cartridge 305 that includes a compartmented tray 520 having recesses 525 sized to receive one or more components of the implant cartridge 305 to maintain the cartridge 305 fixed to the tray 520. The vial 515 and the tray 520 can each additionally be packaged within a pouch or moisture barrier 505 (see FIG. 11C). A fluid can be added to the tray 520 prior to sealing inside of the moisture barrier 505 to maintain its shelf-life. In some implementations, as shown in FIG. 11C, the delivery cannula 320 can include a distal plug 510 configured to prevent the implant 10 from becoming dislodged from the cartridge 10 within the packaging 500. The distal plug 510 can be a protective silicone sock or an impermeable membrane configured to cover an opening from the lumen to prevent fluid loss. The plug 510 can be received over the outside diameter of the distal end region of the cannula 320 as shown in FIG. 11C. The plug 510 can be sized to cover the distal opening 325 and at least a portion of the distal end region of the cannula 320. The plug 510 can be manually removed by a user prior to deployment of the implant 10 into the eye to expose the distal opening 325. In other implementations, the plug 510 can be positioned internal to the cannula 320 such as within the lumen 330 distal to the implant 10 and need not be removed prior to deployment of the implant 10. In this implementation, the plug 510 is capable of preventing inadvertent dislodgement of the implant 10 from the cannula such as during storage and/or transport but would allow deployment of the implant 10 from the lumen 330 through the plug 510 when desired.

The material can vary but is preferably a relatively soft material that may be self-secured to the cannula such as a flexible polymeric material including silicone polymeric materials and others. The plug 510 is structured to effectively seal the distal opening 325 in a fluid tight manner and preferably is anhydrous so that it does not impart or transfer any water (moisture) to the implant 10. The plug 510 in this implementation that seals the distal opening 325 from within the lumen 330 can be formed of a material that can be received within the eye. The plug 510 can be made of a material that rapidly bioerodes or biodegrades including or example and without limitation, selected from poly (esters) based on polylactide (PLA), polyglycolide (PGA), polycaprolactone (PCL), and their copolymers, as well as poly (hydroxyalkanoates) of the PHB-PHV class, additional poly (esters), other synthetic polymers and natural polymers, particularly, modified to be rapidly biodegradable. In one implementation, poly (saccharides), e.g., starch, cellulose, cellulose derivative, or cellulosic derivatives, such as HPMC and the like materials compatible with the eye and chitosan can form the plug material.

The plug 510 can be "cork-like" inserting into the cannula lumen 330 or the plug 510 can be "cap-like" fitting over a distal end region of the cannula 320. The plug 510 can seal the opening 325 from the lumen 330 although this is not necessary to present a physical barrier preventing inadvertent movement of the implant from the lumen 330.

The packaging 500 can be radiation stable so that following loading of the implant 10 within the cannula of the implant cartridge 305 and packaging it as described above, the entirety can be sterilized.

Delivery System

Figure 12C:
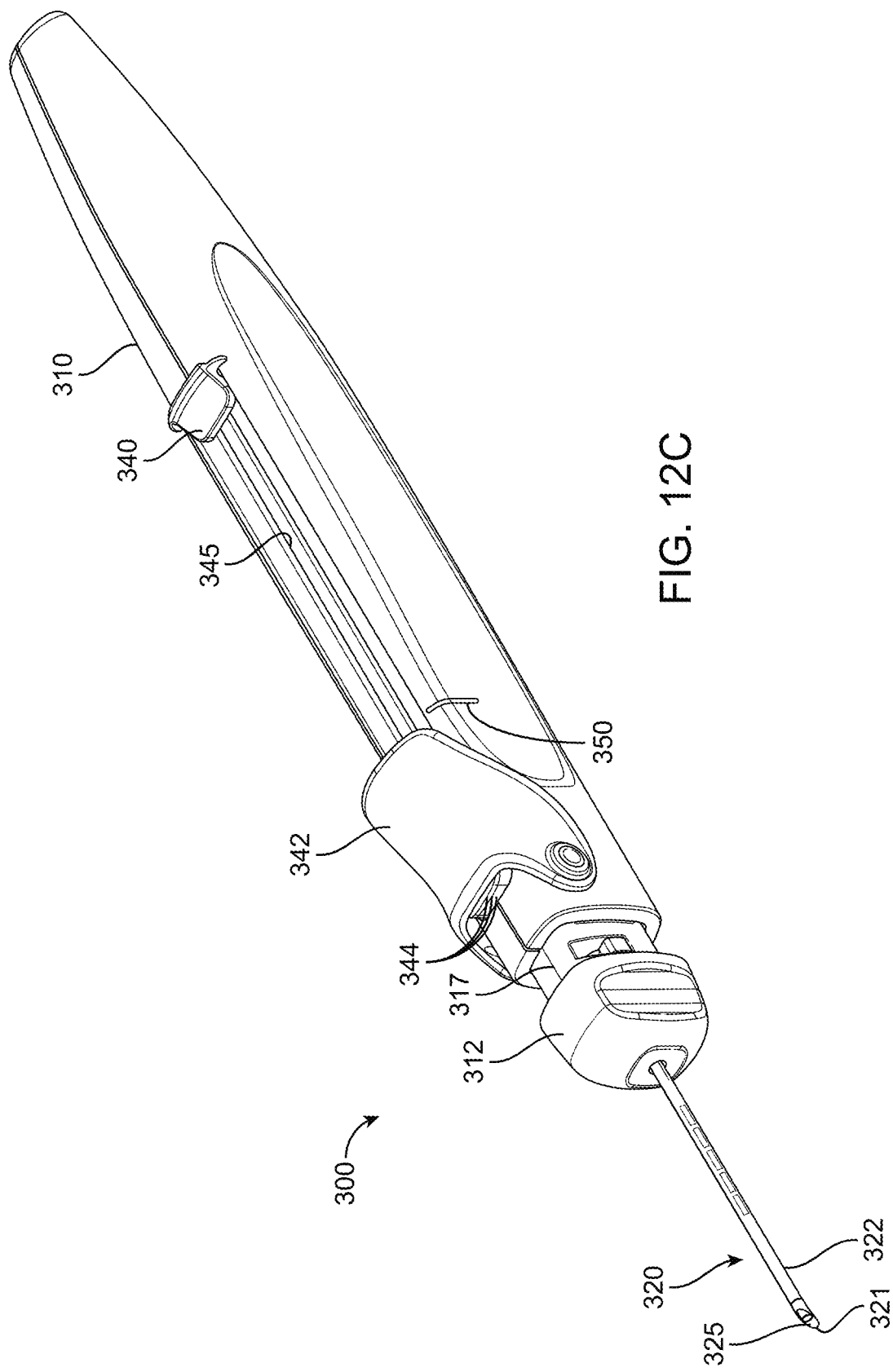
FIG. 12C is a perspective distal end view of the implant cartridge and hand piece coupled together.

The implant cartridge 305 (see FIG. 12A, 13A, or 14A) in addition to being a container for holding the pre-loaded implant 10 for storage and transporting from a manufacturing facility to the treatment facility, can form part of an ocular stent delivery system 300 (see FIG. 12C, 13C, or 14C) when coupled to a proximal housing or hand piece 310 (see FIG. 12B or 14B), for example, at the time of a surgical procedure. FIGS. 12C, 13C and 14C show the implant cartridge 305 installed on the proximal hand piece 310. The proximal hand piece 310 can include a housing 314 that is sized and shaped to be grasped by a single hand of a user. The distal end region of the housing 314 is configured to couple with the proximal end region 315 of the implant cartridge 305. The distal end region of the housing 314 can include a coupler 317 that can be a male-to-female attachment mechanism, such as a bayonet connection. The distal end region of the housing 314 can define a distal opening 370 sized to receive at least the proximal end region of the nose cone 312 (see FIGS. 13A, 14D, and 15A). The attachment between the nose cone 312 of the implant cartridge 305 and the housing 314 of the proximal hand piece 310 can ensure alignment of the lumen 330 of the delivery cannula 320 with the internal mechanisms of the hand piece 310, such as a pusher 335 if the pusher 335 is native to the hand piece 310 or a buttress 374 for the pusher 335 if the pusher 335 is native to the cartridge 305 or any other element or elements that are involved in deployment of the implant 10 from the cartridge 305.

The hand piece 310 can include an actuation mechanism configured to deploy the implant from the implant cartridge 305. In some implementations, the actuation mechanism is configured to retract the implant cartridge 305 and cannula 320 relative to the housing 314 and the pusher 335, which functionally results in the pusher 335 passively moving through the lumen of the cannula 320 to deploy the implant, while the pusher 335 substantially maintains its position relative to the housing 314. In other implementations, the pusher 335 is actively moved in a distally direction through the cannula 320 to deploy the implant. In still further implementations, the pusher 335 is actively moved and the cannula 320 is actively moved to achieve deployment of the implant 10.

The actuation mechanism can include one or more actuators 340 positioned on one or more regions of the hand piece 310. The actuator 340 can be manipulated by the single hand of the user such as with a thumb or finger. The configuration of the actuator 340 can vary, including one or more of a knob, button, slider, dial, or other type of actuator configured to move one or more components of the hand piece 310, such as the pusher 335. In some implementations, the hand piece 310 can include a pusher 335 configured to be moved by the actuator 340 to slide distally relative to the hand piece 310 whereas a second actuator 344 can be pushed that causes the nose cone to retract relative to the pusher 335 to deploy an implant 10 from the lumen. When the nose cone 312 of the implant cartridge 305 is installed on the hand piece 310, the pusher 335 can be advanced through at least a region of the lumen 330 of the delivery cannula 320 towards the distal opening 325. The pusher 335 can be sized and shaped complementary to the inner dimension of the delivery cannula 320. For example, where the delivery cannula 320 of the implant cartridge 305 has a rectangular, oval, or circular cross-sectional shape, the pusher 335 may be rectangular, oval, or circular in cross-section. This allows the pusher 335 to effectively urge the implant 10 through the lumen 330 of the cannula 320.

In implementations where the pusher 335 is native to the hand piece, the pusher 335 can be fully retracted in a proximal position prior to coupling of the implant cartridge 305 with the hand piece 310 so the pusher 335 does not interfere with loading of the implant cartridge 305. The delivery device 300 can include a single actuator to deploy the implant or more than a single actuator 340 to deploy the implant. In some implementations, a first actuator 340 of the delivery device 300 can be a slider as shown in FIG. 12C configured to move the pusher 335 from a first loading position (fully retracted) to a second primed position (at least partially advanced). The first loading position retracts the pusher away from the distal end region of the delivery device 300 allowing the implant cartridge 305 to be coupled to the proximal handle 310. Once the implant cartridge 305 is installed and retained as shown in FIG. 12C, the pusher 335 can be advanced distally through the lumen 330 of the delivery cannula 320. The second, primed position advances the pusher 335 towards the distal end of the proximal handle 310 to advance the implant 10 through the lumen 330 of the cannula 320. In some implementations, the pusher 335 can be advanced through the lumen 330 and out the distal opening 325 to deploy the implant 10. In other implementations, the pusher 335 is advanced to a distal location near the proximal end of the implant within the lumen 330 and the delivery cannula 320 withdrawn proximally while the pusher 335 remains stationary to deploy the implant 10. Preferably, the pusher 335 is advanced to the second, primed position prior to insertion of the shaft 320 in the eye.

The proximal handle 310 can additionally incorporate a movable guard 342 arranged to prevent a user from inadvertently pushing the slider 340 beyond the second primed position (see FIG. 12C). The guard 342 can be pushed down toward the proximal handle 310 so that a second actuator 344 is covered by the guard 342 preventing the second actuator 344 from being inadvertently activated. The guard 342 has a length so that the guard 342 extends over (or has a feature that extends within) at least a portion of the slider track 345 thereby blocking the first actuator 340 from moving further distal in addition to blocking the second actuator 344. Once the implant 10 is advanced to the primed position and is ready to be deployed in the eye, the guard 342 can be rotated up out of the way revealing the second actuator 344 and removing the features from the track 345. The first actuator 340 is free to slide further distal along the track 345 and the second actuator 344 is available to be depressed. The proximal handle 310 can include one or more marks 350 intended to provide feedback to a user regarding the position of the pusher 335 through the shaft 320. The advancement of the pusher 335 into one or more positions relative to the housing can also provide tactile feedback to a user as described elsewhere herein.

The delivery device 300 need not incorporate a slider as an actuator or that the pusher 335 be native to the hand piece 310 to deploy the implant 10. For example, the implant 10 can be deployed using an actuation mechanism including a single actuator configured to activate a carriage 364 to retract relative to the housing 314, which in turn retracts the nose cone 312 and cannula 320 relative to the hand piece 310 causing a pusher 335 in the implant cartridge 305 to move distally through the lumen of the cannula thus urging the implant 10 stored within the lumen to be urged out the distal opening 325.

Figure 13A:
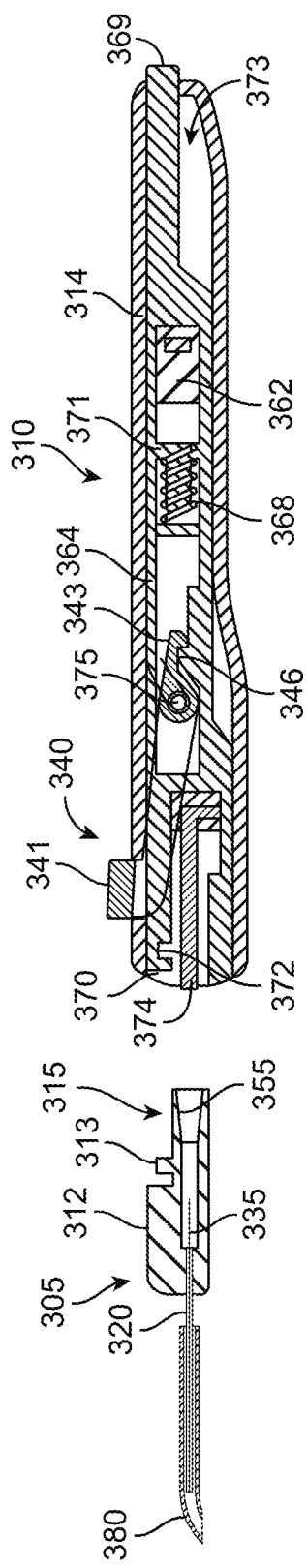
FIG. 13A is a side cross-sectional view of the implant cartridge prior to installment with a hand piece in the load position.
Figure 13B:
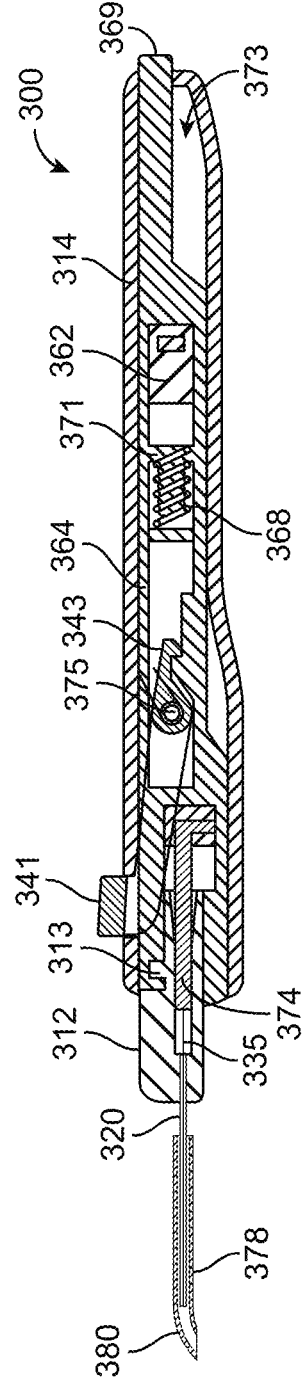
FIG. 13B is a side cross-sectional view of the implant cartridge installed with the hand piece in the ready position.
Figure 13C:
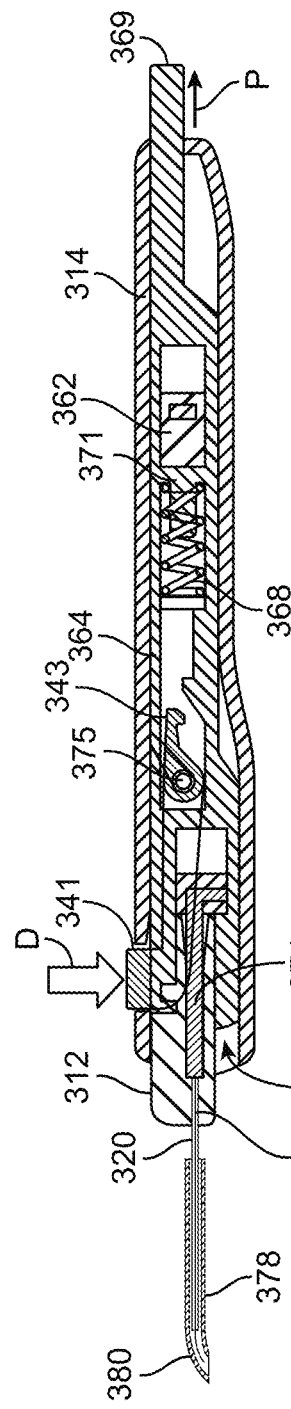
FIG. 13C is a side cross-sectional view of the implant cartridge installed with the hand piece in the deployed position.
Figure 14C:
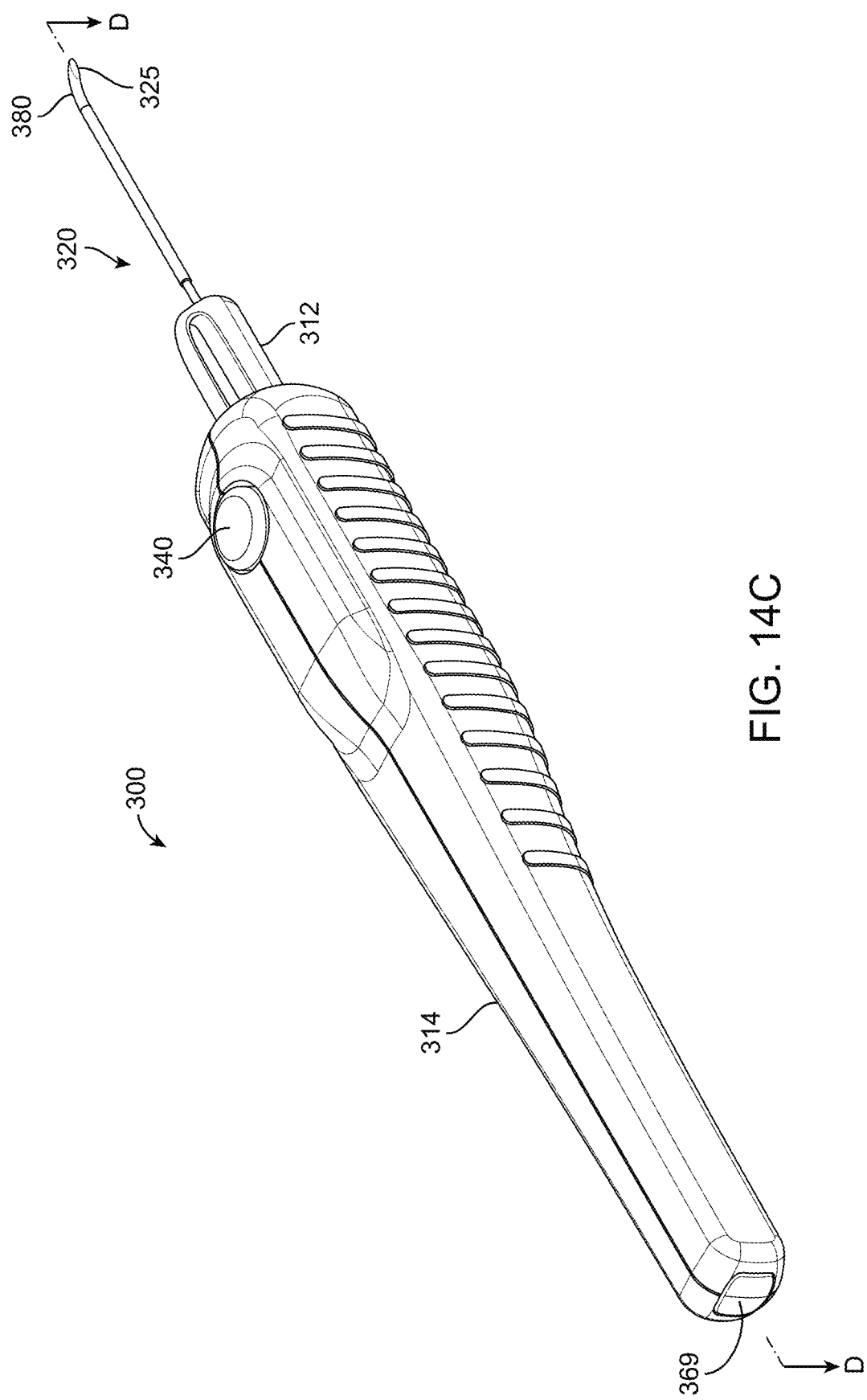
FIG. 14C is a perspective proximal end view of the implant cartridge and hand piece of FIGS. 14A and 14B coupled together.

FIGS. 13A-13C illustrate steps in loading the implant cartridge 305 onto the hand piece 310 including a carriage 364. FIG. 13A is a side cross-sectional view of the implant cartridge 305 prior to installment with a hand piece 310 in the load position. FIG. 13B is a side cross-sectional view of the implant cartridge 305 installed with the hand piece 310 in the ready position. FIG. 13C is a side cross-sectional view of the implant cartridge 305 installed with the hand piece 310 in the deployed position. The external dimension of the proximal end region 315 of the cartridge 305 can be sized to insert through a distal opening 370 at an engagement end of the housing 314 to engage with a carriage 364 within the housing 314. The attachment between the cartridge 305 and the hand piece 310 can incorporate at least a ¼ turn to ensure complete coupling. The proximal end region 315 of the cartridge 305 can also include a luer taper 355 that is sized to receive a buttress 374 fixed within the distal end region of the housing 314. The buttress 374 can be fixed within a region near the distal opening 370 so that it remains in place throughout actuation of the actuation mechanism to provide a bearing surface for the proximal end of the pusher 335 in the implant cartridge 305, which will be discussed in more detail below. The luer taper 355 can also allow for direct connection of a syringe, for example, to load the implant cartridge 305 with the implant using aspiration pressure as described elsewhere herein. One or more alignment features 313 on a proximal end region 315 of the implant cartridge 305 can aid in aligning and attaching the cartridge 305 to the hand piece 310. The alignment features 313 can prevent the cartridge 305 from being attached unless the hand piece 310 is in the ready position (FIG. 13B). The alignment feature 313 can be a projection or projections extending from an external surface of the proximal end region 315 of the implant cartridge 305 that is sized and shaped to engage with a corresponding alignment feature(s) 372 on a distal end region of the carriage 364 within the hand piece 310.

Still with respect to FIGS. 13A-13C, when the hand piece 310 is in the ready position and the cartridge 364 is advanced to its distal-most position within the housing 314, a user can insert the proximal end region 315 of the cartridge 305 axially into the distal opening 370 of the proximal hand piece 310 and rotate the cartridge 305 around the long axis of the hand piece 310 into position so that the alignment feature(s) 313 of the cartridge 305 engages the corresponding alignment feature 372 of the carriage 364. When the hand piece 310 is not in the ready position and the cartridge 364 is not in its distal-most position within the housing 314, the alignment feature 372 of the cartridge 364 is located deep enough within the hand piece 310 to prevent axial engagement and rotational locking of the cartridge 305. The user is prevented from pushing the cartridge 305 deep enough so the alignment features 313, 372 can engage with one another. The user is prevented from mistakenly attaching the implant cartridge 305 to a hand piece 310 that is not ready to be fired.

As mentioned above, the hand piece 310 can include an actuation mechanism that incorporates one or more actuators 340 configured to be manipulated by a single hand of the user to move one or more components of the hand piece 310. In some implementations, the hand piece 310 can incorporate an actuator 340 that is spring-loaded to deploy the implant. The spring-loaded deployment actuator 340 has a mechanical advantage allowing for lower push force to actuate retraction. The actuation mechanism can include a spring arming mechanism. The actuation mechanism can include a compression spring 368 that is arranged to urge the carriage 364 proximally through the housing 314 (see FIGS. 13A-13C, FIG. 14D, and FIGS. 15A-15B). The carriage 364 located within the housing 314 can include a first end configured to receive the proximal end region 315 of the implant cartridge 305 and a second end opposite the first end. The compression spring 368 engages at least a portion of the second end of the carriage 364. A first end of the compression spring 368 can abut a tailpin tube 371 and the second end of the compression spring 368 can abut a bearing surface on the carriage 364. The spring 368 is compressible between the tailpin tube 371 and the bearing surface of the carriage 364. Arming the device for deployment can include urging a tailpin 369 further into its bore 373 at the proximal end of the housing 314 urging the carriage 364 to move distally through the housing 314 causing the spring 368 to compress between the tailpin tube 371 and the bearing surface of the carriage 364 (see FIGS. 13A-13B, FIG. 14D, and FIG. 15A). When the actuation mechanism is in the armed configuration, the carriage 364 is in a distal-most position relative to the housing 314, the spring 368 is compressed, and the actuator 340 is ready to be fired to release the carriage 364 to be urged by the spring 368 proximally.

The actuator 340 can have a first portion 341 connected to a second portion 343 by a hinge 375. The hinge 375 can be fixed to the carriage 364. The first portion 341 can extend outside the housing 314 of the hand piece 310 and can be in the form of a button that a user urges downward (or inward towards the housing 314) to activate the device for implantation (see arrow D of FIG. 13C). The second portion 343 of the actuator 340 is located within the housing of the hand piece 310 and is configured to reversibly engage with the carriage 364, which is in a distal-most position relative to the housing 314, when the actuation mechanism is in an armed configuration. Actuation of the actuation mechanism causes the second portion 343 to lift away from the carriage 364 or toggles upward around the hinge 375 as the first portion 341 moves downward thereby releasing the engagement between the second portion 343 and the carriage 364. Upon releasing the engagement, the compressed spring 368 is free to expand towards its relaxed state urging the carriage 364 in a proximal direction through the housing 314 along arrow P (see FIG. 13C). The retraction speed of the carriage 364 upon release can be controlled by the compression spring 368 returning to its relaxed state. Alternatively, retraction speed of the carriage 364 upon release can be controlled by a user, which will be described in more detail below.

As discussed above, the alignment feature(s) 372 of the carriage 364 is engaged with the projection(s) 313 of the implant cartridge 305 so that proximal motion of the carriage 364 retracts the nose cone 312 and cannula 320 proximally relative to the housing 314 of the hand piece 310 to deploy the implant 10 located within the lumen of the cannula 320. The nose cone 312 retracts through the distal opening 370 of the housing 314 relative to the buttress 374 fixed within the distal end region of the housing 314 causing the distal end of the buttress 374 abuts against the proximal end of the pusher 335 native to the implant cartridge 305. The pusher 335 is positioned at least in part within the lumen 330 of the cannula 320 so that the proximal end of the pusher 335 is located outside the proximal opening 322 of the cannula 320 and available within the proximal end region of the nose cone 305, such as within the luer region 355. Proximal movement of the nose cone 312 and cannula 320 causes the proximal end of the pusher 335 to abut against the distal end of the buttress 374, which effectively urges the pusher 335 further into the lumen 330 of the cannula 320 as the cannula 320 coupled to the nose cone 312 is retracted past the pusher 335. In other words, the pusher 335 is maintained substantially in a fixed location by the buttress 374 as the cannula 320 is retracted over the pusher 335. The implant 10 can be located at a distal end region 380 of the cannula 320 as described elsewhere herein so that the presence of the pusher 335 urges the implant 10 out from the lumen to deploy it into the eye. A shock absorbing component 362 can be loaded within the hand piece 310 that is configured to abut against the carriage 364 during retraction to reduce sound and shock during actuation, which improves patient comfort. The actuation mechanism is configured to be re-armed for further actuations by clicking the tail pin 369, which upon actuation extends further outside the tail pin tube 371, back inward through the tail pin tube 371 once again arming the device by compressing the spring 368.

Figure 14D:
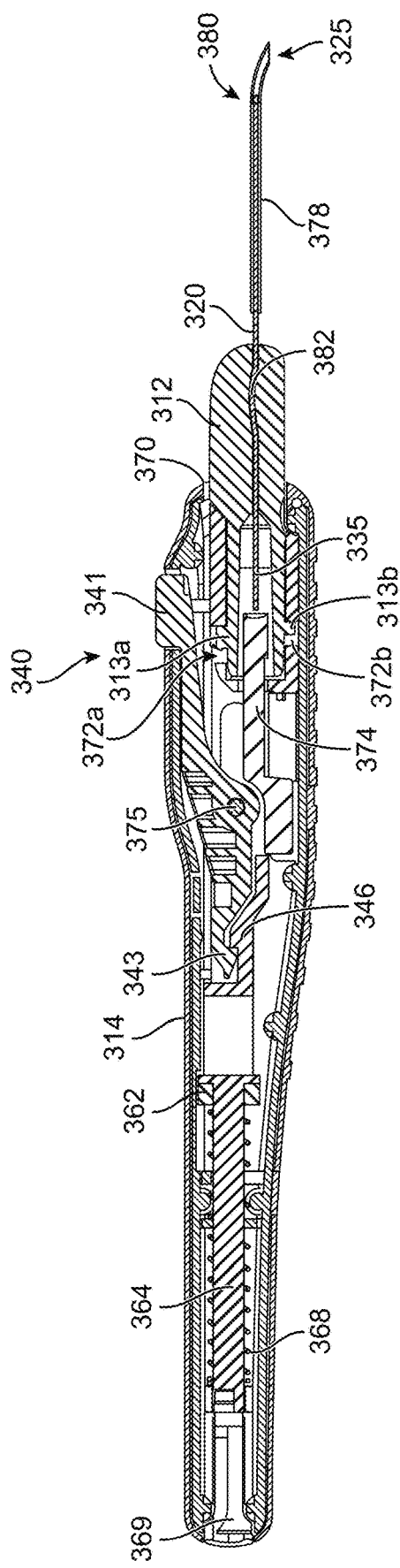
FIG. 14D is a cross sectional view of the delivery system of FIG. 14C taken along line D-D.
Figure 14E:
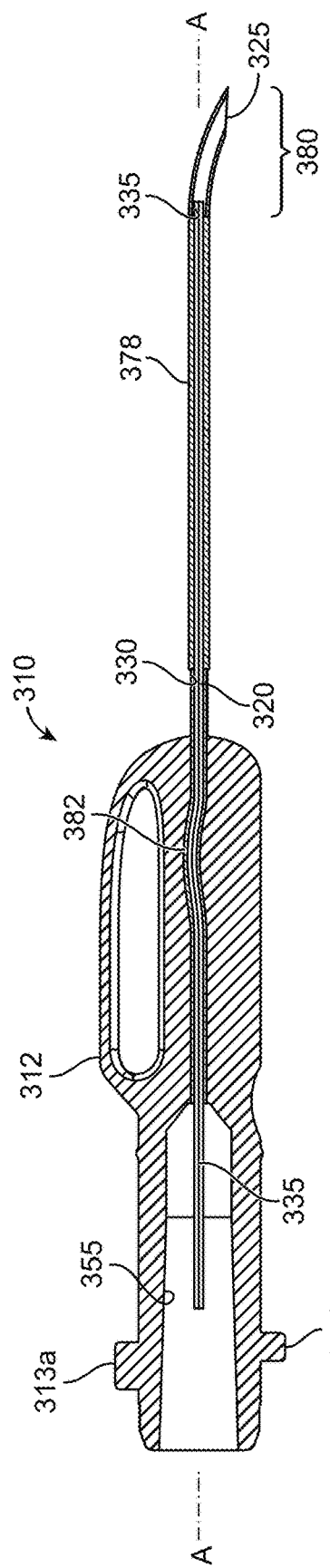
FIG. 14E is a cross-sectional view of the implant cartridge of FIG. 14A taken along line E-E.
Figure 14F:
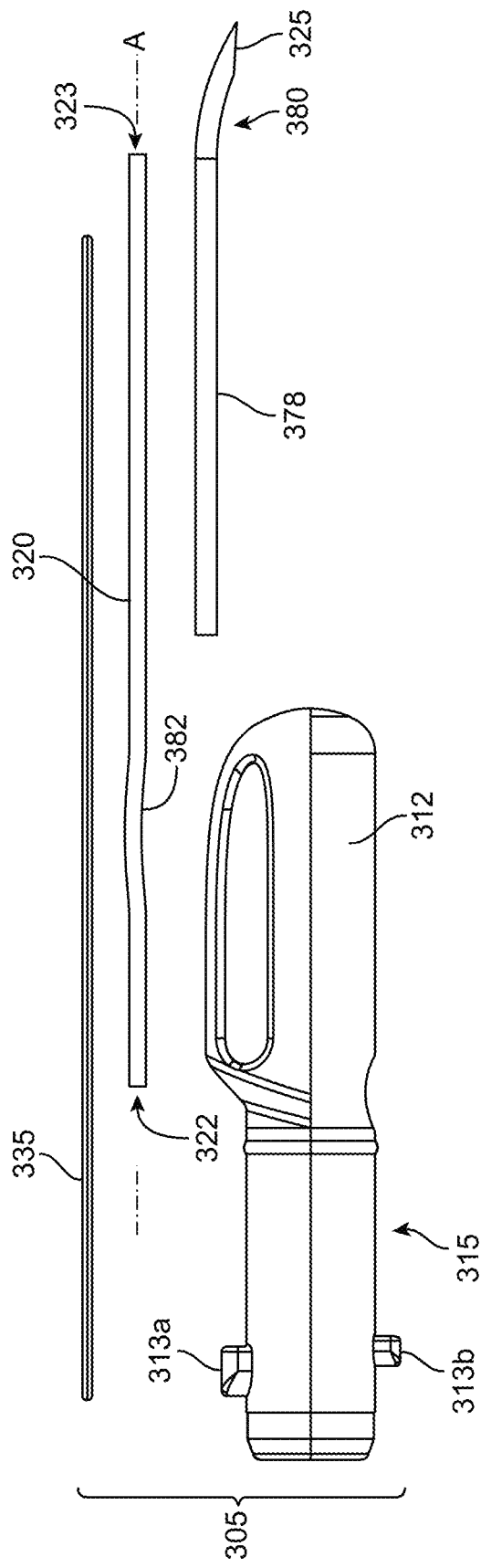
FIG. 14F is an exploded side view of the implant cartridge of FIG. 14A.

FIGS. 14A-14F illustrate an interrelated implementation of an implant cartridge 305 and hand piece 310 in which the pusher 335 is native to the implant cartridge 305. FIG. 14A shows the implant cartridge 305 separated from the hand piece 310 shown in FIG. 14B. FIG. 14C shows the implant cartridge 305 and hand piece 310 assembled to form a delivery system 300. FIG. 14D is a cross-sectional view of the delivery system 300 of FIG. 14C taken along line D-D armed for deployment of an implant. FIG. 14E is a cross-sectional view of the implant cartridge 305 of FIG. 14A taken along line E-E. FIG. 14F is an exploded view of the implant cartridge 305 of FIG. 14A.

The elongate shaft extending from the distal end region of the nose cone 312 of the implant cartridge 305 can include at least one tubular element. As best shown in FIG. 14F, the shaft includes a cannula 320 that is a tubular element having a lumen 330 that extends between a proximal opening 322 and a distal opening 323. The cannula 320 can be substantially straight such that the lumen 330 is coaxial with a single longitudinal axis A and both the proximal opening 322 and the distal opening 323 encircle the single longitudinal axis A. The cannula 320 can also incorporate one or more bends or curves.

The shaft of the implant cartridge 305 can additionally incorporate an outer tube member 378 that extends over at least the distal end region of the cannula 320 including the distal opening 323 from the cannula 320 and thereby forms the distal end of the elongate shaft. The distal end region of the outer tube member 378 projecting beyond the distal end of the cannula 320 can have a length that is about 3 mm up to about 7 mm. The outer tube member 378 can be a polymeric material such as Nylon or another material that can be translucent or transparent to allow for visual inspection of the implant 10 within internal lumen through the outer tube member 378. Visualizing the implant 10 through the outer tube member 378 aids in positioning the implant 10 within the cleft as it is being deployed from the delivery system 300.

The outer tube member 378, if present, (or the distal end region of the cannula 320 in the implementation of no outer tube member 378) can have a curved distal end region 380 and defines the distal opening 325 of the elongate shaft. The proximal end region of the cannula 320 can extend along the longitudinal axis A and the proximal opening 322 into the cannula 320 can surround the longitudinal axis A. The distal end region of the cannula 320 can also extend along the longitudinal axis A and the distal opening 323 from the cannula 320 can surround the longitudinal axis A. The proximal end region of the outer tube member 378 can be coaxial with the distal end region of the cannula 320 whereas the distal end region of the outer tube member 378 can curve or bend away from the longitudinal axis A. Thus, the distal end region of the outer tube member 378 can form a curved distal end region 380 of the shaft. The curved distal end region 380 can be a tangent arc to the proximal end region with radii of between 10-20 mm, preferably about 10-15 mm, or about 12 mm. The distal opening 325, whether formed by the tube member 378 over the cannula 320 or the cannula 320 itself, can be at an oblique angle to increase the size of the distal opening 325. The bevel can be about 10-45 degrees, preferably about 12-16 degrees. The distal-most end of the shaft can form a flat face or designed for blunt dissection.

The cannula 320 can be a substantially straight tubular element having a single longitudinal axis A so that the lumen 330 extending through the cannula 320 is coaxial with the axis A. The cannula 320 can also incorporate a distal end region 380 that curves away from the single longitudinal axis A, as described above. The cannula 320, whether substantially straight or having a curved distal end region 380, can incorporate a friction feature 382 near a proximal end region of the cannula 320 that is a curve or bend or combination of curves or bends that redirect the lumen away from the longitudinal axis A of the cannula 320 (see FIG. 14F). As best shown in FIGS. 14E, the pusher 335 of the delivery system can be native to the implant cartridge 305 and extends at least in part within the lumen 330 of the cannula 320 so that a portion of the pusher 335 spans the curve or otherwise spans the location of the friction feature 382. The friction feature 382 creates friction between the pusher 335 and the inner surface of the cannula 320 at the location of the feature 382 preventing the pusher 335, which is otherwise unattached to the implant cartridge 305. Thus, the pusher 335 can be held within the implant cartridge 305 only by friction against the inner surface of the cannula at the location of the friction feature 382. The friction between the pusher 335 and the cannula 320 can be sufficient to avoid inadvertent movements between the pusher 335 and the cannula 320, for example, during shipping and handling of the implant cartridge 305, until deployment of the implant 10 is desired.

Again with respect to FIG. 14D, the proximal end region 315 of the implant cartridge 305 is inserted within the distal opening 370 of the hand piece 310 so that the alignment feature 313, which can include a first alignment feature 313a on an upper surface of the proximal end region 315 of the implant cartridge 305 and a second alignment feature 313b projecting from a lower surface of the proximal end region 315 of the implant cartridge 305, engage the carriage 364 of the hand piece 310. The first alignment feature 313a can engage with a corresponding feature 372a within the carriage 364 and the second alignment feature 313b can engage with a corresponding feature 372b. The proximal end region of the pusher 335 can extend outside the proximal opening 322 of the cannula 320 of the implant cartridge 305 so that at least a length of the pusher 335 is available within the luer taper 355. The distal end region of the pusher 335 can reside within the lumen of the shaft just proximal to the implant 10 (e.g., within the lumen of the outer tube member 378 or within the lumen 330 of the cannula 320) so that at least a length of the pusher 335 traverses the friction feature 382 in the cannula 320. As shown in FIG. 14D the carriage 364 is urged distally through the housing 314 by the actuation mechanism as discussed above. The first portion 341 of the actuator 340 is urged upward further outside of the housing 314 and the second portion 343 inside the housing 314 is engaged with the carriage 364, such as at surface feature 346. Release of the carriage 364 by the second portion 343, such as by urging the first portion 341 downward, allows the spring 368 to urge the carriage 364 in a proximal direction through the housing 314 pulling the nose cone 312 and cannula 320 along with it further into the opening 370 of the housing 314. As the nose cone 312 and cannula 320 retract proximally, the proximal end of the pusher 335 within the luer taper 355 abuts against the distal end of the buttress 374 fixed within a region of the housing near the distal opening 370. As discussed above, the pusher 335 can be held within the lumen 330 of the cannula 320 only by friction against the inner surface of the cannula 320 at the curve forming the feature 382. The force of the buttress 374 against the proximal end of the pusher 335 as the implant cartridge 305 is retracted is greater than the friction between the pusher 335 and the cannula 320 caused by the feature 382. The bearing surface of the buttress 374 abuts the proximal end of the pusher 335 preventing the pusher 335 from moving proximally along with the cannula 320. This results in the pusher 335 traversing the lumen 330 of the cannula 320 (and the outer tube member 378, if present) as the cannula 320 retracts over it deploying the implant 10 out the distal opening 325.

The feature 382 can have a curvature offset from the longitudinal axis A of the cannula 320 that provides frictional force sufficient to prevent the pusher 335 from becoming inadvertently dislodged during shipping and handling, but that can be overcome upon deployment of the implant 10 during movement of the carriage 364 caused by the compression spring 368 without applying excessive force on the pusher 335.

In some implementations, the material of the pusher 335 can be more flexible than the material of the cannula 320 resulting in the pusher 335 elastically deforming where it traverses the feature 382 in the cannula 320. The pusher 335 can be a substantially straight, elongate filament having a single longitudinal axis between its proximal end and its distal end. The pusher 335 can be a uniform diameter element formed of a material such as a polymer (e.g., nylon) or metal with memory that maintains flexibility and maneuverability around a bend without excessive friction. When the pusher 335 is positioned within the cannula 320, the region of the pusher 335 spanning the feature 382 can deform away from its longitudinal axis following the curvature of the cannula 320. In other implementations, the pusher 335 is bent and the cannula 320 is straight to provide a friction desired to maintain the pusher 335 within the cannula 320 until deployment is desired. In still further implementations, the pusher 335 can have a first cross-sectional shape and the cannula 320 can have a second cross-sectional shape that is different from the first shape to provide the friction. For example, the pusher 335 can have a non-round cross-section and the cannula 320 can have a round cross-section such that at least a portion of the external surface of the pusher 335 abuts against an internal surface of the cannula 320 providing friction to maintain the pusher 335 within the cannula 320.

The actuator 340 can be configured to retract the implant cartridge 305 immediately upon depressing the first portion 341, as shown in FIGS. 13A-13C, where the retraction speed is controlled by the force of the spring 368 urging the carriage 364 proximally. Alternatively, the user can control the proximal motion with or without assistance from the compression spring 368. FIGS. 15A-15B illustrate an alternative actuator 340 that incorporates a two-stage actuation mechanism in which the speed of retraction provided by the actuator 340 is configured to be controlled by a user. The actuator 340 can incorporate a first portion 341 extending outside the housing 314 of the hand piece 310 that can be in the form of a button and a second portion 343 located within the housing 314. The first and second portions 341, 343 of the actuator 340 are coupled via the hinge 375 to the carriage 364. In other implementations described above, the first and second portions 341, 343 of the actuator 340 were located on opposite sides of the hinge 375. In this implementation, the first and second portions 341, 343 of the actuator 340 are on the same side of the hinge 375. A spring 384 can be located under the first portion 341 of the actuator 340 that is configured to urge the first portion 341 upward. The second portion 343 of the actuator 340 located within the housing 314 is also urged upward. The second portion 343 can have a shape and size that, when in the upward position, engages with a slot 385 on an internal surface of the housing 314. When armed, the spring 384 urges the first portion 341 into its upward position so that the second portion 343 is engaged with the slot 385. During deployment, a user urges the first portion 341 downward (or inward towards the interior of the housing 314) thereby compressing the spring 384. The second portion 343 of the actuator 340 moves downward away from its engagement with the slot 385. The carriage 364 is then free to retract proximally through the housing 314. As with other implementations, the compression spring 368 is arranged to move the carriage 364 that is freed from engagement in a proximal direction through the housing 314. If a user merely presses down on the first portion 341 without maintaining any bias against the actuator 340, the spring 368 will retract the carriage 364 through the51ouseng 314. A user can choose to maintain a slight forward bias against the first portion 341 of the actuator 340 to resist the force of the spring 368 holding the carriage 364 at a desired position relative to the housing 314 until full retraction of the implant cartridge 305 is desired, for example, during a second stage of actuation. The second stage of actuation can include the user releasing the forward bias against the first portion 341 of the actuator 340 allowing the actuator 340, which is fixedly coupled to the carriage 364 via the hinge 375, to track proximally until the carrier 364 is fully retracted. The user can control the carriage retraction speed by maintaining at least some force in a distal direction (i.e., forward bias) against the first portion 341 of the actuator 340. Or the user can allow the spring 368 to control the carriage retraction speed by releasing any force on the actuator 340. The actuation mechanism can be reset such as by urging the tail pin 369 inward through the housing 314, which urges the carriage 364 distally compressing the spring 368 until the second portion 343 once again engages feature 385 thereby arming the device for further deployments.

Methods of Implantation

In general, the implant 10 can be implanted through a clear corneal or scleral incision that is formed using the delivery cannula 320, which can include the outer tube member 378 discussed elsewhere herein. A viewing lens such as a gonioscopy lens can be positioned adjacent the cornea. The viewing lens enables viewing of internal regions of the eye, such as the scleral spur and scleral junction, from a location in front of the eye. The viewing lens may optionally include one or more guide channels sized to receive the cannula 320. An endoscope can also be used during delivery to aid in visualization. Ultrasonic guidance can be used as well using high-resolution bio-microscopy, OCT, and the like. Alternatively, a small endoscope can be inserted through another limbal incision in the eye to image the eye during implantation.

The distal tip of the delivery cannula 320 can penetrate through the cornea (or sclera) to access the anterior chamber. In this regard, the single incision can be made in the eye, such as within the limbus of the cornea. In an implementation, the incision is close to the limbus, such as either at the level of the limbus or within 2 mm of the limbus in the clear cornea. The delivery cannula 320 can be used to make the incision or a separate cutting device can be used. For example, a knife-tipped device or diamond knife can be used initially to enter the cornea. A second device with a spatula tip can then be advanced over the knife tip wherein the plane of the spatula is positioned to coincide with the dissection plane. The spatula tip device can be the delivery cannula 320.

The corneal incision can have a size that is sufficient to permit passage of the delivery cannula 320. In an implementation, the incision is about 1 mm in size. In another implementation, the incision is no greater than about 2.85 mm in size. In another implementation, the incision is no greater than about 2.85 mm and is greater than about 1.5 mm. It has been observed that an incision of up to 2.85 mm is a self-sealing incision.

After insertion through the incision, the delivery cannula 320 can be advanced into the anterior chamber along a pathway that enables the implant 10 to be delivered from the anterior chamber into the target location, such as the supraciliary or suprachoroidal space. With the shaft positioned for approach, the delivery cannula 320 can be advanced further into the eye such that the distal-most tip of the delivery cannula 320 penetrates the tissue at the angle of the eye, for example, the iris root or a region of the ciliary body or the iris root part of the ciliary body near its tissue border with the scleral spur.

The scleral spur is an anatomic landmark on the wall of the angle of the eye. The scleral spur is above the level of the iris but below the level of the trabecular meshwork. In some eyes, the scleral spur can be masked by the lower band of the pigmented trabecular meshwork and be directly behind it. The delivery cannula 320 can travel along a pathway that is toward the angle of the eye and the scleral spur such that the delivery cannula 320 passes near the scleral spur on the way to the supraciliary space but does not necessarily penetrate the scleral spur during delivery. Rather, the delivery cannula 320 can abut the scleral spur and move downward to dissect the tissue boundary between the sclera and the ciliary body, the dissection entry point starting just below the scleral spur near the iris root or the iris root portion of the ciliary body.

In another implementation, the delivery pathway of the implant intersects the scleral spur.

The delivery cannula 320 can approach the angle of the eye from the same side of the anterior chamber as the deployment location such that the delivery cannula 320 is not advanced across the iris. Alternately, the delivery cannula 320 can approach the angle of the eye from across the anterior chamber AC such that the delivery cannula 320 is advanced across the iris and/or the anterior chamber toward the opposite angle of the eye. The delivery cannula 320 can approach the angle of the eye along a variety of pathways. The delivery cannula 320 does not necessarily cross over the eye and does not intersect the center axis of the eye. In other words, the corneal incision and the location where the implant 10 is implanted at the angle of the eye can be in the same quadrant when viewed looking toward the eye along the optical axis. Also, the pathway of the implant 10 from the corneal incision to the angle of the eye ought not to pass through the centerline of the eye to avoid interfering with the pupil.

The delivery cannula 320 can be continuously advanced into the eye, for example approximately 6 mm. The dissection plane of the delivery cannula 320 can follow the curve of the inner scleral wall such that the implant 10 mounted in the shaft, for example after penetrating the iris root or the iris root portion of the ciliary body CB, can bluntly dissect the boundary between tissue layers of the scleral spur and the ciliary body CB such that a distal region of the implant 10 extends through the supraciliary space and then, further on, is positioned between the tissue boundaries of the sclera and the choroid forming the suprachoroidal space. Once properly positioned, the implant 10 can be released from the delivery cannula 320 as described herein. The implant 10 can be urged distally from the delivery cannula 320, the delivery cannula 320 can be retracted while the implant 10 remains stationary. Alternatively, the implant can be urged distally as the delivery cannula 320 is retracted. Preferably, the cannula 320 is retracted to deploy the implant 10, which remains substantially stationary relative to the hand piece 310.

The cannula 320 can be used to create a cleft between tissues at the location of implantation. The distal end region of the cannula 320 can incorporate one or more visual markers 322 to guide a user regarding depth of penetration (see FIGS. 16C-16D). A first marker 322 can be positioned a minimum depth of penetration desired (e.g., about 3 mm from the distal-most tip 321 of the cannula). A second marker 322 can be located a distance further proximal of the first marker 322 for a second maximum depth of penetration desired (e.g., about 6 mm from the distal-most tip). Once the user has created the desired cleft and is ready to deliver the implant from the lumen, the pusher 335 can be advanced to its third, forward-most position (with the guard 342 out of the way or otherwise removed or absent from the device). The second actuator 344 can be engaged to release the material from the shaft 320. The second actuator 344 can retract the shaft 320 while the pusher 335 remains fixed ultimately releasing the implant 10 from the lumen.

The implant 10 can be deployed from the lumen 330 so that at least a portion of the implant 10 is positioned between tissue layers, such as within a supraciliary space between ciliary tissue and scleral tissue, or within Schlemm's Canal. The implant 10 can be deployed so that it is positioned within the supraciliary space so that at least a distal region is positioned between ciliary tissue and the sclera, and a proximal end is within the supraciliary cleft. The proximal end need not project into the anterior chamber when positioned within the supraciliary cleft. Preferably, the proximal end of the implant 10 is positioned so that it remains flush with the cleft positioned between ciliary tissue and scleral tissue and does not extend into the anterior chamber.

Once implanted, the implant 10 forms a fluid communication pathway between the anterior chamber and the target pathway (e.g., supraciliary space or suprachoroidal space). As mentioned, the implant 10 is not limited to being implanted into the suprachoroidal or supraciliary space. The implant 10 can be implanted in other locations that provide fluid communication between the anterior chamber and locations in the eye, such as Schlemm's Canal or a subconjunctival location of the eye, retinal or subretinal location, intravitreal or posterior chamber, and other ocular locations. In another implementation, the implant 10 is implanted to form a fluid communication pathway between the anterior chamber and the Schlemm's Canal and/or communication pathway between the anterior chamber and a subconjunctival location of the eye. The device described herein can also be used to deliver an implant trans-sclerally as well from an ab interno approach. The implant 10 forming a fluid communication pathway can be supplemented by an additional implant, such as an implant formed of amniotic membrane tissue, the provides anti-inflammatory and anti-fibrotic effects at the implantation site due to the elution of one or more native healing factors derived from the amniotic membrane tissue. The amniotic membrane tissue can provide healing effects at the implantation site for a period before the amniotic membrane tissue fully absorbs.

As discussed elsewhere herein the biologically-derived material can include tissues such as sclera or amniotic membrane. The tissue can be cut into an implant that is then loaded into a delivery cannula. The delivery cannula, along with being a storage container for the cut implant, can be used for positioning the implant in the eye. The implant can be compacted within the delivery cannula so that the size of the implant inside the lumen is smaller than the cut size of the implant. Upon release of the implant into a location in the eye the implant can increase in size (see FIGS. 1A-1B). The increase in size due to the implant relaxing back into its cut dimension effectively "stents" the space within which it is deployed. The implant can also be sized relative to the dimensions of the delivery cannula so that there is no compacting or compression of the implant upon loading the implant within the lumen of the delivery cannula.

In some implementations, the implant can be configured to change shape following deployment due to hydration of the tissue in the eye. The implant can be cut from a dehydrated bio-tissue, such as dehydrated cornea or dehydrated sclera or dehydrated amniotic membrane. The dimensions of the cut dehydrated tissue can be smaller than corresponding hydrated tissue. A narrower cut can allow for smaller delivery cannula dimensions (e.g., inner diameter as small as 200-300 microns). Smaller cannulas are less traumatic to the eye and result in a smaller cleft size during implantation that upon deployment of the tissue can be propped up by expansion of the implant as it rehydrates in situ. The tissue can be dehydrated using 95% Ethyl alcohol or lyophilized tissue. In some implementations, the implant 10 is packaged so as to be bathed within a liquid solution. The implant 10 can be loaded into the delivery cannula 320 using a liquid solution as described above. In other implementations, the implant 10 is dehydrated and is loaded "dry" into the delivery cannula 320. In some implementations, the tissue can be transferred into the cannula manually using tweezers or another loading tool such as a physical pusher and inserted directly into the lumen. The dehydrated implant 10 allows for the delivery cannula dimension to remain small, for example, to maintain a small corneal incision. Once the implant 10 is deployed from the delivery cannula 320 into the eye, exposure to the bodily fluids rehydrates the implant 10 causing the implant 10 to swell and expand. Expansion of the implant 10 during hydration stents open the space within which the implant 10 is positioned to improve outflow of aqueous through the space.

Figure 16A:
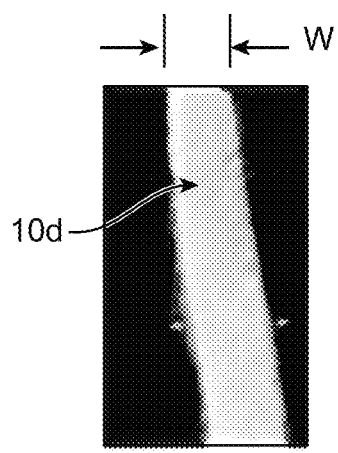
FIG. 16A shows a dehydrated implant.
Figure 16B:
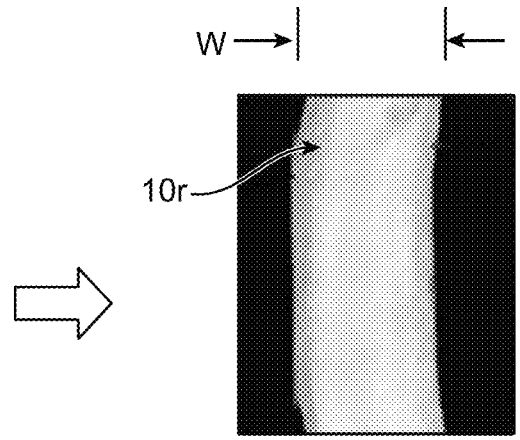
FIG. 16B shows the implant of FIG. 16A after rehydration.
Figure 16C:
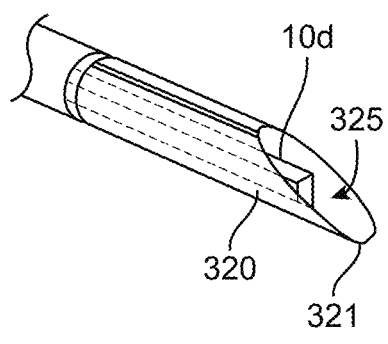
FIG. 16C is a partial perspective view of the delivery cannula with the dehydrated implant positioned within the lumen near the distal opening.
Figure 16D:
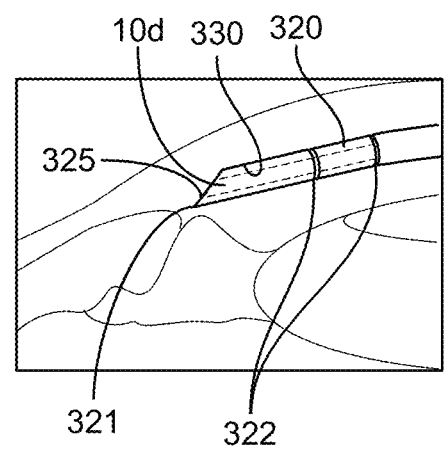
FIG. 16D is a partial side view of the delivery cannula approaching the anterior angle of the eye.

FIG. 16A shows a dehydrated implant 10d and FIG. 16B shows the implant of FIG. 16A after rehydration (i.e., implant 10r). The width W of the dehydrated implant 10d can be about 600 μm whereas the width W of the rehydrated implant 10r is about 1,000 μm. Like an expandable stent, dehydrated implants 10d have a minimized size during implantation while inside the delivery cannula 320 and maximized size upon deployment within the eye. FIGS. 16C-16D show the dehydrated implant 10d having a minimized outer dimension within the distal end region of the delivery cannula 320. The delivery cannula 320 can be inserted through the same small incision size while the overall therapeutic effect provided is greater due to the larger stented volume of the suprachoroidal space.

The inner diameter of the delivery cannula 320 can accommodate an implant 10 having a width of about 400-800 microns. Upon deployment of the implant 10 in the eye, the bio-tissue of the implant 10 can expand upon hydration to a size that can be about 50%-200% greater than the initial dehydrated volume. The implant 10, upon deployment, can increase in size by at least 1.2×, at least 1.3×, at least 1.4×, at least 1.5×, at least 1.6×, at least 1.7×, at least 1.8×, at least 1.9×, at least 2× up to about 3× the original size of the implant and anywhere in between.

More than a single implant 10 can be deployed within the eye to aid in aqueous outflow from the anterior chamber including implants 10 that are configured to enlarge in dimension upon deployment. The implants 10 can be formed of the same type of material or can be different materials. In some implementations, a first implant 10a is formed of scleral tissue and is implanted as a primary biostent and a second implant 10b is formed of amniotic membrane tissue and is implanted as a secondary biostent that acts as an adjunct treatment adjacent the primary biostent such as by releasing one or more healing factors in the implant location of the first implant 10a.

Figure 17B:
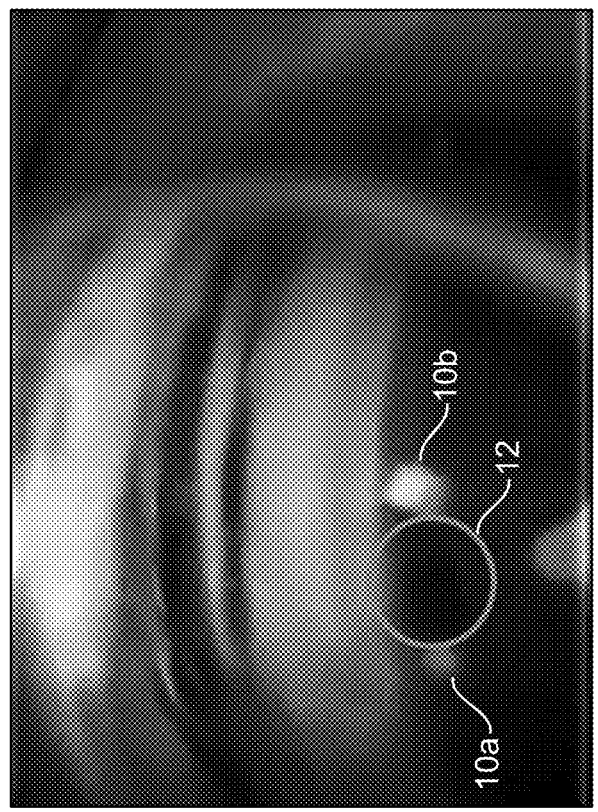
FIGS. 17A-17B illustrate a pair of implants positioned within the anterior angle of the eye creating a scaffold or reinforced drainage reservoir within the suprachoroidal and/or supraciliary space.
Figure 17A:
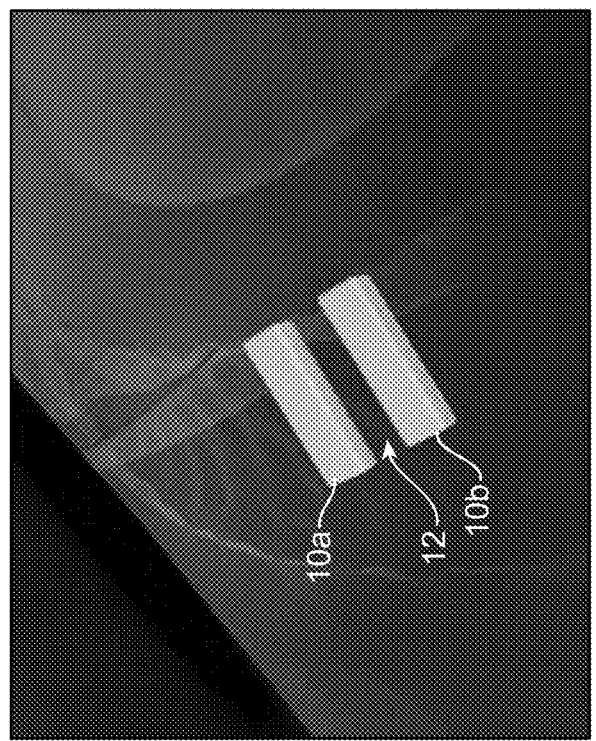

Implanting more than one implant within a target site can also create a scaffold or reservoir within the target site. FIGS. 17A-17B illustrate a pair of implants 10a, 10b positioned within the anterior angle of the eye creating a scaffold or reinforced drainage reservoir within the suprachoroidal and/or supraciliary space. FIG. 17A shows the pair of implants 10a, 10b located side by side with a longitudinal space between them that forms a reservoir 12. FIG. 17B shows the pair of implants 10a, 10b and the scaffolded reservoir 12 from a proximal end view. The longitudinal space forming the reservoir 12 between the two implants 10a, 10b can be a permanent or semi-permanent reservoir that increases the suprachoroidal outflow of aqueous from the anterior chamber.

A first implant 10a, which can be an elongate segment of scleral biotissue or other biotissue as described elsewhere herein, can be inserted from the delivery cannula into an anterior segment aqueous drainage location so that the distal end of the first implant 10a is in fluid communication with the suprachoroidal space and the proximal end of the first implant 10a remains at least in part within the anterior chamber or is flush with the cleft to prop it open. A second implant 10b, which can also be an elongate segment of scleral biotissue or can be another biotissue such as amniotic membrane serving as an adjunct treatment for the primary implant 10a, is inserted along a similar trajectory so the distal end of the second implant 10b is placed in fluid communication with the suprachoroidal space and the proximal end of the second implant 10b is in fluid communication with the anterior chamber (e.g., within the AC or flush with the cleft). The second implant 10b can be delivered using the same delivery cannula 320 loaded at the site of the procedure or a different delivery cannula 320 preloaded with the second implant 10b. The second implant 10b can be spaced a distance away from the first implant 10a around a circumference of the eye. The distance between the first and second implants 10a, 10b can vary, but is preferably about 0.5-2.0 mm away to scaffold the tissues extending longitudinally between the two implants 10a, 10b and, in the case of adjunct treatment by eluting healing factors derived from the second implant ensures the factors diffuse to the implant site without significant wash-out. As an example, at 0.5 mm, each implant is about 5 degrees on a 12 mm diameter circle or 20 degrees if 2 mm apart.

The biotissue implant can be a resorbable tissue and semi-permanent to create the scaffold for a limited period, such as 1 month to 3 months. For example, amniotic membrane can be used to create an expandable scaffold within the target site that after about 30 days absorbs leaving a functional and improved outflow (e.g., ciliary cleft or trabecular meshwork/canal) with a more open architecture. The amniotic membrane can be used in addition to one or more scleral biostents in the treatment location to reduce fibrosis by eluting healing factors derived from the amniotic membrane that diffuse in and around the implantation location inhibiting fibrosis and increasing regeneration and healing.

As an example, procedure, an eye of a patient with glaucoma can be prepped and draped using various technique. Retrobulbar or sub-tenon block can be delivered under Monitored Anesthesia Care (MAC). A first incision is made in the cornea and viscoelastic injected to deepen the anterior chamber. An intraoperative gonio-lens is applied to the cornea to visualize the angle, which is expanded additionally to visualize under the microscope and gonio-lens the iris/ciliary body root insertion. Supraciliary dissection is performed using micro-interventional instrumentation described herein, for example, using the delivery cannula 320 as shown in FIGS. 12A-12C or FIGS. 13A-13C or FIGS. 14A-14F or FIGS. 15A-15B. A suprachoroidal reservoir is created and expanded mechanically at least 4-5 mm deep to pars-plana supraciliary space. A second corneal incision can be made to deliver a bio-tissue implant 10a by further expanding and scaffolding the lateral wall of the reservoir. A third corneal incision can be made to deliver a second bio-tissue implant 10b to the opposite lateral supraciliary wall to scaffold and maintain reservoir. As described elsewhere herein, the distance between the implants 10a, 10b can vary, but are preferably distances no more than about 2 mm away so as to maintain the scaffold. Bleeding can be minimized using tamponade. The reinforced suprachoroidal reservoir 12 between the first and second implants 10a, 10b can be visualized and confirmed at the conclusion of the case using gonio-microscopy. Irrigation/aspiration can be performed to evacuate any debris or viscoelastic. Antibiotics and steroids can be delivered at the conclusion of the case. The procedure described above relates to just two implants paired to create a reservoir between them although the procedure can include positioning three or four implants to create additional reservoir space.

EXPERIMENTAL

Example 1: Intraocular Scaffolding with Adjunct Therapy Provided By Amniotic Membrane Following a phacoemulsification procedure, a primary biostent trephined of scleral allograft to 0.5 mm×0.5 mm×5 mm was implanted within the supraciliary space for intraocular stenting, scaffolding, and reinforcement of the scleral cleft. An adjunct biostent trephined of amniotic membrane to 0.1 mm×0.5 mm×5 mm was implanted adjacent the primary biostent within the supraciliary space to provide adjunct therapy with sustained bio-elution of regenerative amniotic factors derived from the amniotic membrane tissue. The baseline intraocular pressure (IOP) for the first patient was 21 mmHg and treated with 4 IOP lowering medications to maintain this pressure. Three months after implantation, IOP was 19 mmHg and no IOP lowering medications were used at 3 months of follow-up post-surgery. The baseline intraocular pressure (IOP) for the second patient was 15 mmHg and treated with 4 IOP lower medications to maintain this pressure. Three months after implantation, IOP was 15 mmHg and just 1 IOP lower medication were used to maintain this pressure. The baseline intraocular pressure (IOP) for the third patient was 28 mmHg and 3 IOP lower medications were used to maintain this pressure. Three months after implantation, IOP was 15 mmHg and just 2 IOP medications used to maintain this pressure. The amniotic membrane was partially to fully resorbed in all patients by 90 days. None of the patients experienced adverse events and all patients had accelerated resolution of post-operative iritis following implantation (i.e., resolved within 2 weeks compared to 4-8 weeks post-op).

In various implementations, description is made with reference to the figures. However, certain implementations may be practiced without one or more of these specific details, or in combination with other known methods and configurations. In the description, numerous specific details are set forth, such as specific configurations, dimensions, and processes, in order to provide a thorough understanding of the implementations. In other instances, well-known processes and manufacturing techniques have not been described in particular detail in order to not unnecessarily obscure the description. Reference throughout this specification to "one embodiment," "an embodiment," "one implementation," "an implementation," or the like, means that a particular feature, structure, configuration, or characteristic described is included in at least one embodiment or implementation. Thus, the appearance of the phrase "one embodiment," "an embodiment," "one implementation, "an implementation," or the like, in various places throughout this specification are not necessarily referring to the same embodiment or implementation. Furthermore, the particular features, structures, configurations, or characteristics may be combined in any suitable manner in one or more implementations.

The use of relative terms throughout the description may denote a relative position or direction. For example, "distal" may indicate a first direction away from a reference point. Similarly, "proximal" may indicate a location in a second direction opposite to the first direction. The reference point used herein may be the operator such that the terms "proximal" and "distal" are in reference to an operator using the device. A region of the device that is closer to an operator may be described herein as "proximal" and a region of the device that is further away from an operator may be described herein as "distal". Similarly, the terms "proximal" and "distal" may also be used herein to refer to anatomical locations of a patient from the perspective of an operator or from the perspective of an entry point or along a path of insertion from the entry point of the system. As such, a location that is proximal may mean a location in the patient that is closer to an entry point of the device along a path of insertion towards a target and a location that is distal may mean a location in a patient that is further away from an entry point of the device along a path of insertion towards the target location. However, such terms are provided to establish relative frames of reference and are not intended to limit the use or orientation of the devices to a specific configuration described in the various implementations.

As used herein, the term "about" means a range of values including the specified value, which a person of ordinary skill in the art would consider reasonably similar to the specified value. In aspects, about means within a standard deviation using measurements generally acceptable in the art. In aspects, about means a range extending to +/−10% of the specified value. In aspects, about includes the specified value.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

The systems disclosed herein may be packaged together in a single package. The finished package would be sterilized using sterilization methods such as Ethylene oxide or radiation and labeled and boxed. Instructions for use may also be provided in-box or through an internet link printed on the label.

What is claimed is:

1. A method of treating glaucoma of an eye comprising:
   inserting a first implant in a treatment site in an eye, wherein the implant comprises dehydrated, biologically-derived tissue having a first size;
   opening a space within the treatment site with the implant due to the dehydrated, biologically-derived tissue of the implant rehydrating in the eye and expanding from the first size to a second size; and
   inserting a second implant near the treatment site of the first implant,
   wherein the first implant and the second implant are both formed and cut of dehydrated, biologically-derived tissue, wherein the biologically-derived tissue of the first implant is the same as or different from the biologically-derived tissue of the second implant,
   wherein the second implant creates a scaffold with the first implant and a reservoir within a target site between the first implant and the second implant, and
   wherein the treatment site is between internal eye tissue layers, and wherein opening the space within the treatment site increases outflow of aqueous from an anterior chamber of the eye through the treatment site between the internal eye tissue layers.

2. The method of claim 1, wherein the dehydrated, biologically-derived tissue is cornea, sclera, or amniotic membrane.

3. The method of claim 1, further comprising inserting the first implant into the treatment site ab externo via a scleral flap.

4. The method of claim 1, further comprising inserting the first implant into the treatment site ab interno.

5. The method of claim 4, wherein inserting the first implant ab interno comprises advancing a delivery cannula through a cornea of the eye and advancing the delivery cannula towards the treatment site, the first implant having the first size contained within a lumen of the delivery cannula for deploying the first implant in the treatment site.

6. The method of claim 1, wherein the first size of the first implant comprises a width of 400-800 microns.

7. The method of claim 1, wherein the second size of the first implant following rehydration is at least 50% up to about 200% greater than the first size of the first implant.

8. The method of claim 1, wherein the second size of the first implant is at least 1.2× up to about 3× the first size of the first implant.

9. The method of claim 1, wherein the first implant has a dehydrated maximum thickness of about 600 microns and a hydrated maximum thickness of about 1000 microns.

10. The method of claim 1, wherein the dehydrated, biologically-derived tissue is dehydrated using ethyl alcohol or by lyophilizing.

11. The method of claim 1, wherein the treatment site in the eye comprises a suprachoroidal space, a supraciliary space, a Schlemm's canal, or an anterior chamber.

12. The method of claim 1, wherein the first implant deployed in the treatment site provides aqueous communication between an anterior chamber of the eye and at least one of a supraciliary space, a suprachoroidal space, a Schlemm's Canal, and a sub-conjunctival space.

13. The method of claim 1, wherein the treatment site includes a sub-conjunctival space of the eye and the first implant extends trans-sclerally from a sub-scleral location to a supra-scleral location.

14. The method of claim 1, wherein the first implant provides sub-scleral, trans-scleral, or supra-scleral occlusion, stenting, and/or tissue reinforcement.

15. The method of claim 1, further comprising compressing the first implant into a plug prior to deploying in the treatment site.

16. The method of claim 15, further comprising stenting the treatment site with the plug.

17. The method of claim 15, further comprising occluding the treatment site with the plug, the treatment site being a wall rupture or over-filtering bleb.

18. The method of claim 1, wherein a distance between the first implant and the second implant is about 0.5 mm-2.0 mm around a circumference of the eye.

19. The method of claim 18, wherein the first implant and the second implant are positioned about 5 degrees to about 20 degrees apart on a 12 mm diameter circle of the eye.

* * * * *